US006714582B2

(12) United States Patent
Nakamura et al.

(10) Patent No.: US 6,714,582 B2
(45) Date of Patent: Mar. 30, 2004

(54) CODE DIVISION MULTIPLE ACCESS COMMUNICATION SYSTEM AND CODE DIVISION MULTIPLE ACCESS TRANSMITTING APPARATUS

(75) Inventors: Takaharu Nakamura, Kawasaki (JP); Kazuhisa Obuchi, Kawasaki (JP); Nobuhisa Aoki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/308,267

(22) Filed: Nov. 27, 2002

(65) Prior Publication Data

US 2003/0081655 A1 May 1, 2003

Related U.S. Application Data

(63) Continuation of application No. PCT/JP00/04606, filed on Jul. 11, 2000.

(51) Int. Cl.[7] .............................. H04B 1/69; H04L 1/00
(52) U.S. Cl. .................. 375/141; 375/150; 370/242
(58) Field of Search .............................. 375/141, 130, 375/142, 146, 147, 150, 295; 370/335, 320, 342

(56) References Cited

U.S. PATENT DOCUMENTS 5,729,570 A * 3/1998 Magill ........................ 375/149
5,751,761 A * 5/1998 Gilhousen ................... 375/146
5,757,850 A * 5/1998 Takaki ........................ 375/225

FOREIGN PATENT DOCUMENTS

| JP | 6-209303 | 7/1994 |
| JP | 6-343066 | 12/1994 |
| JP | 9-200082 | 7/1997 |
| JP | 10-70772 | 3/1998 |
| JP | 2000-115110 | 4/2000 |

* cited by examiner

Primary Examiner—Khai Tran
(74) Attorney, Agent, or Firm—Katten Muchin Zavis Rosenman

(57) ABSTRACT

In a CDMA transmitting apparatus, a cross-correlation value between different spreading-code sequences used to spread respective ones of a plurality of transmit signals is calculated, an interference interval of a spreading-code sequence is discriminated from the cross-correlation value calculated, and interference noise is reduced by halting transmission of at least one transmit signal, or partially altering at least one spreading-code sequence, with regard to all or part of a spreading-code sequence discriminated to be an interference interval.

26 Claims, 39 Drawing Sheets

FIG. 2
(a)
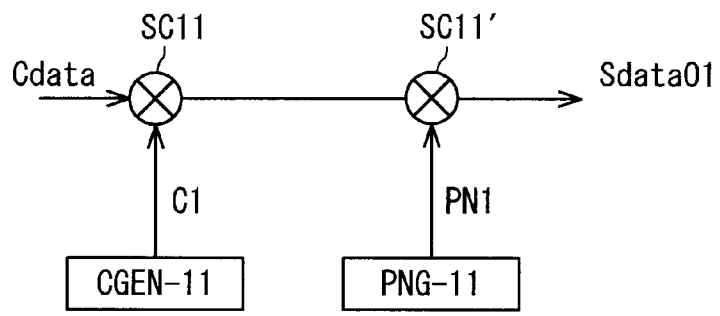
(b)
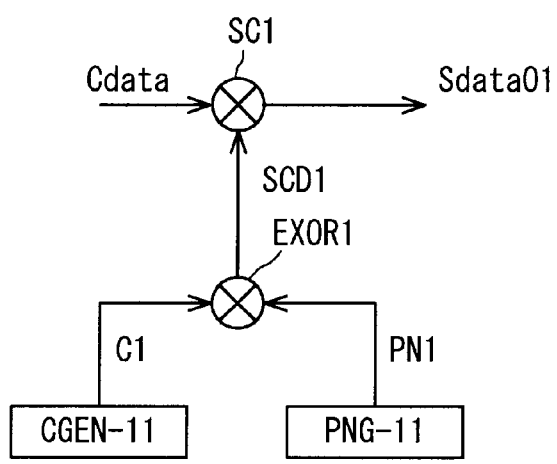
(c)
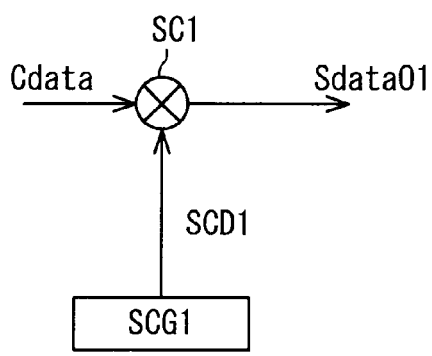

CODE DIVISION MULTIPLE ACCESS COMMUNICATION SYSTEM AND CODE DIVISION MULTIPLE ACCESS TRANSMITTING APPARATUS

This application is a continuation of international application number PCT/JP00/04606, filed Jul. 11, 2000.

BACKGROUND OF THE INVENTION

This invention relates to a code division multiple access communication system and code division multiple access transmitting apparatus. More particularly, the invention relates to a code division multiple access communication system and code division multiple access transmitting apparatus in which interference noise can be reduced.

In a CDMA (Code Division Multiple Access) mobile communications system, a base station spread-spectrum modulates control information and user information of each user by employing different spreading code sequences, multiplexes the modulated information and transmits the same. Each mobile station in the system sends and receives information upon spreading and despreading the information using a spreading code sequence specified by the base station.

FIG. 37 is a block diagram of a CDMA transmitter in a base station that encodes, multiplexes and transmits the transmit data of a control channel and of a plurality of user channels. In the Figure, numerals $11_1$ to $11_n$ denote spread-spectrum modulators of respective control and user channels, each having a frame generator 21, a serial/parallel converter (S/P converter) 22 for converting frame data to parallel data, and a spreading circuit 23.

The frame generator 21 includes a transmission data generator 21a for generating serial transmit data $D_1$, a control-data generator 21b for generating control data CNDT such as a pilot, and a framing circuit 21c for forming the serial data $D_1$ into a block every prescribed number of bits and inserting the control data CNDT before and after every block to thereby form frames. The pilot signal allows a receiver to recognize the amount of phase rotation caused by transmission so that the data may be subjected to a phase rotation by an equivalent amount in the opposite direction.

The S/P converter 22 alternately distributes the frame data (the control data and transmit data) one bit at a time to convert the frame data to two sequences $D_I$, $D_Q$, namely I-component (in-phase component) data and Q-component (quadrature-component) data. The spreading circuit 23 includes a pn sequence generator 23a for generating a noise code (pn sequence) specific to the base station, a channel code generator 23b for generating a channel code specific to the control channel or user channel, an EXOR circuit 23c for outputting a spreading code $C_1$ by taking the EXOR (exclusive-OR) between the noise code and the channel code, and EXOR circuits 23d, 23e for performing spread-spectrum modulation by taking the exclusive-ORs between the data $D_I$ and $D_Q$ (symbols) of the two sequences, and the spreading code $C_1$.

Reference characters $12_i$ denote a combiner for outputting an I-component code-multiplexed signal $\Sigma V_I$ by combining the I-component spread-spectrum modulated signals $V_I$ output by the spread-spectrum modulators $11_1 \sim 11_n$ of the user channels; $12q$ a combiner for outputting a Q-component code-multiplexed signal $\Sigma V_Q$ by combining the Q-component spread-spectrum modulated signals $V_Q$ output by the spread-spectrum modulators $11_1 \sim 11_n$; $13i$, $13q$ FIR-type chip shaping filters for limiting the bands of the code-multiplexed signals $\Sigma V_I$, $\Sigma V_Q$; $14i$, $14q$ DA converters for DA-converting the outputs of the filters $13i$, $13q$; $15$ a quadrature modulator for applying QPSK quadrature modulation to the code-multiplexed signals $\Sigma V_I$, $\Sigma V_Q$ of the I and Q components and outputting the modulated signal; 16 a transmit circuit for converting the frequency of the output signal of the quadrature modulator to a radio frequency, amplifying the high frequency and transmitting the result; and 17 an antenna.

FIG. 38 is a block diagram of a CDMA receiver in a mobile station. A radio unit 31 converts a high-frequency signal received by the antenna to baseband signals by applying a frequency conversion (RF→IF conversion). An orthogonality detector 32 detects orthogonality of the baseband signals and outputs in-phase component (I-phase component) data and quadrature component (Q-component) data. In the orthogonality detector 32, reference characters 32a denote a receive-carrier generator; 32b a phase shifter for shifting the phase of the receive carrier by $\pi/2$; and 32c, 32d multipliers for multiplying the baseband signals by the receive carrier and outputting the I-component signal and the Q-component signal. Low-pass filters (LPF) 33a, 33b limit the bands of these output signals and AD converters 35a, 35b convert the I- and Q-component signals to digital signals and input the digital signals to a despreading circuit 41.

The despreading circuit 41 subjects the input I- and Q-component signals to despread processing using a code identical with the spreading code and outputs a reference signal (pilot signal) and an information signal. A phase compensator (channel estimation unit) 42 averages the voltages of the I- and Q-components of the pilot signal over a prescribed number of slots and outputs channel estimation signals It, Qt. A synchronous detector 43 restores the phases of despread information signals I', Q' to the original phases based upon a phase difference θ between a pilot signal contained in a receive signal and an already existing pilot signal. More specifically, the channel estimation signals It, Qt are cosine and sine components of the phase difference θ, and therefore the synchronous detector 43 demodulates the receive information signal (I,Q) (performs synchronous detection) by applying phase rotation processing to the receive information signal (I',Q') in accordance with the following equation using the channel estimation signal (It, Qt).

$$\begin{pmatrix} I \\ Q \end{pmatrix} = \begin{pmatrix} It & Qt \\ -Qt & It \end{pmatrix} \begin{pmatrix} I' \\ Q' \end{pmatrix}$$

An error correction decoder 44 decodes the original transmit data by using the signal that enters from the synchronous detector 43 and outputs the decoded data.

In the above-described mobile wireless communication system, a base station usually cannot use a fixed directivity pattern for communication with mobile stations; it communicates using a non-directional antenna. However, not only is transmission by a non-directional antenna poor in power efficiency because radio waves are emanated also in directions in which a targeted mobile station is not present, but such transmission also degrades communication quality by subjecting mobile stations other than the targeted mobile station to interference. For this reason, practice has been to equally divide the 360° circumference of the base station so as to split the cell into a plurality of sectors (sector-shaped zones), and use a directional antenna in each sector, thereby mitigating interference.

FIG. 39 is a schematic structural view of a transceiver in a code division multiple access communication system for a case where a cell has been divided into sectors, and FIG. 40 is a flowchart of transceive processing. These illustrate an example of a case where user data signals Data1, Data2 are transmitted from a single base station BS to mobile stations MS1, MS2 in two sectors neighboring each other. Sectors Sec1, Sec2 in the base station BS have transceive antennas ANT1, ANT2 possessing separate directivities and, by virtue of the antenna directivities, take charge of the sending and receiving of signals to and from coverage areas (sectors) that are geographically independent of each other.

The user data signals Data1, Data2 undergo encoding processing, for error correction or the like, in channel coders CH-cod1, CH-cod2 in respective ones of the sectors Sec1, Sec2, and the processed signals are input to spreading circuits SC1, SC2. Encoded data Cdata1, Cdata2 is spread-spectrum modulated in the spreading circuits SC1, SC2 by mutually different spreading-code sequences PN1, PN2 generated by spreading-code generators PNG11, PNG12, whereby transmit signals Sdata1, Sdata2 are obtained. The spreading codes PN1, PN2 used in the sectors Sec1, Sec2 are produced from portions having different phases in an M sequence generated from the same generating polynomial. As a result, the spreading codes produced are such that the their mutual cross-correlation values take on small values on average.

In the receivers of the mobile stations MS1, MS2, on the other hand, despreading circuits RSC1, RSC2 apply despread demodulation to received signals Sdata1', Sdata2' using the same code sequences PN1' (=PN1), PN2' (=PN2), which are synchronized to the spreading-code sequences used by the base station. Channel decoders (CH-Dec1, CH-Dec2) decode receive signals Data1', Data2'.

Depending upon geographical conditions in which the mobile stations find themselves, e.g., as a result of the mobile stations being present where the antenna directivities of the two sectors Sec1, Sec2 of the base station BS overlap each other, there are cases where the signals from the two antennas ATN1, ATN2 are received simultaneously. In such cases, receive signals other than the desired receive signals received by the mobile stations become interference noise because the two transmit signals were spread-spectrum modulated by spreading-code sequences that differ from each other. This noise remains in the receive demodulated signals. However, since this interference noise when averaged takes on a small value decided by the cross-correlation value between the spreading codes, the effects thereof are eliminated by the error correction functions, etc., of the channel decoders CH-Dec1, CH-Dec2, and data identical with the user data transmitted by the transmitting side is reproduced as receiver outputs.

Even if the cross-correlation characteristic has been selected so as to have a problem-free characteristic when averaged, there are instances where the cross-correlation characteristic deteriorates momentarily, as at the time of a high-speed data transmission that requires communication to be performed at a low spreading rate [=(symbol period)/(chip period)]. FIG. 41 is a diagram useful in describing a partial cross-correlation characteristic between pseudo-noise sequences (spreading-code sequences). This illustrates a case where the spreading rate that prevails when the two items of transmit data Data1, Data2 are spread-spectrum modulated is 4 (one symbol is spread by four chips). The cross-correlation value between the two spreading-code sequences (PN1, PN2) is expressed by how many chips of the same polarity exist at the same time per symbol (=four chip lengths). With regard to the symbol indicated by the shading in FIG. 42, three chips in one sequence have identical polarities with those of the other sequence over the duration of this one symbol. The cross-correlation value, therefore, is very large. If the cross-correlation characteristic thus is inferior locally and transmit data is spread-spectrum modulated and transmitted using this portion of the characteristic, mutual interference noise that prevails after despreading is performed on the receiving side becomes large in the above-mentioned symbol portion, as shown in FIG. 42 (see the shaded portions), and this invites local deterioration of the transmission characteristic. The major part an error ascribable to the local deterioration in the transmission characteristic is corrected by error-correction decoding processing in the channel decoders CH-Dec1, CH-Dec2, and correct data is decoded as a result. In comparison with a case where there is no local deterioration, however, an increase in interference power of the entire system attendant upon an increase in average required power occurs in order to achieve a certain transmission quality. This brings about undesirable results, such as a decrease in system capacity (the number of users that can be accommodated)

SUMMARY OF THE INVENTION

Accordingly, an object of the present invention is to prevent deterioration of communication quality, which is ascribable to an increase in local interference noise, or an increase in required average transmission power.

In a CDMA transmitting apparatus, a cross-correlation value between mutually different spreading-code sequences used to spread respective ones of a plurality of transmit signals is calculated, an interference interval of a spreading-code sequence is discriminated from the cross-correlation value calculated, and interference noise is reduced by halting transmission of at least one transmit signal, or partially altering at least one spreading-code sequence, with regard to all or part of a spreading-code sequence discriminated to be an interference interval. If this arrangement is adopted, it is possible to prevent the problem with the prior art, namely deterioration of communication quality, which is caused by an increase in local interference noise, or an increase in required average transmission power.

Further, in a code division multiple access communication system, a receiving apparatus calculates a cross-correlation value between mutually different spreading-code sequences used by a transmitting apparatus to perform spread-spectrum modulation, discriminates an interference interval of a spreading-code sequence from the cross-correlation value calculated, and notifies the transmitting apparatus of the position of a spreading-code sequence discriminated to be an interference interval. On the basis of the position information sent from the receiving apparatus, the transmitting apparatus reduces interference noise by halting transmission of at least one transmit signal, or partially altering at least one spreading-code sequence, with regard to all or part of a spreading-code sequence discriminated to be an interference interval. If this arrangement is adopted, it is possible to prevent the problem with the prior art, namely deterioration of communication quality, which is caused by an increase in local interference noise, or an increase in required average transmission power.

BRIEF DESCRIPTION OF THE DRAWINGS

FIG. 2 is a diagram useful in describing a modification of a spreading circuit;

FIG. 3 is a block diagram of a cross-correlation detection controller;

DESCRIPTION OF THE PREFERRED EMBODIMENTS (A) First Embodiment

Figure 1:
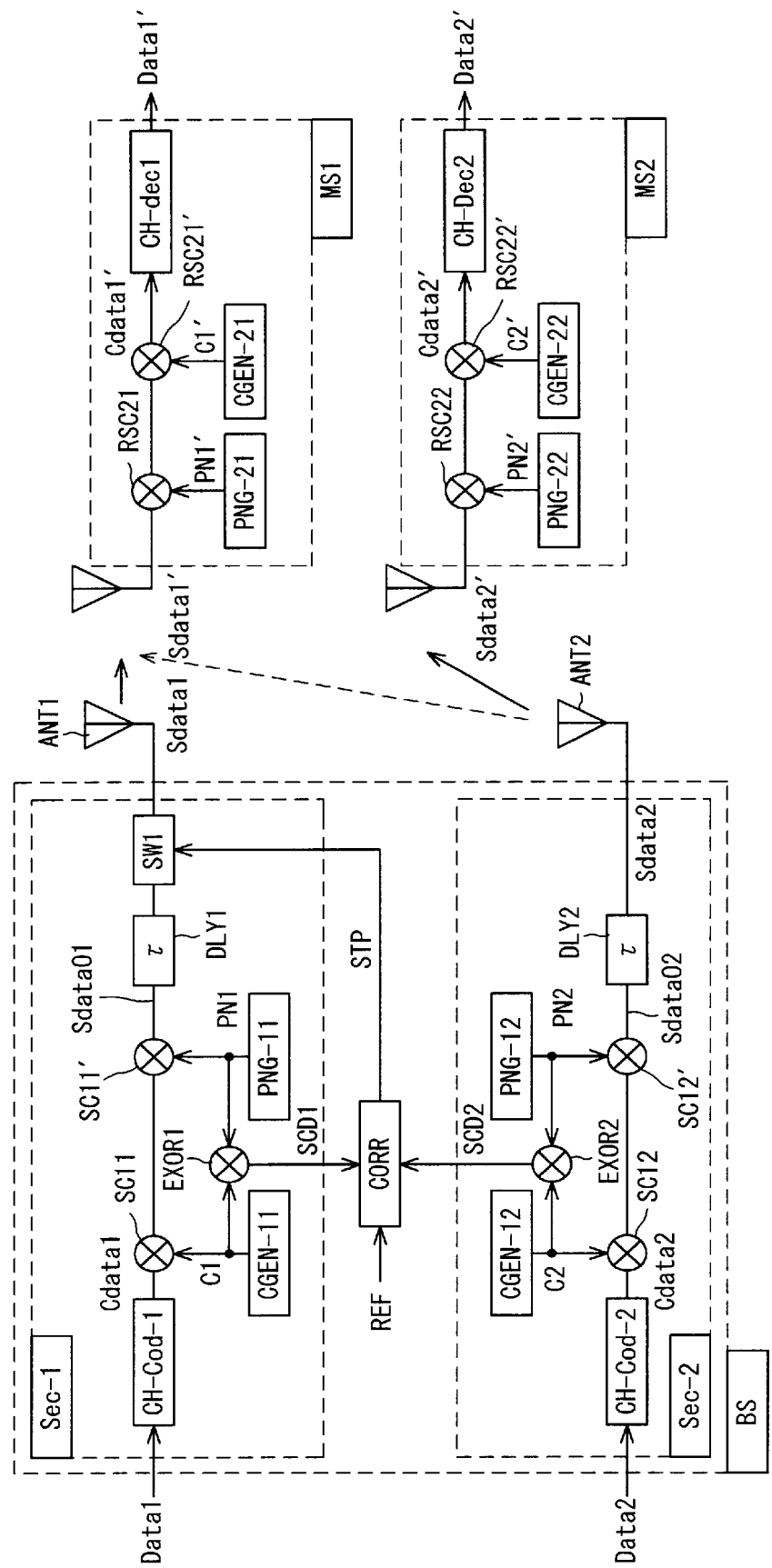
FIG. 1 is a block diagram of a code division multiple access communication system according to a first embodiment.

FIG. 1 is a block diagram of a code division multiple access communication system according to a first embodiment of the present invention. This illustrates a code division multiple access communication system in a case where a cell has been divided into sectors. Further, the Figure illustrates an example of a case where user data signals Data1, Data2 are transmitted from a single base station (transmitting apparatus) BS to mobile stations (receiving apparatus) MS1, MS2 in two sectors neighboring each other.

Figure 37:
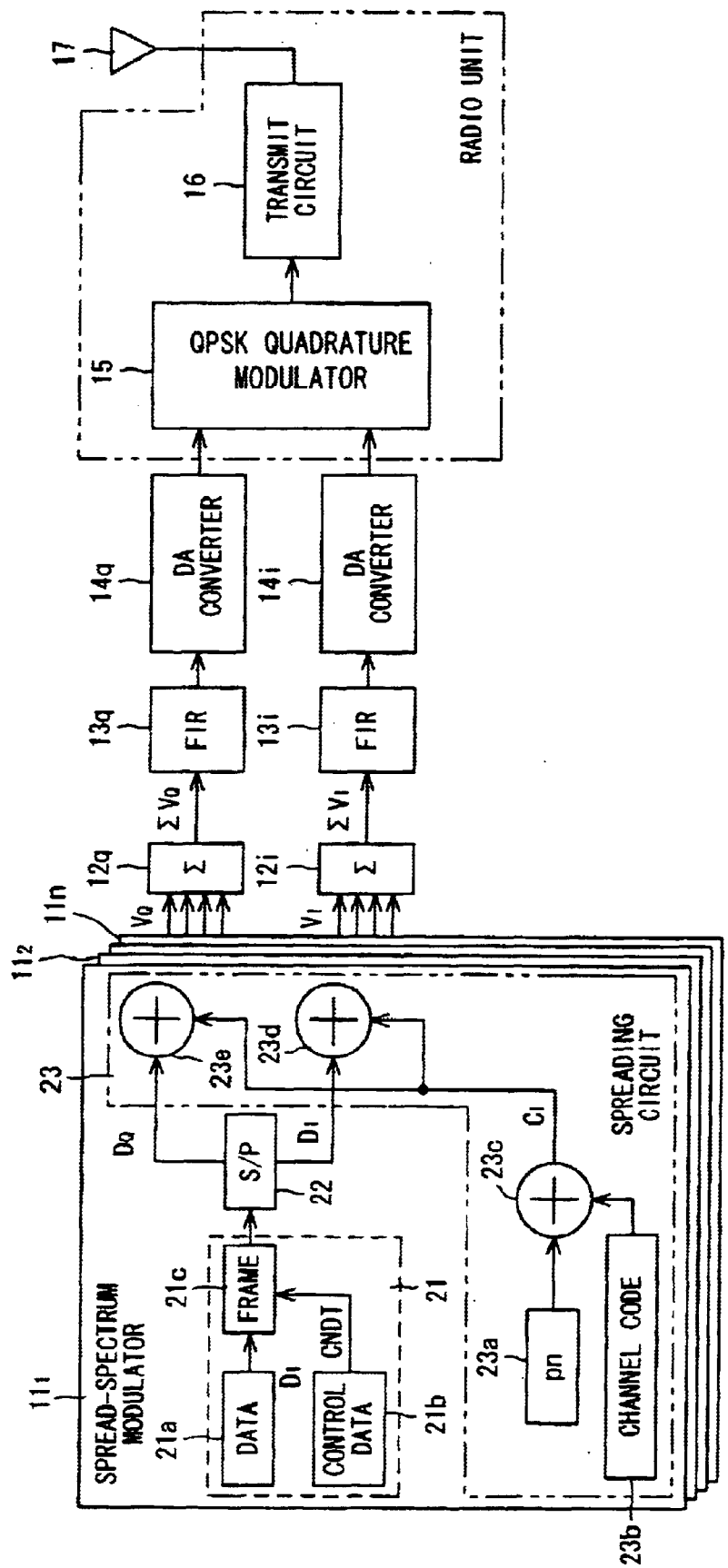
FIG. 37 shows the structure of a CDMA transmitter.
Figure 38:
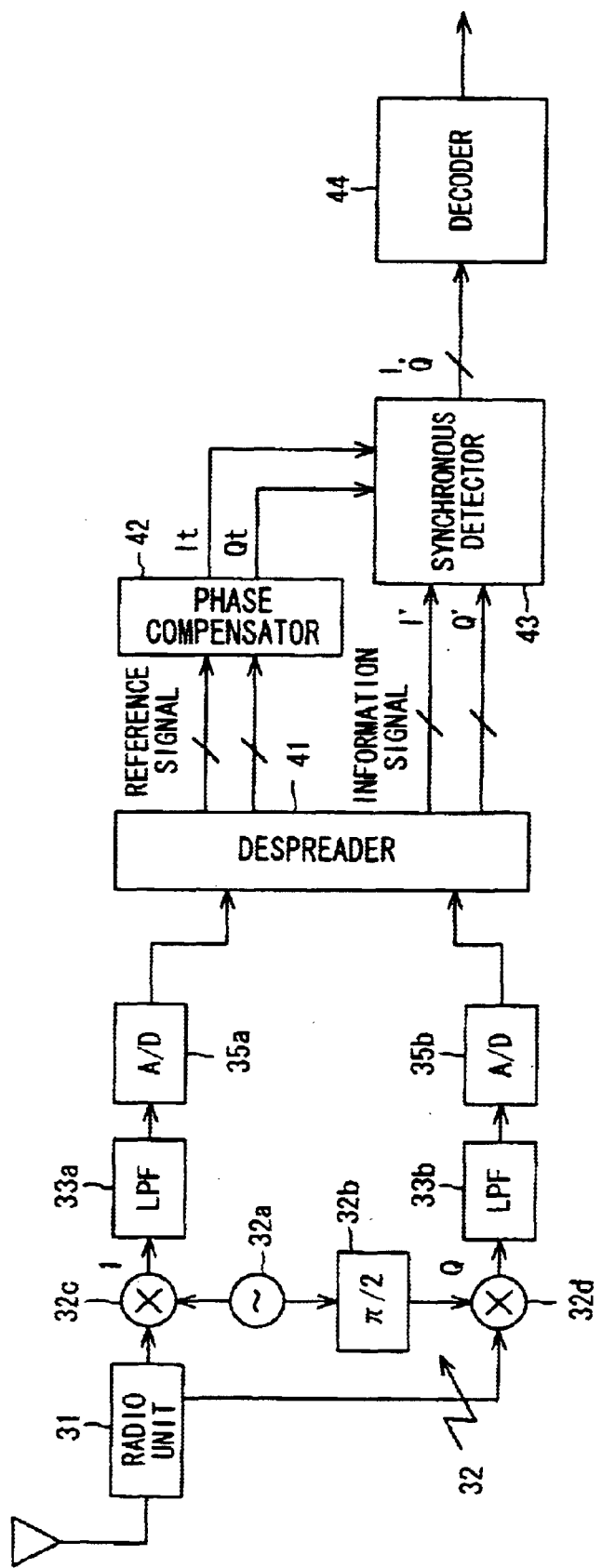
FIG. 38 is a detailed block diagram of a CDMA receiver.
Figure 39:
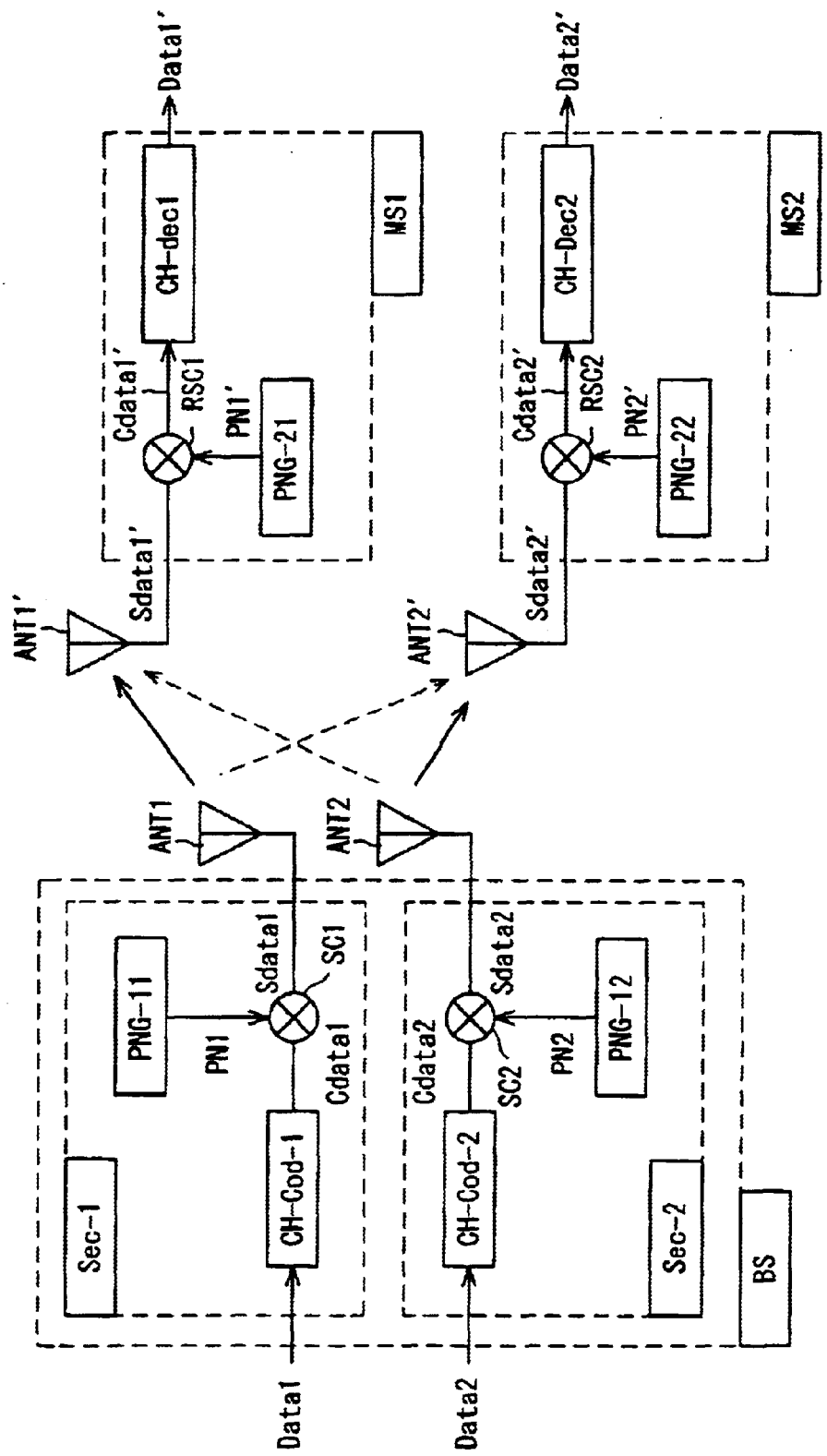
FIG. 39 is a diagram showing the configuration of a code division multiple access communication system in a case where a cell has been divided into sectors.
Figure 40:
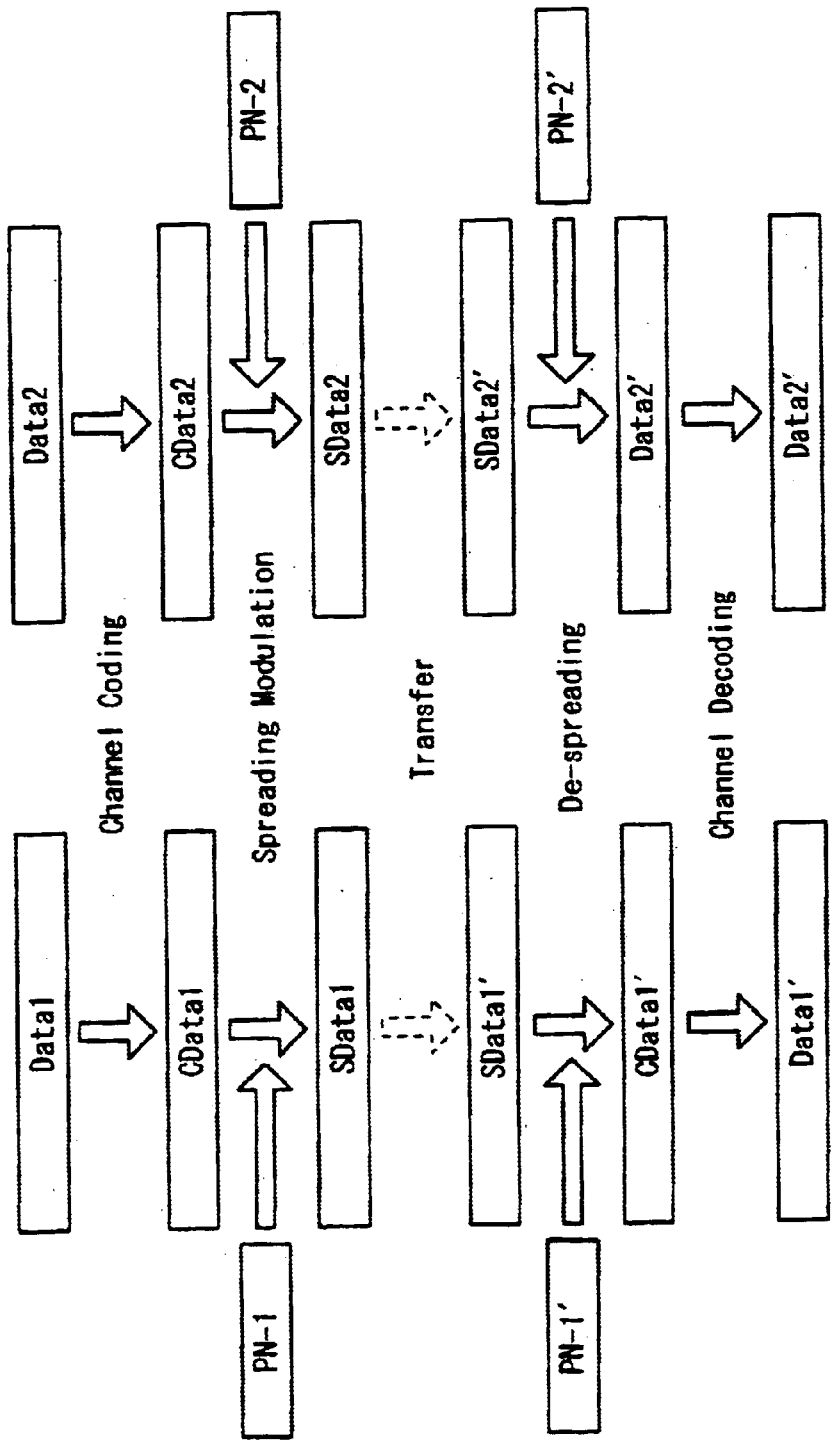
FIG. 40 is a flowchart of transceive processing according to the prior art.
Figure 41:
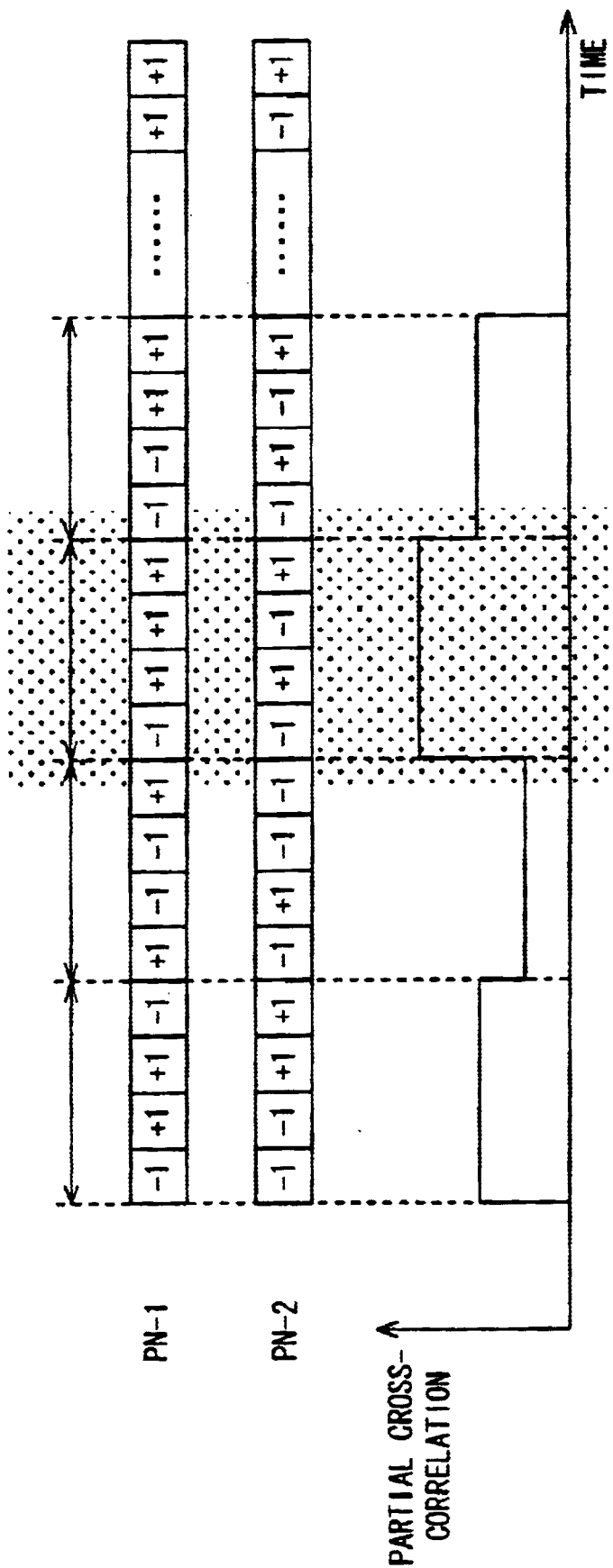
FIG. 41 shows a partial correlation characteristic between pseudo-noise sequences (spreading-code sequences)
Figure 42:
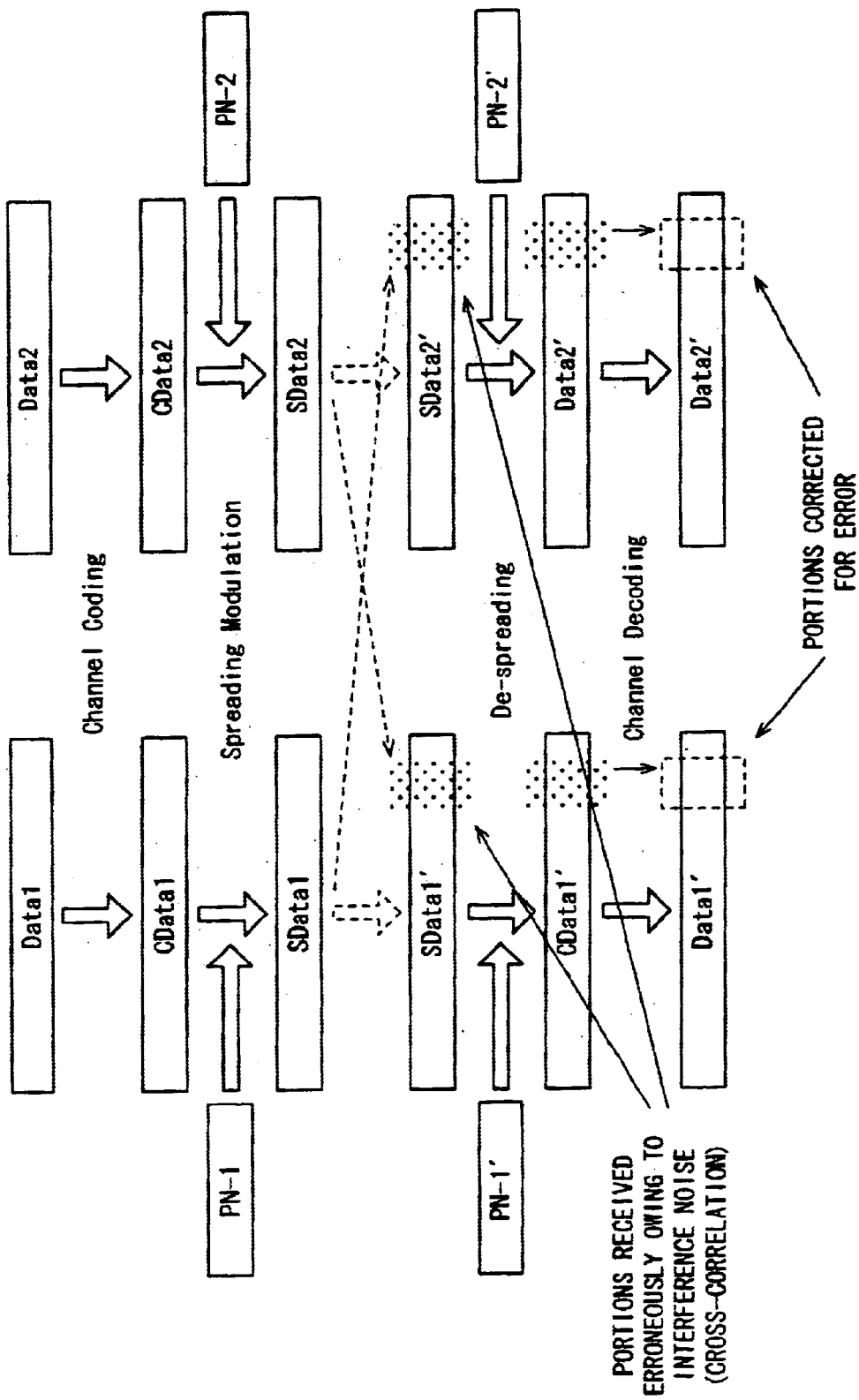
FIG. 42 is a diagram useful in describing operation of the prior art in a case where a cross-correlation characteristic undergoes partial deterioration.

Sectors Sec1, Sec2 in the base station BS have transceive antennas ANT1, ANT2 possessing separate directivities and, by virtue of the antenna directivities, take charge of the sending and receiving of signals to and from coverage areas (sectors) that are geographically independent of each other. Portions of the base station BS and mobile stations MS1, MS2 in FIG. 1 that have no bearing upon the present invention are deleted, although the deleted structure should be evident from FIGS. 37 and 38.

Channel coders CH-cod1, CH-cod2 in the sectors Sec1, Sec2 of the base station (transmitting apparatus) BS subject the two transmit signals Data1, Data2, respectively, to error-correction encoding and output encoded transmit signals Cdata1, Cdata2. Spreading circuits SC11, SC12 spread-spectrum modulate the transmit signals Cdata1, Cdata2 using first spreading-code sequences C1, C2, and spreading circuits SC11', SC12' apply further spread-spectrum modulation using second spreading-code sequences PN1, PN2 and output spread transmit signals Sdata01, Sdata02. Among the spreading-code sequences, the second spreading-code sequences PN1, PN2 are base-station-specific or sector-by-sector-specific noise-code sequences for scrambling and are used commonly by each channel (each user); they are output from pseudo-noise generators PNG11, PNG12. The first spreading-code sequences C1, C2 are channel codes for discriminating each of the channels (each of the users) when the common noise-code sequences PN1, PN2 are shared by a plurality of channels (users); they are output from code-sequence generators CGEN-11, CGEN-12.

The spread-spectrum modulated transmit signals Sdata01, Sdata02 are delayed a time τ by delay units DLY1, DLY2, respectively. Delayed signal Sdata01 is input to a transmit antenna ANT1 via a switch SW1 and a frequency converter and power amplifier, etc., which are not shown, and delayed signal Sdata2 is input to a transmit antenna ANT2 via a frequency converter and power amplifier, etc., which are not shown, without the intermediary of a switch. The delay time τ of the delay circuits DLY1, DLY2 is for the purpose of making the timings of the spread-spectrum modulated transmit signals Sdata01, Sdata02 coincide with the timing of a control signal STP, described later.

Spread-spectrum modulation is carried out by multiplying a transmit signal by a spreading-code sequence. This multiplication can be implemented by an exclusive-OR operation (EXOR). Accordingly, a series arrangement of two spreading circuits shown in FIG. 2(a) can be modified to an arrangement for producing a spreading-code sequence SCD1 by performing an EXOR operation between the first and second code sequences C1, PN1, as illustrated in FIG. 2(b), and modulating the transmit data Cdata with this spreading-code sequence SCD1. The arrangement of FIG. 2(b) can be further modified, as shown in FIG. 2(c), using a spreading-code sequence generator SCG1 that generates the spreading-code sequence SCD1. That is, spreading the transmit data Cdata by the first and second code sequences C1, PN1 is equivalent to spreading the transmit data Cdata by the spreading-code sequence SCD1 obtained by combining (EXOR-ing) the first and second code sequences C1, PN1.

A cross-correlation detection controller CORR monitors the spreading-code sequence SCD1, which has been obtained by combining (EXOR-ing) the first and second code sequences C1, PN1, and the spreading-code sequence SCD2, which has been obtained by combining (EXOR-ing) the first and second code sequences C2, PN2, continuously calculates the cross-correlation values between these two spreading-code sequences SCD1, SCD2 on a per-symbol basis, checks to determine whether the cross-correlation value has exceeded a predetermined threshold value REF, and outputs the control signal STP, which orders stoppage of the transmit signal over the duration of one symbol, when the cross-correlation value exceeds the threshold value, resulting in an increase in interference noise.

The delay unit DLY1 delays the transmit signal Sdata01 in such a manner that this transmit signal will enter the switch SW1 following the completion of calculation of the cross-correlation value. If control signal STP attains the high level, therefore, the switch SW1 inhibits passage of the transmit signal, which is output from the delay unit DLY1, for the duration of the corresponding symbol. Further, the delay unit DLY2 delays the transmit signal Sdata02 for a length of time equivalent to that of the delay applied by the delay unit DLY1. As a result, the transmit signal Sdata 1 that has undergone switching control and the transmit signal Sdata2 that has not undergone switching control emanate into space from the antennas ANT1, ANT2. In the foregoing, control for halting transmission is performed using the switch SW1. However, it can also be so arranged that control for halting transmission is performed by turning the operation of the spread-spectrum modulator or transmit-signal amplifier (not shown) on and off.

On the receiving side, pseudo-noise generators PNG21, PNG22 generate noise codes PN1', PN2' identical with the spreading-code sequences PN1, PN2 used in spread-spectrum modulation on the transmitting side, and code-sequence generators CGEN-21, CGEN-22 generate channel-code sequences C1', C2' identical with the spreading-code sequences C1, C2 used in spread-spectrum modulation on the transmitting side. Despreading circuits RSC21, RSC22 apply despread processing to receive signals Sdata1', Sdata2' using these noise-code sequences PN1', PN2', and despreading circuits RSC21', RSC22' apply further despread processing using the spreading-code sequences C1', C2'. Channel decoders CH-dec1, CH-dec2 subject the despread signals Cdata1', Cdata2', which are output from despreading circuits, to error-correction decoding processing, generate final receive data Data1', Data2' and output this data. At this time the symbol not transmitted to the receiving apparatus owing to partial halting of transmission on the transmitting side is reproduced by the channel decoders CD-dec1, CH-dec2.

In accordance with the first embodiment, one transmission system halts sending of the transmit signal over a symbol interval in which interference noise becomes large. As a result, interference noise inflicted upon the other transmission system decreases so that communication can be performed in excellent fashion. Further, since the transmission system in which sending of the transmit signal has been halted is capable of restoring the unsent data by error-correction decoding processing, no problems arise.

Figure 3:
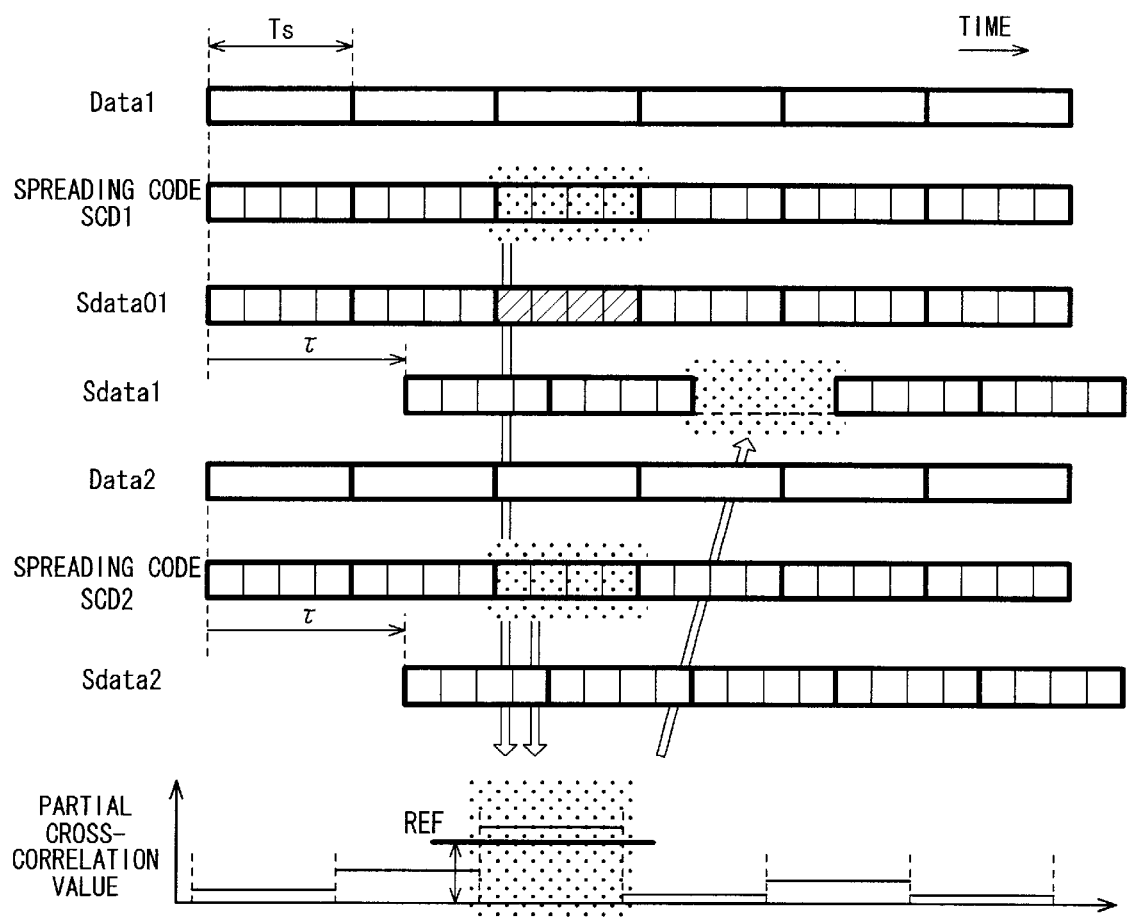
FIG. 3 is a diagram useful in describing operation timing of the first embodiment.

FIG. 3 is a diagram useful in describing processing timing within the transmitting apparatus of the first embodiment. The portions of the spreading-code sequences SCD1, SCD2 indicated by the shading are symbol portions where cross-correlation worsens locally. If the fact that the correlation value has exceeded the threshold value REF is detected, transmission of the transmit data Sdata01 over this symbol portion (see the hatched portion of this transmit data) is halted by the switch SW1.

Figure 4:
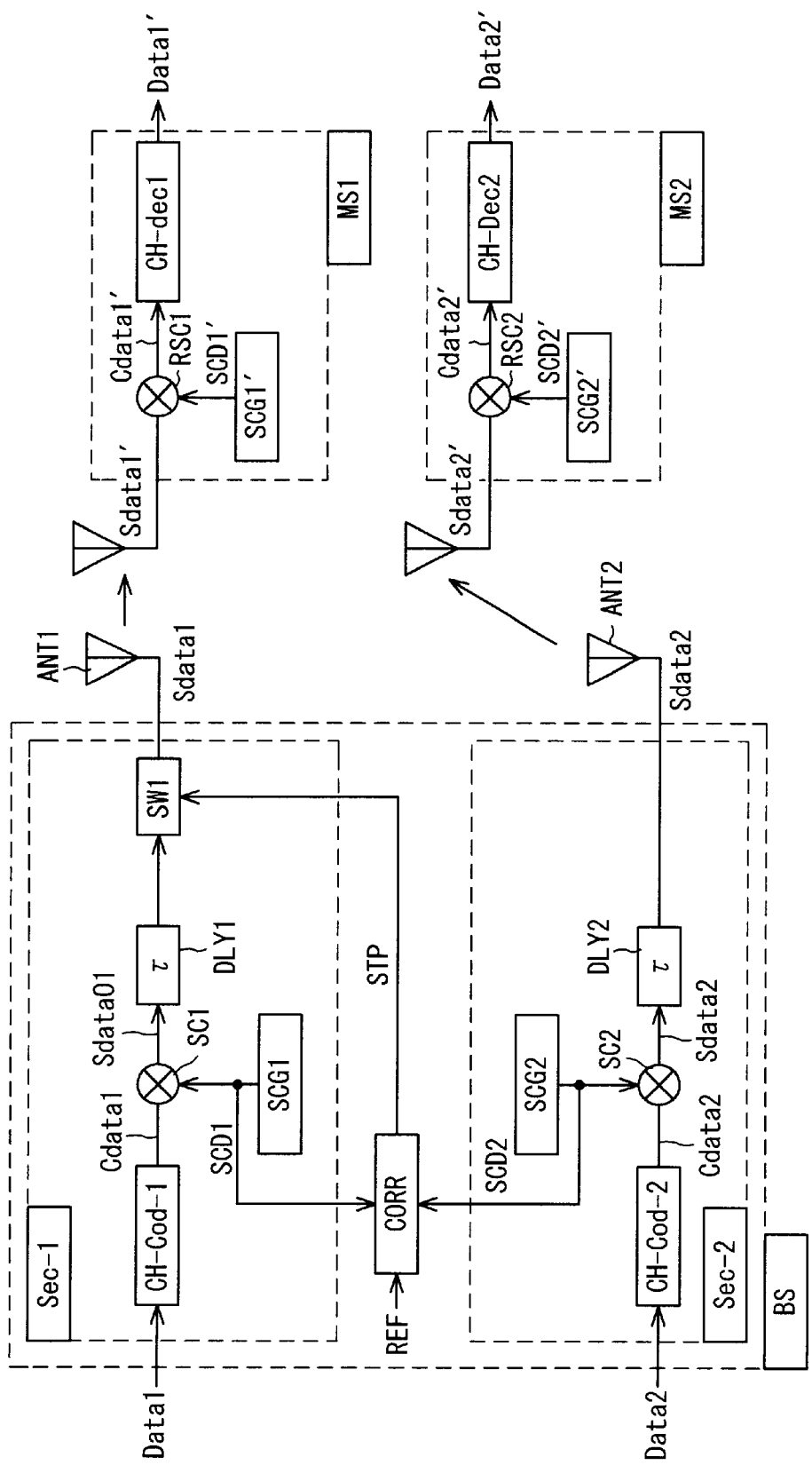
FIG. 4 shows another example of representation of the first embodiment.

FIG. 4 illustrates an arrangement obtained by rewriting the arrangement of FIG. 1 in accordance with the modification of FIG. 2. Here components identical with those of the first embodiment of FIG. 1 are designated by like reference characters. In all of the embodiments that follow, spreading codes will be indicated in a manner similar to this representation. In the base station (transmitting apparatus) BS, reference characters SCG1, SCG2 denote the spreading-code sequence generators for generating the spreading-code sequences SCD1, SCD2, and SC1, SC2 denote spreading circuits. Further, in the receiving apparatus MS1, MS2, reference characters SCG1', SCG2' represent despreading-code sequence generators for generating the despreading-code sequences SCD1', SCD2', which are identical with the spreading-code sequences SCD1, SCD2 on the transmitting side, and RSC1, RSC2 denote despreading circuits.

The foregoing is described with regard to a single combination of spreading-code sequences, in which the spreading-code sequences used in respective ones of the mutually adjacent sectors are SCD1, SCD2. In actuality, however, there are multiple combinations of spreading-code sequences and the above-described control is performed with regard to the necessary combinations. The same holds true in the embodiments and modifications to follow.

Structure of Cross-correlation Detection Controller

Figure 5:
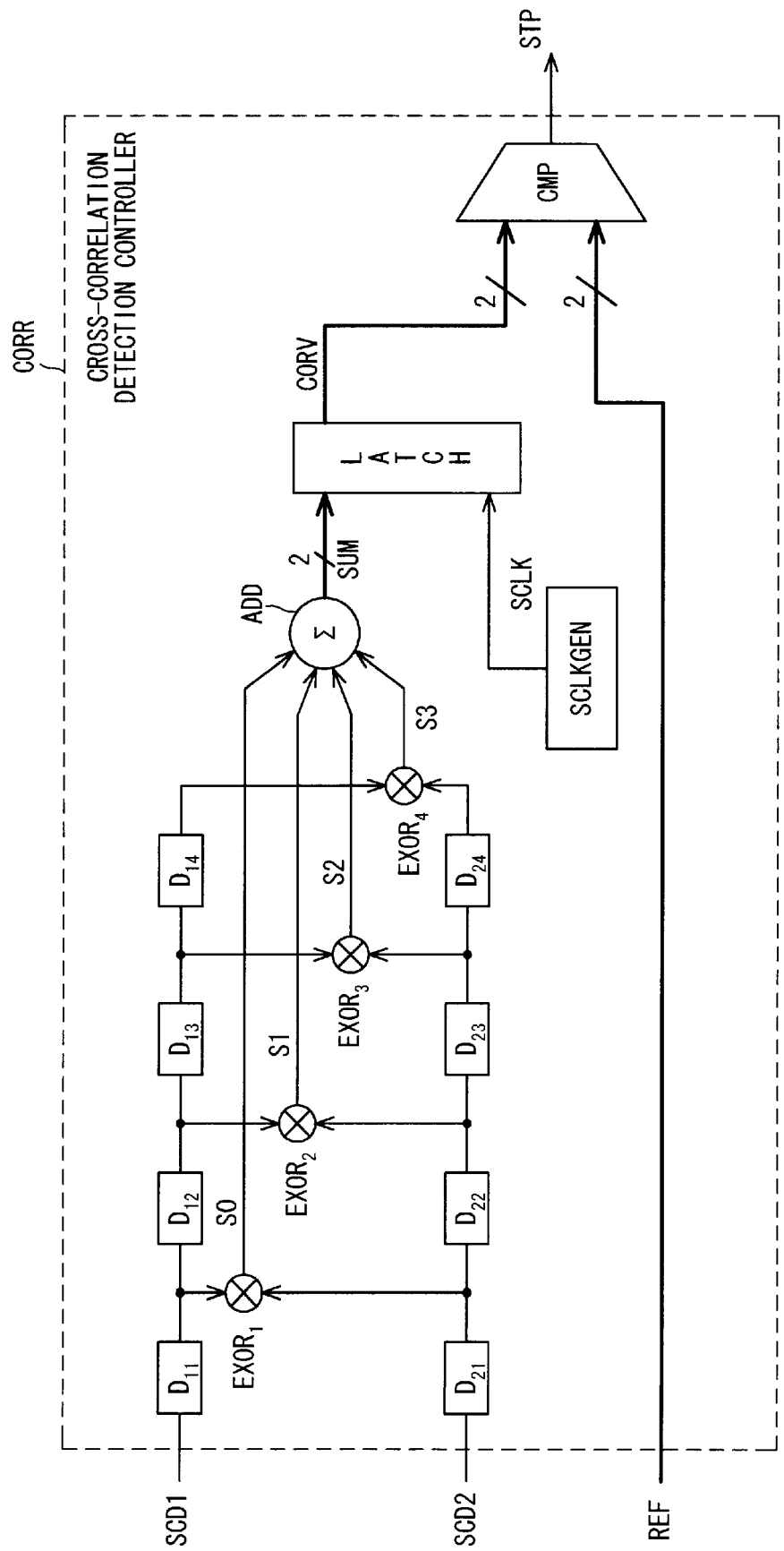
FIG. 5 is a block diagram of a cross-correlation detection controller.
Figure 6:
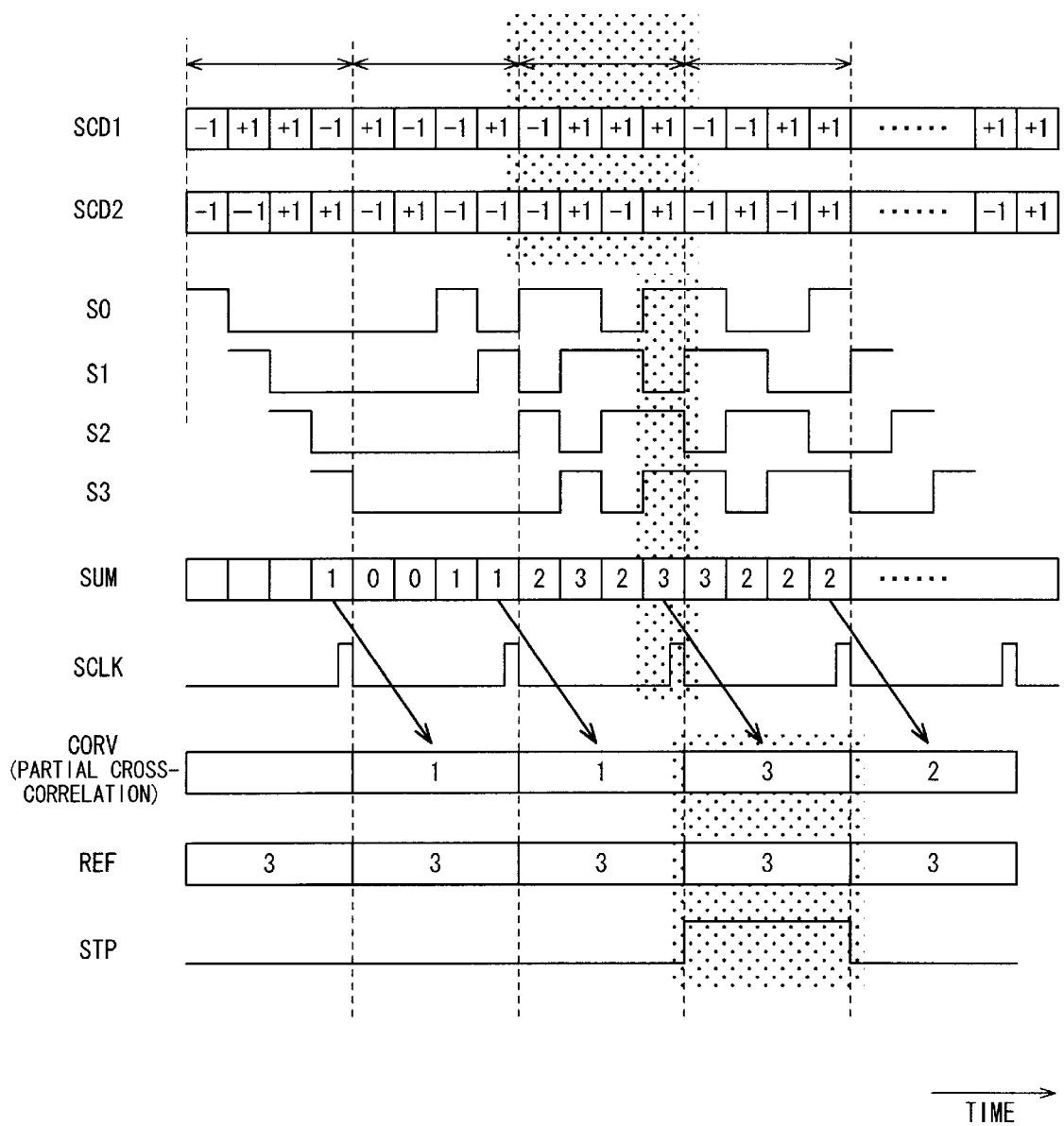
FIG. 6 is a diagram useful in describing the operation of this cross-correlation detection controller.

FIG. 5 is a block diagram of the cross-correlation detection controller CORR, and FIG. 6 is a diagram useful in describing the operation thereof. This illustrates a case where partial correlation of despreading-code sequences is detected at such time that the spreading rate is 4. In FIGS. 5 and 6, reference characters SCD1, SCD2 represent spreading-code sequences of two systems between which cross-correlation is found; these are the outputs of the spreading-code sequence generators SCG1, SCG2 of FIG. 4. Further, reference characters STP represent the control signal for controlling stoppage/passage of the transmit signal that enters the switch SW1 in FIG. 4.

The input spreading-code sequences of the two systems are each delayed a total of four chips in succession by delay units $D_{11}$ to $D_{14}$, $D_{21}$ to $D_{24}$, respectively, which act as one-chip delay elements. The outputs of the delay units $D_{11}$ to $D_{14}$ of one system are input to exclusive-OR circuits $EXOR_1$ to $EXOR_4$ together with the outputs of the delay units $D_{21}$ to $D_{24}$ of the corresponding system. The exclusive-OR circuits $EXOR_1$ to $EXOR_4$ output signals S0 to S3 depending upon whether the values of the two inputs coincide or not. An adder ADD refers to the four signals S0 to S3 input thereto, counts up the signals that indicate coincidence and outputs a result SUM, which indicates the count, in the form of a 2-bit signal. The counting result SUM is latched in a latching unit LATCH using a symbol clock SCLK output from a clock generator SCLKGEN every symbol (four chips in this case). A comparator CMP compares the latched count (cross-correlation value on a per-symbol basis) CORV with the threshold value REF and outputs the high-level control signal STP if the cross-correlation value CORV is equal to or greater than the threshold value REF. As a result, the switch SW1 stops the passage of the transmit signal over a symbol interval during which the control signal STP is at the high level, i.e., over a symbol interval during which interference noise is great.

The foregoing is described in regard to a case where spreading rate=4 holds. However, if the spreading rate is larger, the arrangement adopted is such that (1) the number of delay-element stages is increased correspondingly, (2) the number of corresponding signals added by the adder ADD is increased, and (3) the number of information bits in the addition result SUM, the value CORV obtained by latching the sum and threshold value REF is increased.

Another Structure of Cross-correlation Detection Controller

Figure 7:
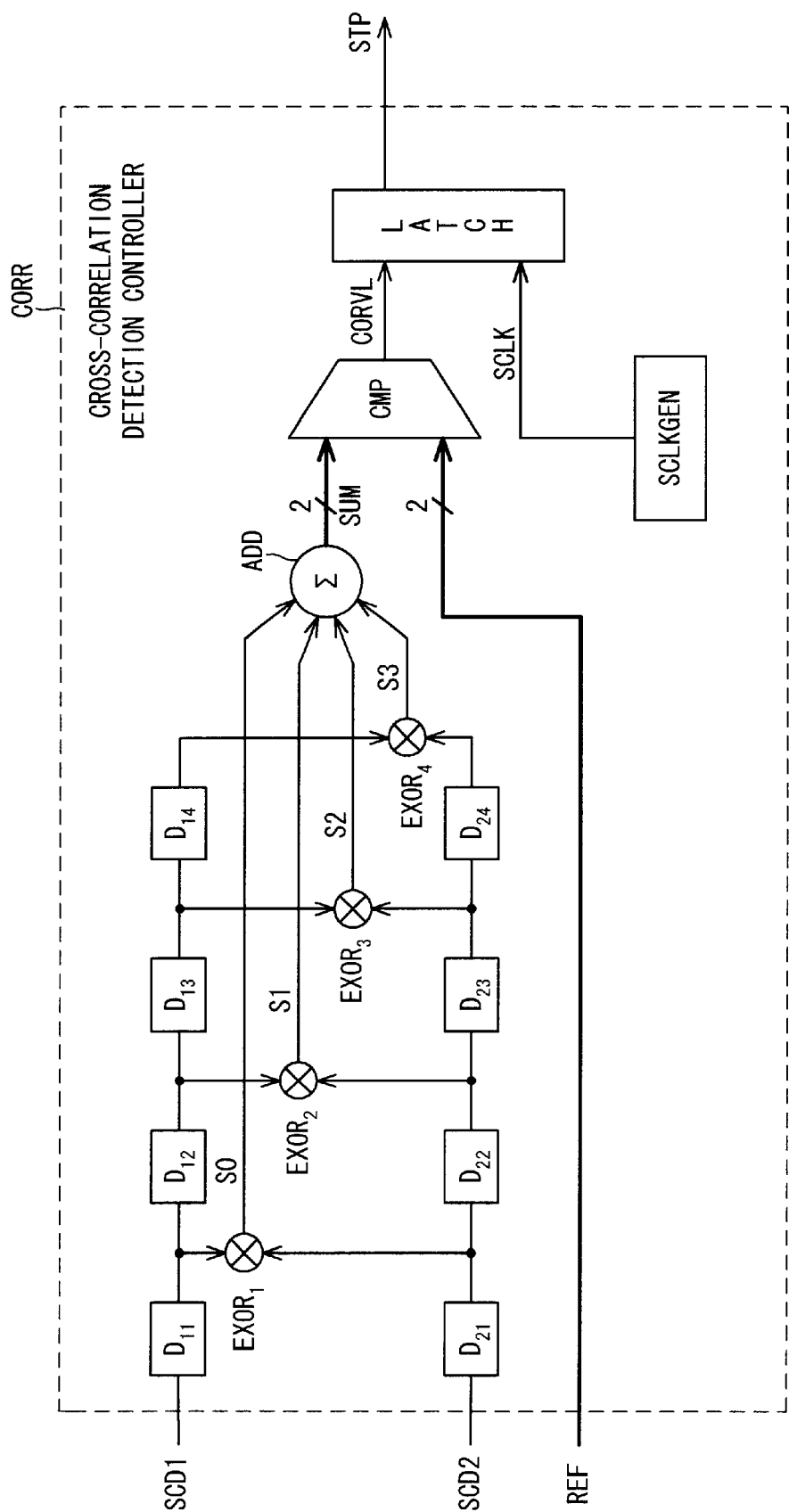
FIG. 7 is block diagram showing another structure of a cross-correlation detection controller.
Figure 8:
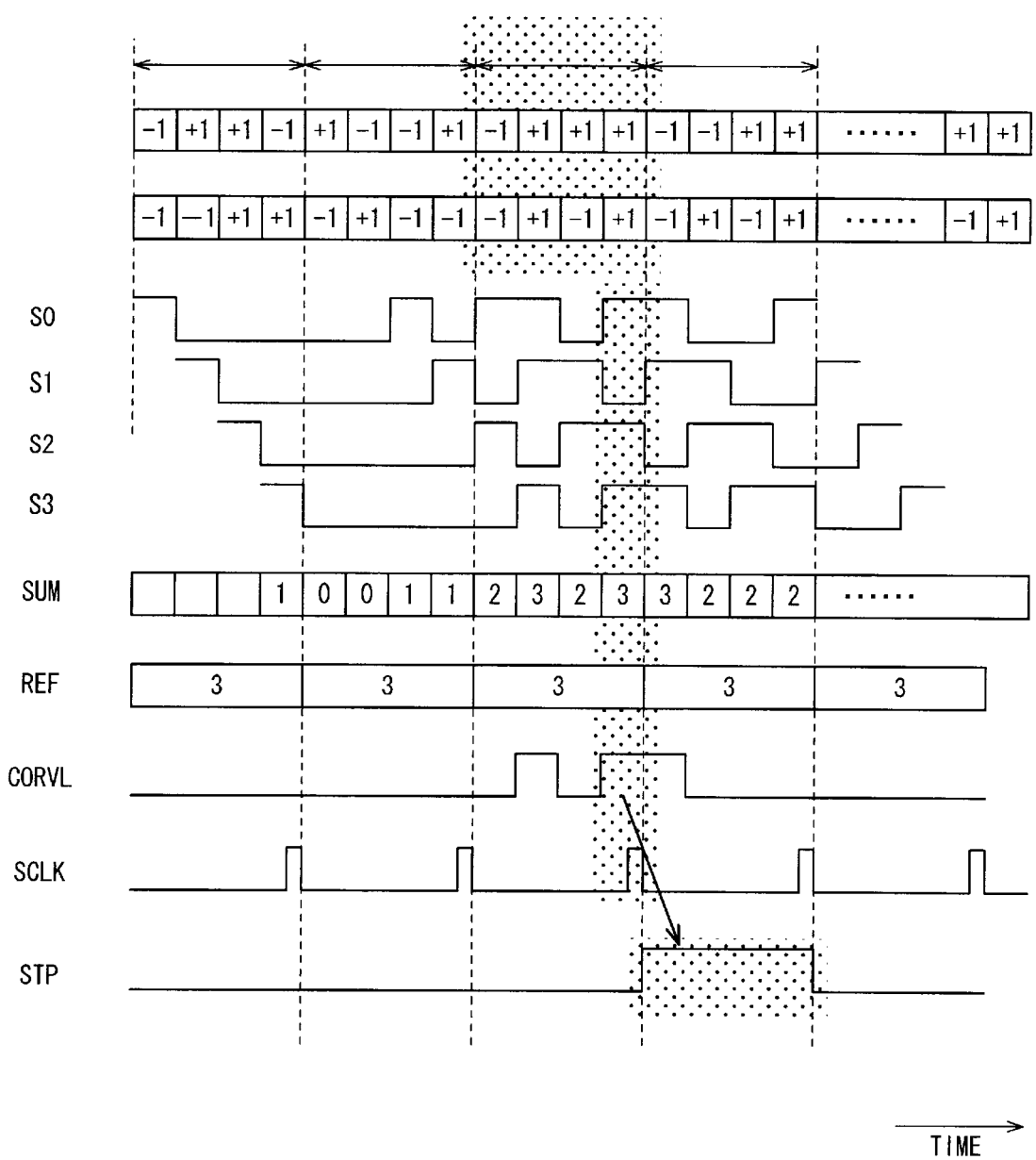
FIG. 8 is a diagram useful in describing the operation of this cross-correlation detection controller.

FIG. 7 is a block diagram showing another structure of the cross-correlation detection controller CORR, and FIG. 8 is a diagram useful in describing the operation thereof. In FIG. 7, components identical with those of the structure shown in FIG. 5 are designated by like reference characters. The difference here is that in the cross-correlation detector, the addition result (cross-correlation value) SUM and threshold value REF are compared, the result of the comparison is latched in sync with the symbol clock SCLK and the control signal STP is output from the latching unit LATCH. In FIG. 7, operation up to where the adder ADD refers to the four signals S0 to S3, counts up the signals that indicate coincidence and outputs the counting result SUM in the form of a 2-bit signal is the same as operation is FIG. 5. The comparator CMP compares the counting result SUM and the threshold value REF at the chip cycle and outputs a high-level signal CORVL if SUM·REF holds. The latch unit LATCH latches the signal CORVL in sync with the symbol clock SCLK, which is output every symbol (four chips), and outputs the latched signal as the control signal STP.

First Modification

Figure 9:
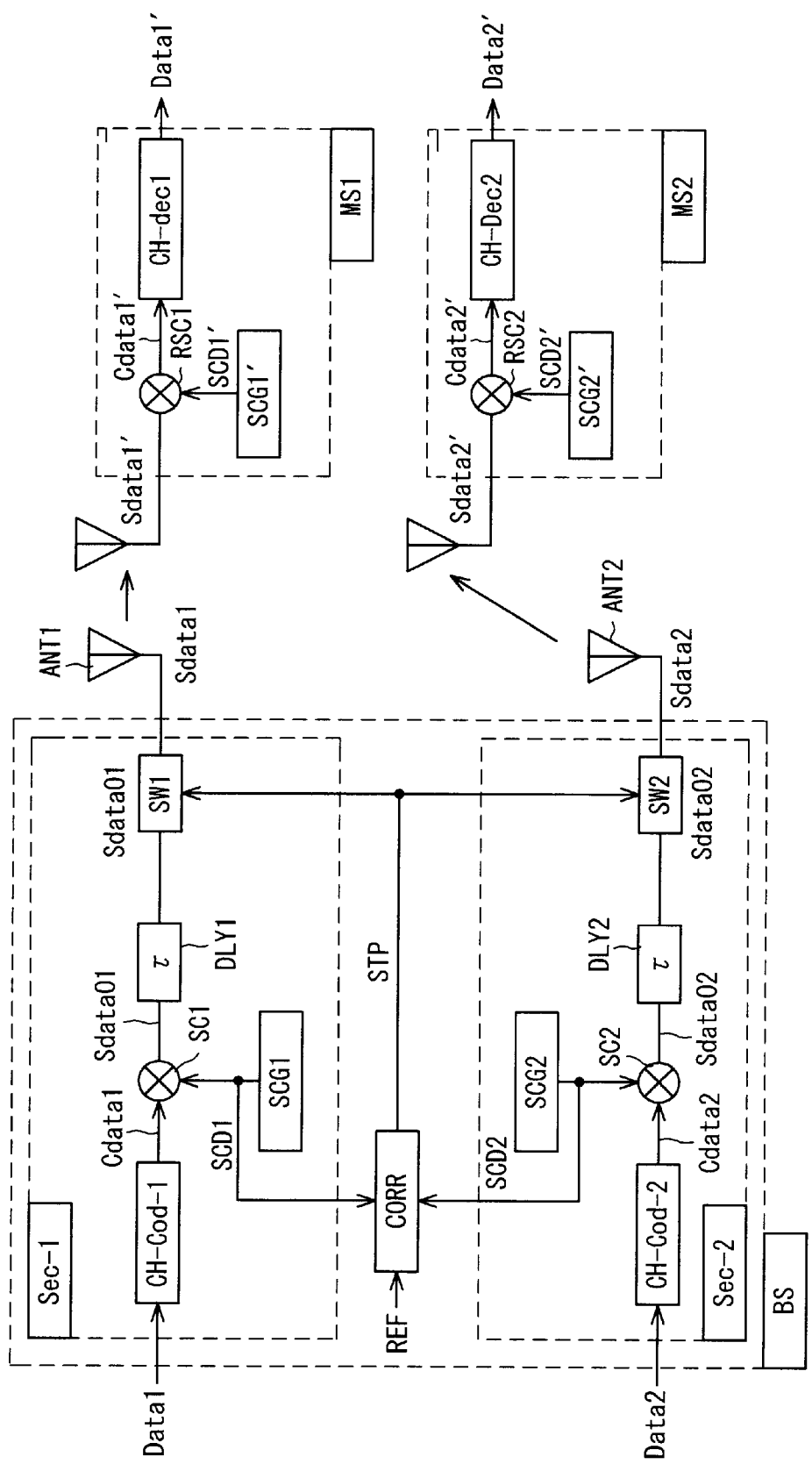
FIG. 9 shows a first modification of the first embodiment.
Figure 10:
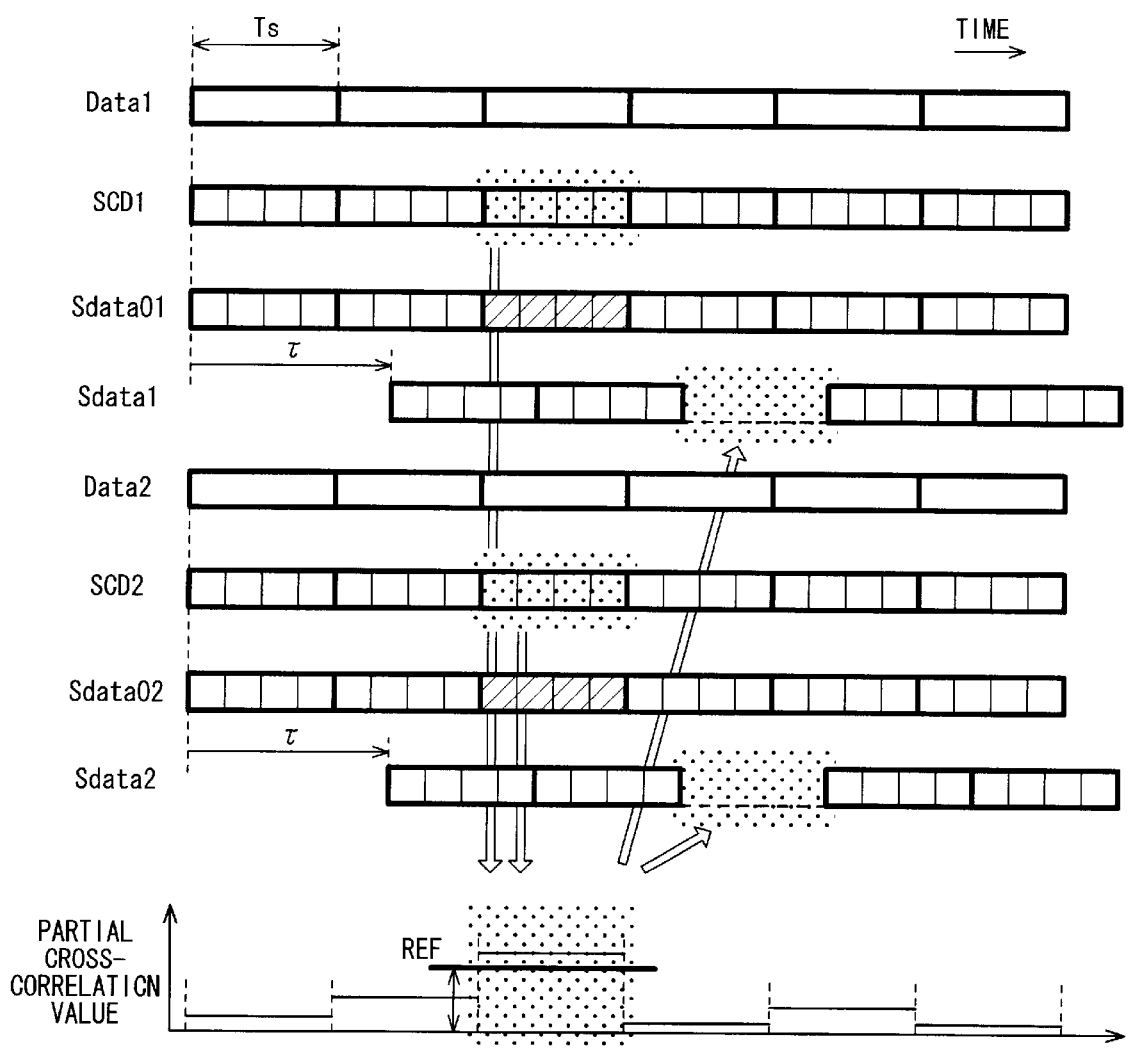
FIG. 10 is a diagram useful in describing operation timing of the modification.

FIG. 9 is a first modification of the first embodiment, in which components identical with those of FIG. 4 are designated by like reference characters. This modification differs from the first embodiment in that a switch SW2 is provided on the output side of the delay unit DLY2 in sector Sec-2, symbol-by-symbol transmission of the transmit data Sdata01 is controlled by the control signal STP, and symbol-by-symbol transmission of the transmit signal Sdata02 is controlled by the control signal STP. FIG. 10 is a diagram useful in describing operation timing of the first modification. The portions of the spreading-code sequences SCD1, SCD2 indicated by the shading are symbol portions where cross-correlation worsens locally. If the fact that the correlation value has exceeded the threshold value REF is detected, transmission of the transmit data Sdata01 and Sdata02 over this symbol portion (see the hatched portions of this transmit data) is halted by the switches SW1, SW2.

In accordance with this modification, all of the transmission systems halt sending of their transmit signals over a symbol interval in which interference noise becomes large. As a result, interference noise in each of the transmission systems decreases so that communication can be performed in excellent fashion. Further, since each of transmission systems is capable of restoring the unsent data by error-correction decoding processing, no problems arise.

Second Modification

Figure 11:
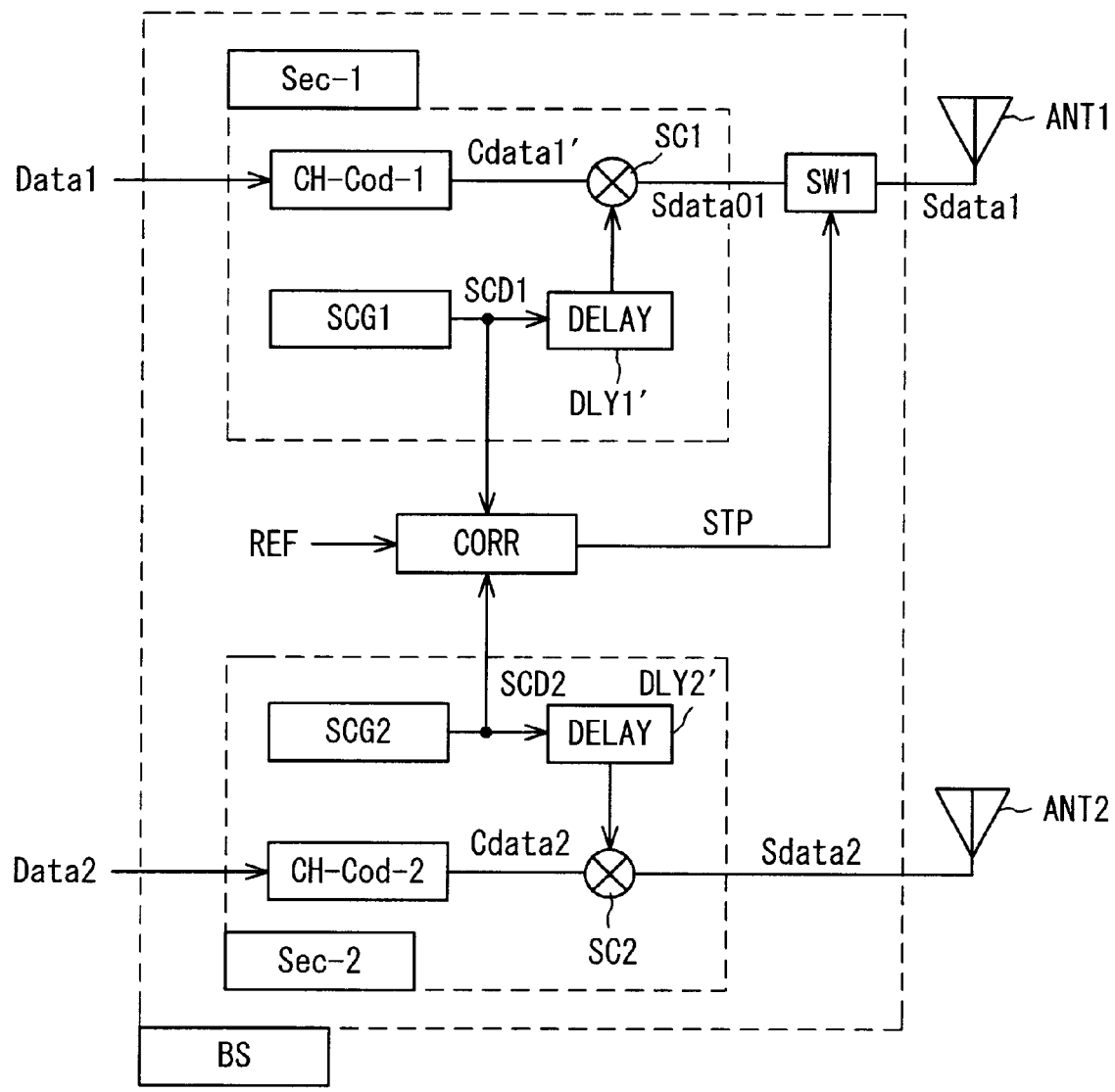
FIG. 11 is a block diagram of a transmitting section according to a second modification.

FIG. 11 is a second modification of the first embodiment and shows only the side of the transmitting apparatus. Components in the second modification identical with those of the first embodiment in FIG. 4 are designated by like reference characters. This modification differs in the locations of delay units DLY1', DLY2'. In the first embodiment, the transmit signals output from the spreading circuits SC1, SC2 are delayed so that a transmit signal will enter the switch SW1 upon completion of calculation of the cross-correlation value.

In the second modification, however, the spreading-code sequences SCD1, SCD2 are delayed a period of time necessary for calculation of the cross-correlation between the spreading-code sequences SCD1, SCD2, and the symbol timing of the spread-spectrum modulated output is made to coincide with the timing of the control signal STP, symbol by symbol, output by from the cross-correlation detection controller CORR.

The transmitting apparatus BS subjects the two transmit signals Data1, Data2 to error-correction encoding processing using the channel encoders CH-code1, CH-code2 and generates encoded transmit signals Cdata1, Cdata2. The spreading-code sequence generators SCG1, SCG2 generate the spreading-code sequences SCD1, SCD2 for spread-spectrum modulating the transmit signals. The delay units DLY1', DLY2' delay these spreading-code sequences SCD1, SCD2 by $\tau'$, and the spreading circuits SC1, SC2 spread-spectrum modulate the transmit signals Cdata1, Cdata2 by the delayed spreading-code sequences SCD1, SCD2 and output the transmit signals Sdata01, Sdata02. The cross-correlation detection controller CORR monitors the spreading-code sequences SCD1, SCD2. When the cross-correlation value per symbol of these two spreading-code sequences exceeds the predetermined threshold value REF, the cross-correlation detection controller CORR sends the switch SW1 the control signal STP for halting one symbol of the transmission of the spread-spectrum modulated transmit signal Sdata01.

If the control signal STP attains the high level, the switch SW1 inhibits passage of the transmit signal, which is output from the spreading circuit SC1, for the duration of the corresponding symbol. As a result, the transmit signal Sdata1 that has undergone switching control and the transmit signal Sdata2 that has not undergone switching control emanate into space from the antennas ANT1, ANT2. Operation on the receiving side is the same as that of the first embodiment.

Third Modification

Figure 12:
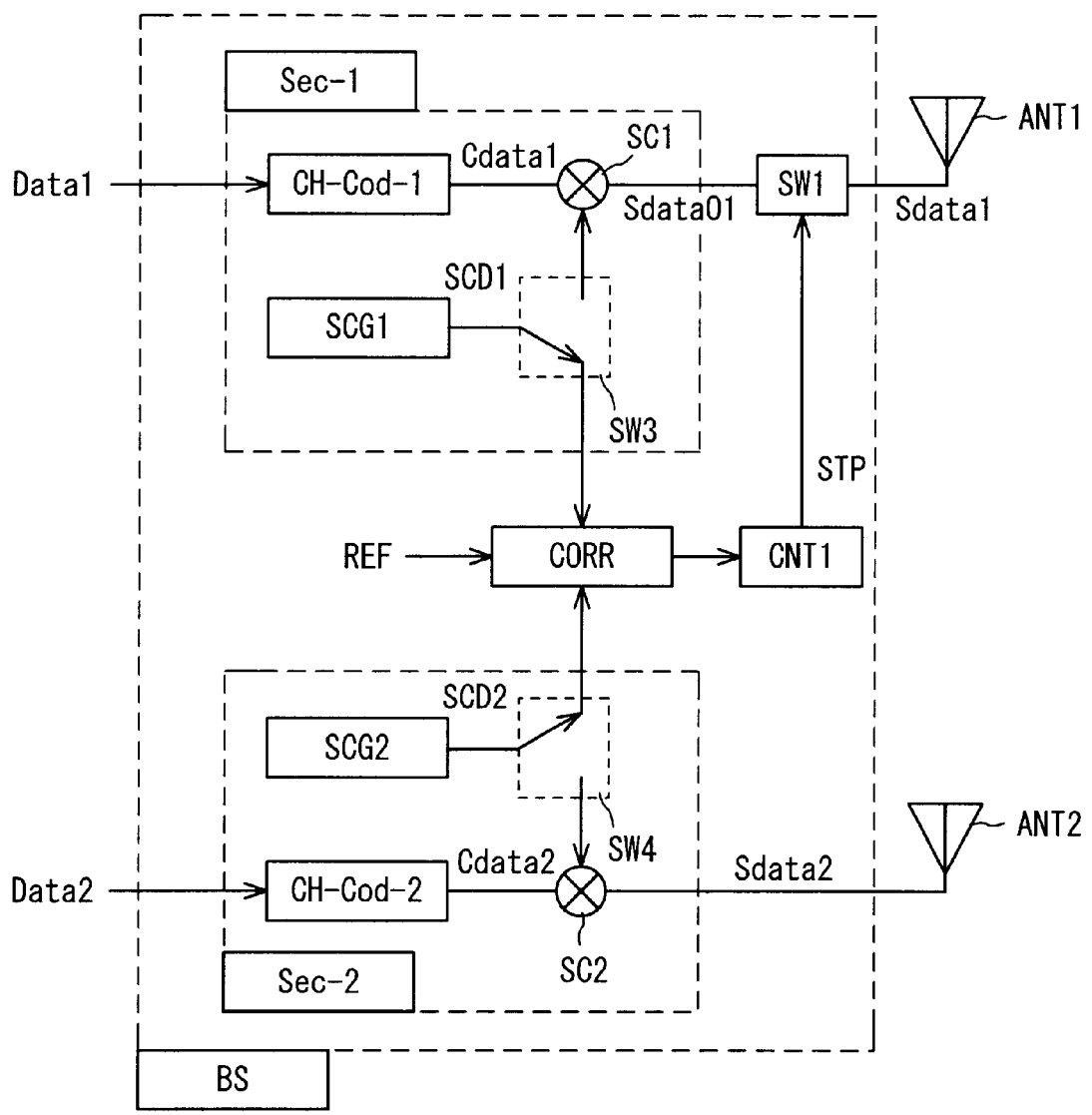
FIG. 12 is a block diagram of a transmitting section according to a third modification.

FIG. 12 is a third modification of the first embodiment, in which components identical with those of the first embodiment in FIG. 4 are designated by like reference characters. This illustrates only the side of the transmitting apparatus. The third embodiment differs from the first embodiment in that the calculation of the cross-correlation between the two spreading-code sequences is either performed in real time (the first embodiment) or executed in advance (the third modification).

Before communication starts, switches SW3, SW4 input the spreading-code sequences SCD1, SCD2, which are output from the despreading-code sequence generators SCG1, SCG2, to the cross-correlation detector CORR. The latter calculates the symbol-by-symbol cross-correlation value between these spreading-code sequences SCD1, SCD2, checks to determine whether the cross-correlation value exceeds the threshold value REF and outputs this symbol position to a controller CNT1 if the threshold value is exceeded. The cross-correlation detection controller CORR executes the above-described processing until the initial spreading-code sequences SCD1, SCD2 appear again (after one period), and the controller CNT1 saves all symbol positions for which the cross-correlation value exceeds the predetermined threshold value REF.

If the above preprocessing is completed, the switches SW3, SW4 change over the output destinations of the spreading-code sequences SCD1, SD2 to the spreading circuits SC1, SC2. The spreading circuits SC1, SC2 spread-spectrum modulate the transmit data Cdata1, Cdata2 by the spreading-code sequences SCD1, SCD2, and an input is made to the switch SW1. The controller CNT1 outputs the control signal STP that attains the high level at the position of the symbol where the cross-correlation value exceeds the threshold value REF.

If the control signal STP attains the high level, the switch SW1 inhibits passage of the transmit signal, which is output from the spreading circuit SC1, for the duration of the corresponding one symbol. As a result, the transmit signal Sdata1 that has undergone switching control and the transmit signal Sdata2 that has not undergone switching control emanate into space from the antennas ANT1, ANT2.

Fourth Modification

Figure 13:
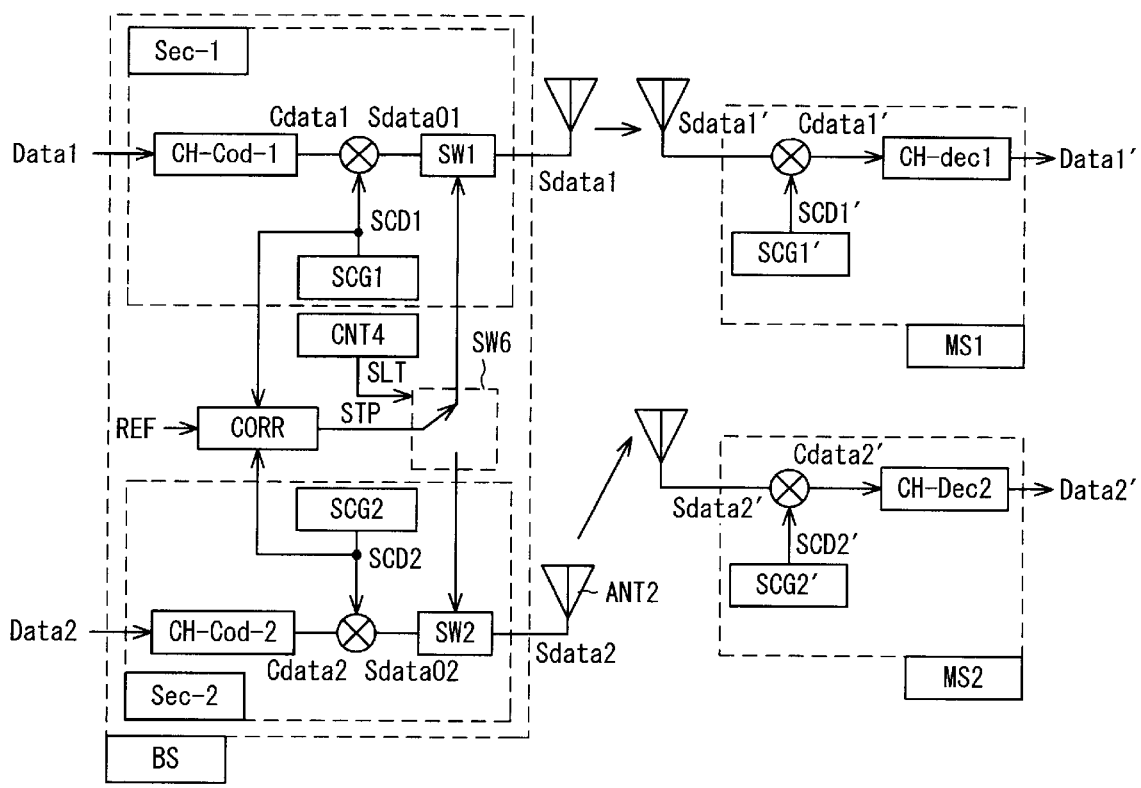
FIG. 13 is a block diagram of a fourth modification of the first embodiment.

FIG. 13 is a fourth modification of the first embodiment, in which components identical with those of the first modification in FIG. 9 are designated by like reference characters. The fourth modification differs from the first modification in the following respects:

(1) A controller CNT4 and a switch SW6 are provided.
(2) The controller CNT4 compares the magnitudes of the spreading rates of the respective transmission systems and outputs a select signal SLT which, on the basis of the spreading-rate magnitudes, selects the transmission system in which transmission is to be halted.
(3) On the basis of the select signal SLT, the switch SW6 inputs the control signal STP, which is output from the cross-correlation detection controller CORR, to whichever of the switches SW1, SW2 belongs to the transmission system having the smaller spreading rate.
(4) When the symbol-by-symbol cross-correlation value exceeds the threshold value REF, transmission of the transmit signal in the transmission system having the smaller spreading rate is halted for the above-mentioned symbol duration.

The delay units DLY1, DLY2 are not shown in the fourth modification.

Figure 14:
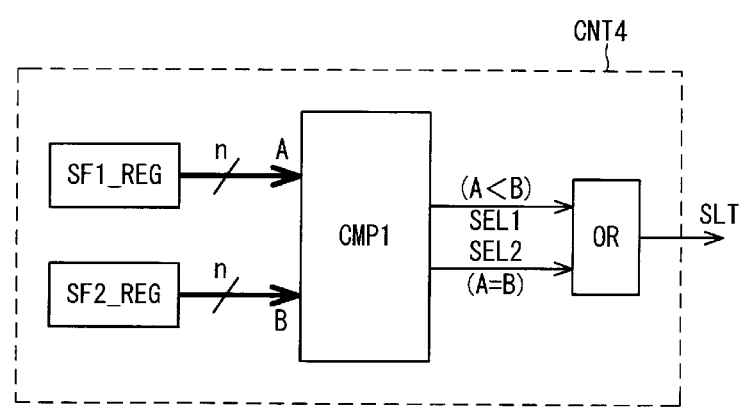
FIG. 14 is a block diagram of a controller.

FIG. 14 is a block diagram of the controller CNT4. Spreading-rate setting registers SF1_REG, SF2-REG store spreading rates A, B in a case where the transmit data Data1, Data2 is spread by the spreading-code sequences SCD1, SCD2, respectively. The spreading rates A, B are each expressed n bits. A comparator CMP1 compares the magnitudes of the two spreading rates A, B. If A<B or A=B holds, the comparator CMP1 outputs high-level select signals SEL1, SEL2. An OR gate OR calculates the OR between these two signals and outputs the signal SLT. The signal SLT is used as a control signal of the switch SW6 in FIG. 13. As a result, (1) the control signal STP output from the cross-correlation detection controller CORR is input to the switch SW1 if the spreading rate of the data Data1 is equal to or less than the data Data2, and (2) the control signal STP output from the cross-correlation detection controller CORR is input to the switch SW2 if the spreading rate of the data Data1 is greater than the data Data2.

In accordance with the fourth modification, transmission for which the spreading rate is smaller is halted. That is, high-speed data transmission requiring a large amount of power is halted. As a result, the effect of reducing interference noise can be enhanced and the efficiency of the overall system can be improved.

Fifth Modification

Figure 15:
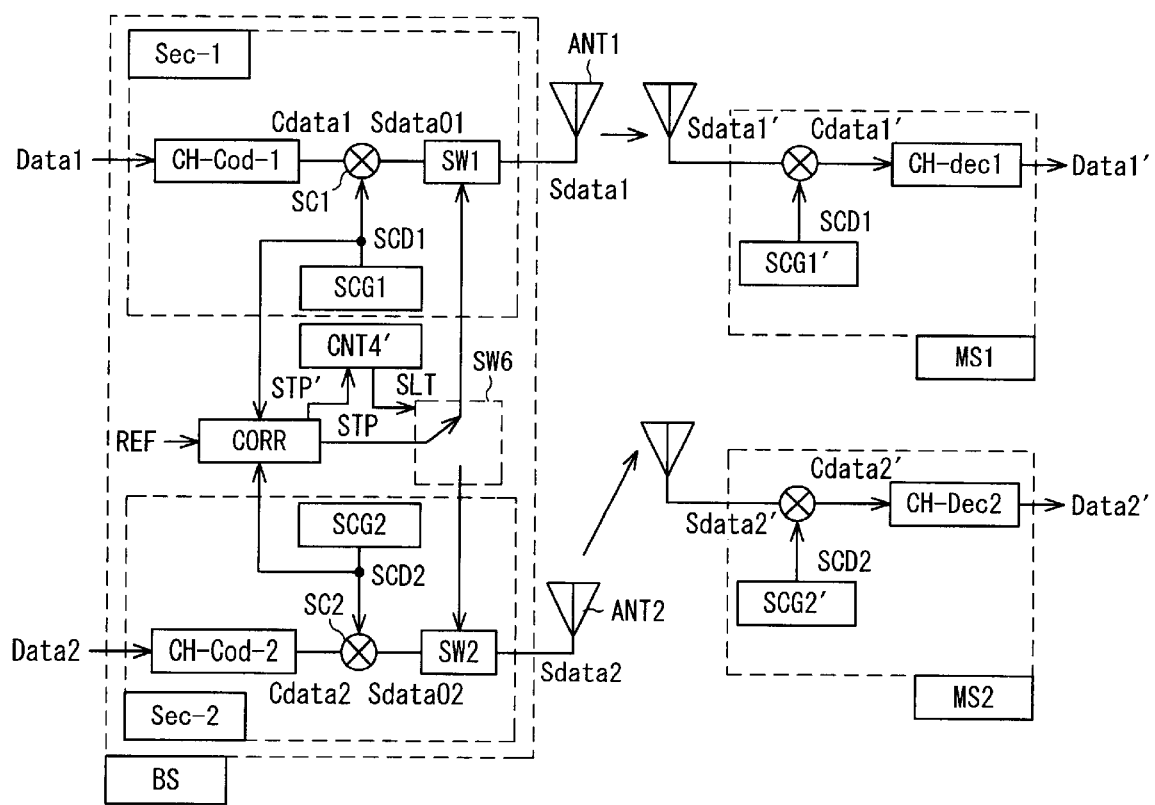
FIG. 15 is a block diagram of a fifth modification of the first embodiment.

FIG. 15 is a fifth modification of the first embodiment, in which components identical with those of the first modification in FIG. 9 are designated by like reference characters. The fifth modification differs from the first modification in the following respects:

(1) A controller CNT4' and the switch SW6 are provided.
(2) Whenever the symbol-by-symbol cross-correlation value exceeds the threshold value REF, the controller CNT4' outputs select signal SLT for selecting randomly, in regular order or in accordance with a predetermined procedure, the transmit signals Sdata01, Sdata02 whose transmission is to be halted.
(3) On the basis of the select signal SLT, the switch SW6 inputs the control signal STP, which is output from the cross-correlation detection controller CORR, to a prescribed one of the switches SW1, SW2 to halt the transmission of the transmit signal.

The delay units DLY1, DLY2 are not shown in the fifth modification.

Figure 16:
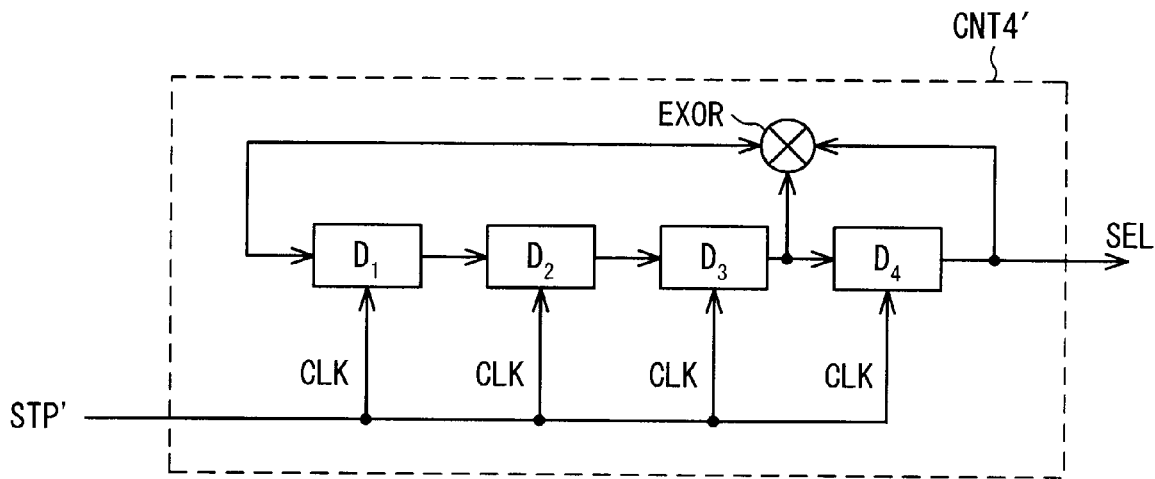
FIG. 16 shows an example of the structure of a controller CNT4' in a fifth modification (in case of a random selection)

FIG. 16 is a block diagram of the controller CNT4'. This is an embodiment for randomly selecting the transmit signal whose transmission is to be halted. In the Figure, STP' represents the rising edge of the control signal STP output from the cross-correlation detection controller CORR. This represents a pulse generated whenever the symbol-by-symbol cross-correlation value exceeds the threshold value REF. SEL is the select signal, which is a signal that specifies which of the transmit signals is to be halted. This signal is input to the switch SW6.

The controller CNT4' is constituted by an M-sequence generator (pseudo-random number generator) and outputs the select signal SEL randomly whenever the high-level control signal STP is generated. The M-sequence generator comprises flip-flops $D_1$ to $D_4$, which are cascade-connected in four stages in such a manner that content is shifted one bit at a time at each input of a pulse STP', namely a clock signal CLK, and an EXOR circuit for extracting a signal in accordance with a polynomial (X4+X+1=0) for generating an M sequence from part of the flip-flops, performing an exclusive-OR operation and feeding the result back to the leading flip-flop $D_1$. If initial values of the four flip-flops $D_1$ to $D_4$ are such that at least one of them is not "0", then the "0", "1" logic of the select signal SEL changes in accordance with the sequence of pseudo-random numbers whenever the pulse STP' is generated. As a result, the destination to which the control signal STP of the switch SW6 in FIG. 15 is sent is determined randomly by the "1", "0" logic of this sequence of pseudo-random numbers.

Figure 17:
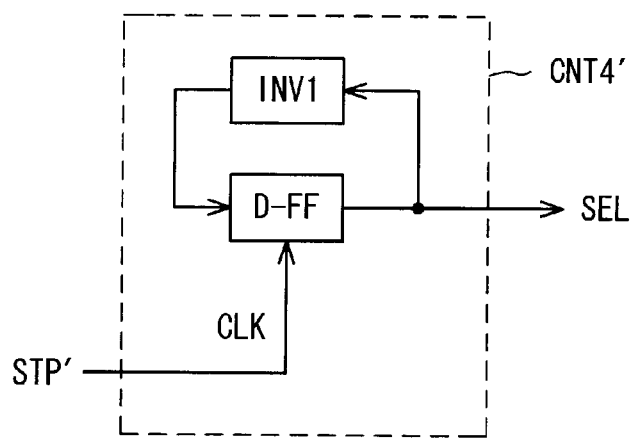
FIG. 17 shows an example of the structure of the controller CNT4' in the fifth modification (sequential selection)

FIG. 17 is block diagram showing another structure of the controller CNT4'. This is an embodiment in which the selection of the signal whose transmission is to be halted is performed in alternating fashion. The controller is constituted by a D-type flip-flop D-FF and an inverter INV1. The D-type flip-flop stores and outputs the level ("0", "1"), obtained by inverting the present output, whenever the pulse STP1 is generated. As a result, the transmission destination of the control signal STP of switch SW6 is changed over alternatingly. The foregoing is for a case where the number of transmit signals that undergo selection for stoppage is two. If the number of signals that undergo selection for stoppage is three or greater, then the controller CNT4' would constitute an n-bit counter circuit for counting the pulse signals STP', and a decoding circuit having a function for decoding the output of the counter circuit as $2^n$-number of necessary control signal lines.

Figure 18:
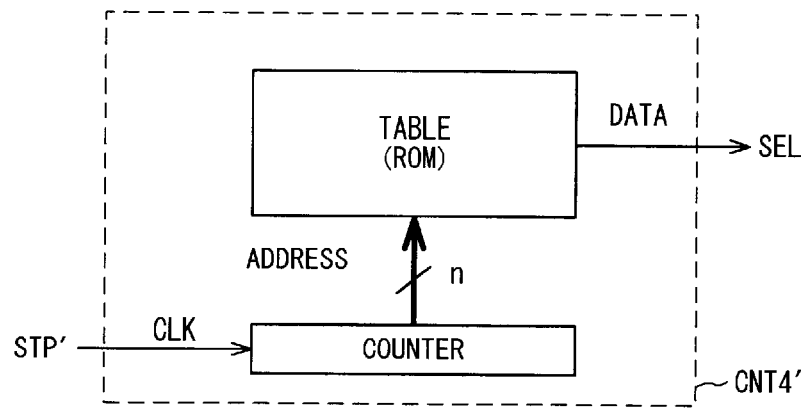
FIG. 18 shows an example of the structure of the controller CNT4' in the fifth modification (selection in a predetermined order)

FIG. 18 is a block diagram showing another structure of the controller CNT4'. This is a block diagram for a case where the signal whose transmission is to be halted is decided in accordance with a predetermined order. The controller CNT4' is constituted by an n-bit counting unit COUNTER counted up whenever the pulse STP' serving as the clock is input thereto, the counter returning to zero when the counted value reaches $2^n-1$; and a storage unit TABLE, to which the count is input as an n-bit address signal, for outputting 1-bit data ("0", "1") as the select signal SEL. Specifically, the storage unit TABLE can be constituted by a ROM having an n-bit address input and a 1-bit data output, wherein prescribed 1-bit data ("0", "1") has been stored in the order of the addresses.

Figure 19:
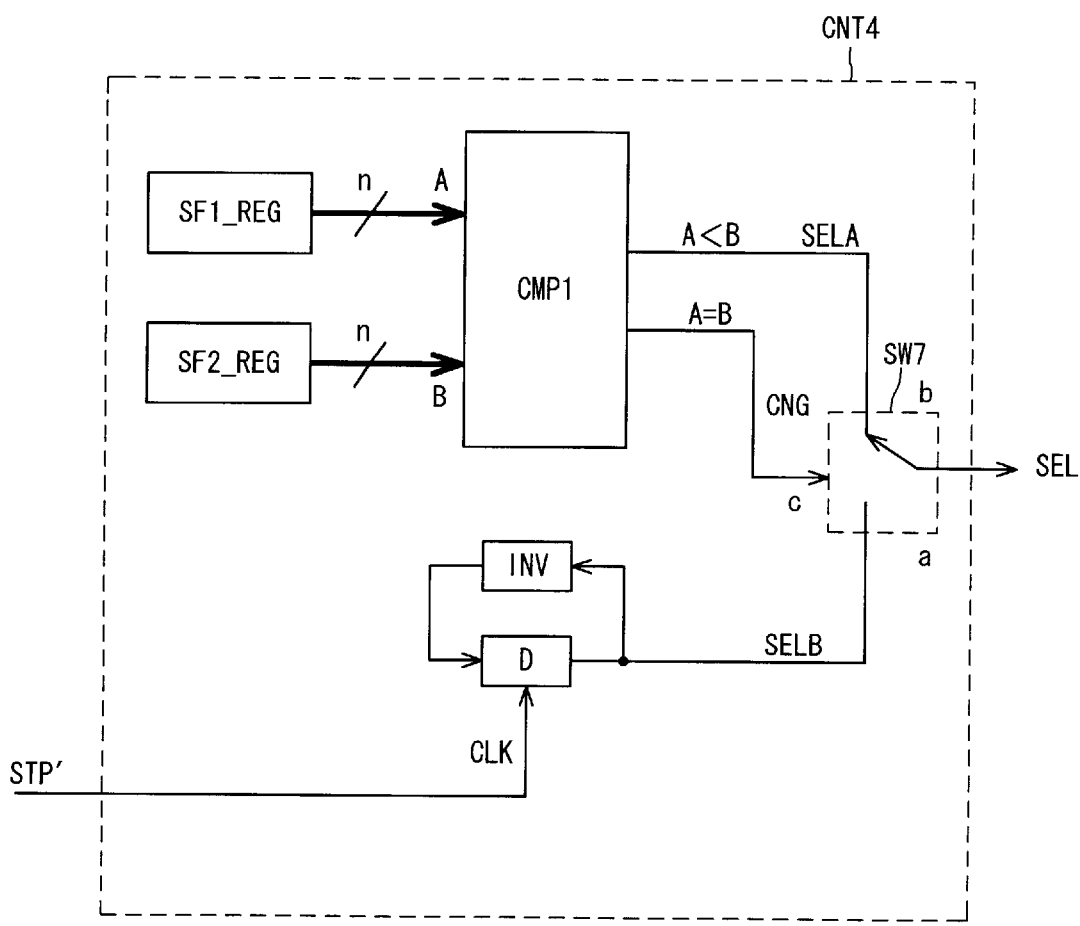
FIG. 19 shows an example of the structure of the controller CNT4' in the fifth embodiment (selection in a predetermined order)

FIG. 19 is a block diagram showing another structure of the controller CNT4'. This is another embodiment in which the selection of the signal whose transmission is to be halted is performed in alternating fashion. The controller CNT4' in FIG. 19 has the following functions for when a symbol-by-symbol transmit signal is halted: (1) a function for halting whichever transmit signal has the smaller spreading rate, and (2) a function of selecting the halted transmit signal alternatingly when the spreading rates are equal. The controller has a structure obtained by combining the structures shown in FIGS. 14 and 17.

The spreading-rate setting registers SF1_REG, SF2_REG store the spreading rates A, B in a case where the transmit data Data1, Data2 is spread by the spreading-code sequences SCD1, SCD2, respectively. The spreading rates A, B are each expressed n bits. The comparator CMP1 compares the magnitudes of the two spreading rates A, B. The comparator CMP1 outputs a high-level signal SELA if A<B holds, a low-level signal SELA if A>B holds, and a high-level changeover signal CHG if A=B holds. The D-type flip-flop D-FF outputs a signal SELB of a level ("0", "1"), obtained by inverting the present output, whenever the pulse STP' is generated.

If the changeover signal CHG is at the high level (A=B), a switch SW7 outputs the signal SELB, which is input to a terminal a, as the select signal SEL; otherwise, the switch SW7 outputs the signal SELA, which is input to a terminal b, as the select signal SEL. As a result, if the spreading rates A, B of the transmit signals are different, the smaller spreading rate is selected as the transmit-halt signal; if the spreading rates A, B are the same value, then the transmit-halt signals are selected alternatingly.

Sixth Modification

The foregoing has been described with regard to a case where transmission is halted based upon the cross-correlation value between spreading-code sequences. However, it is also possible to adopt an arrangement in which transmission is halted based upon a cross-correlation value between spread-spectrum modulated signals obtained by performing spread-spectrum modulation using first and second spreading-code sequences. Further, in the first embodiment, transmission is halted using a switch. However, it can be so arranged that transmission is halted by other means. These modifications hold true in similar fashion with regard to each of the embodiments below.

(B) Second Embodiment

Figure 20:
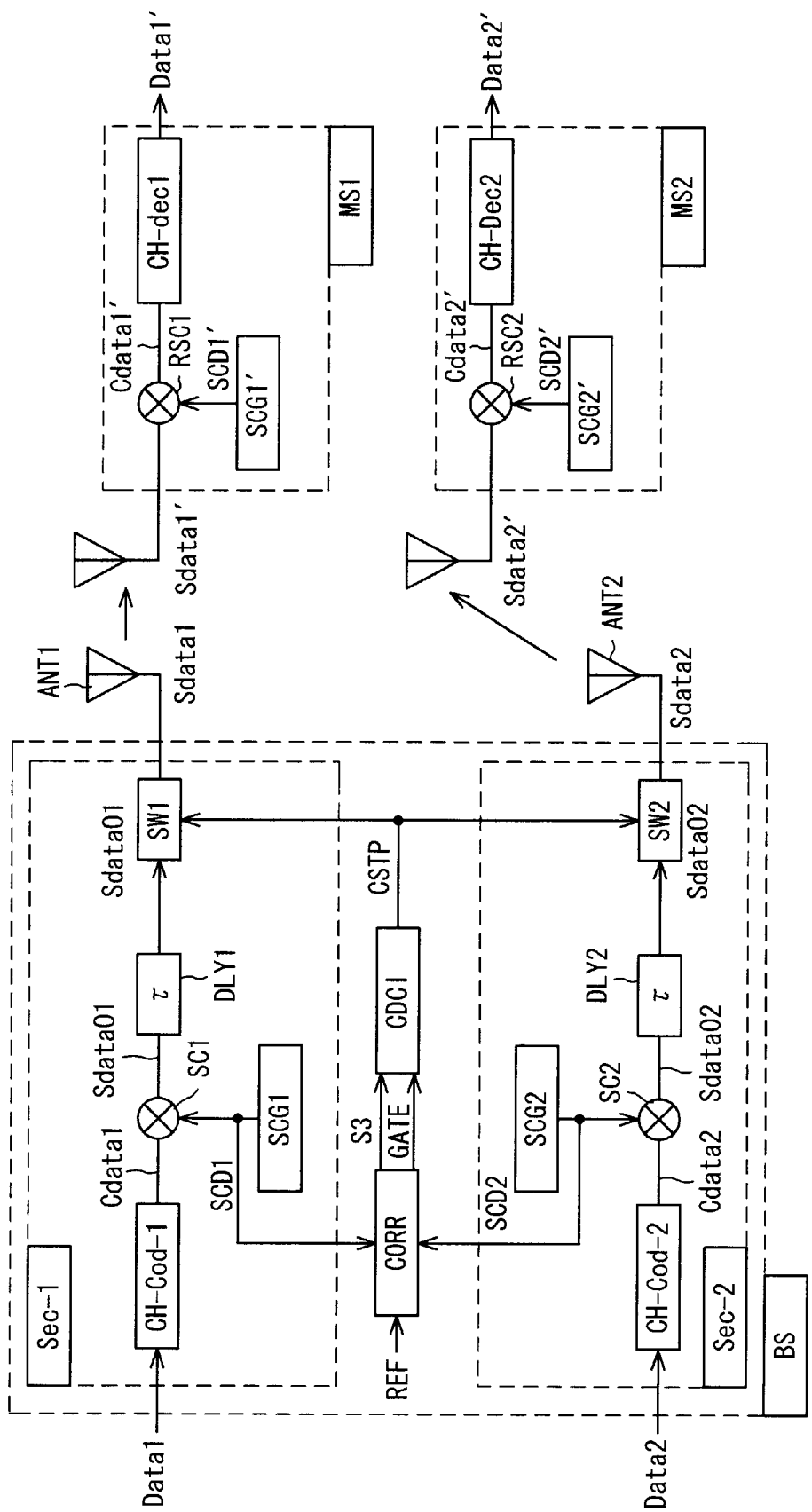
FIG. 20 is a block diagram of a code division multiple access communication system according to a second embodiment.

FIG. 20 is a block diagram of a code division multiple access communication system according to a second embodiment of the present invention. Here components identical with those of the first embodiment of FIG. 4 are designated by like reference characters. This embodiment differs in the following respects:

(1) There is provided a code-coincident-chip-detector CDCI which, when the symbol-by-symbol cross-correlation value CORV between the two spreading-code sequences SCD1, SCD2 is equal to or greater than the threshold value REF, detects chips whose codes coincide in a symbol interval and outputs the result.

(2) When the symbol-by-symbol cross-correlation value exceeds the threshold value REF, output of the transmit signals Sdata01, Sdata02 is halted in the code-coincident chip interval of the symbol interval and not over the entire symbol interval.

The channel coders CH-cod1, CH-cod2 in the sectors Sec1, Sec2 of the base station (transmitting apparatus) BS subject the two transmit signals Data1, Data2, respectively, to error-correction encoding and output encoded transmit signals Cdata1, Cdata2. Spreading circuits SC1, SC2 spread-spectrum modulate the transmit signals Cdata1, Cdata2 using spreading-code sequences SCD1, SCD2, which are output from spreading-code sequence generators SCG1, SCG2, and output the transmit signals Sdata01, Sdata02. The delay units DLY1, DLY2 subsequently delay the spread-spectrum modulated transmit signals Sdata01, Sdata02, respectively, by τ. The delayed signals Sdata01, Sdata02 are input to the transmit antennas ANT1, ANT2, respectively, via the switches SW1, SW2 and frequency converters and power amplifiers, etc., which are not shown. The delay time τ of the delay circuits DLY1, DLY2 is for the purpose of making the timings of the spread-spectrum modulated transmit signals Sdata01, Sdata02 coincide with the timing of control signal CSTP, described later.

The cross-correlation detection controller CORR continuously calculates the cross-correlation values between the first and second spreading-code sequences SCD1, SCD2 on a per-symbol basis, checks to determine whether the cross-correlation value has exceeded the predetermined threshold value REF, and outputs a signal GATE, which is at the high level for the duration of one symbol, when the threshold value REF is exceeded and, hence, interference noise is large. If the cross-correlation value per symbol is equal to or greater than the threshold value, the code-coincident-chip detector CDCI, using a signal S3 (described below), detects that the codes of the spreading-code sequences SCD1, SCD2 coincide in the above-mentioned symbol interval and outputs the control signal CSTP that assumes the high level over the duration of each chip in which coincidence is obtained.

If the control signal CSTP is at the high level, the switches SW1, SW2 inhibit passage of the transmit signals, which are output from the delay units DLY1, DLY2, for the duration of the chip corresponding to the control signal CSTP. As a result, the transmit signals Sdata1; Sdata2 that have undergone switching in units of the chip period emanate into space from the antennas ANT1, ANT2. In the foregoing, control for halting transmission is performed using the switches SW1, SW2. However, it can also be so arranged that control for halting transmission is performed by turning the operation of the spread-spectrum modulator or transmit-signal amplifier (not shown) on and off.

On the receiving side, spreading-code sequence generators SCG1', SCG2' generate despreading-code sequences SCD1', SCD2' identical with and synchronized to the spreading-code sequences SCD1, SCD2 used in spread-spectrum modulation on the transmitting side, and despreading circuits RSC1, RSC2 subject the receive signals Sdata1', Sdata2' to despread processing using the despreading-code sequences SCD1', SCD2', thereby outputting despread signals Cdata1', Cdata2'. Channel decoders CH-dec1, CH-dec2 subject the despread signals Cdata1', Cdata2', which are output from the despreading circuits, to error-correction decoding processing, generate final receive data Data1', Data2' and output this data. At this time the symbol not transmitted to the receiving apparatus owing to partial halting of transmission on the transmitting side is reproduced by the channel decoders CD-dec1, CH-dec2.

In accordance with the second embodiment, both transmission systems halt sending of their transmit signals over the duration of a chip of particularly large interference in a symbol interval in which interference noise is great. As a result, interference noise inflicted upon each transmission system decreases so that communication can be performed in excellent fashion. Further, since transmit data for which transmission over the chip interval has been halted is capable of being restored by error-correction decoding processing, no problems arise.

The foregoing is for a case where both transmission systems halt the sending of transmit signals simultaneously over the duration of a chip. However, it can be so arranged that the sending of a transmit signal is halted over the chip duration only in one of the transmission systems.

Figure 21:
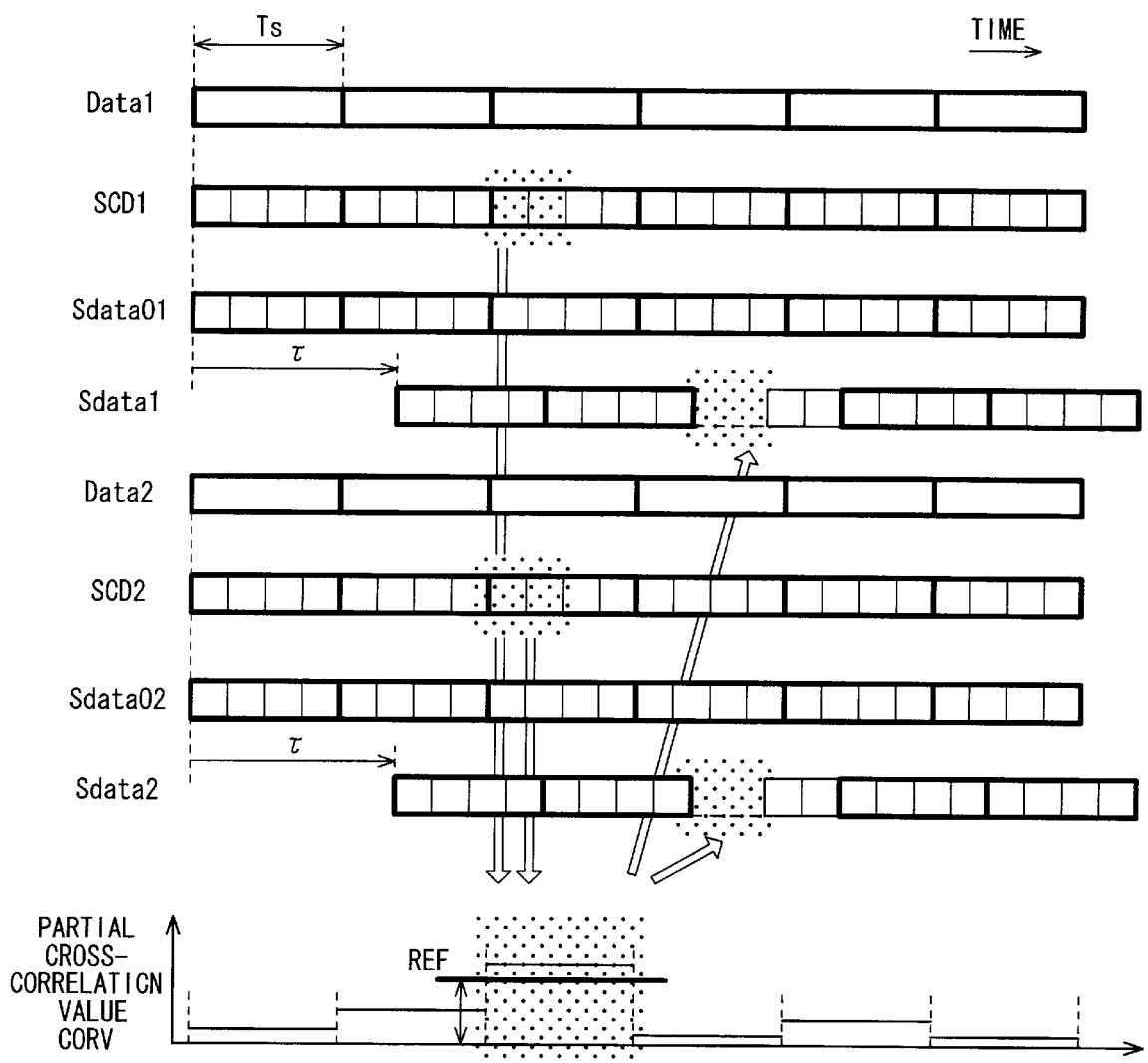
FIG. 21 is a diagram useful in describing operation timing of the second embodiment.

FIG. 21 is a diagram useful in describing operation timing of the second embodiment. The portions of the spreading-code sequences SCD1, SCD2 indicated by the shading are symbol portions where cross-correlation worsens locally. This illustrates an example in which the codes of the two chips in the first halves of the symbols coincide. If the symbol-by-symbol cross-correlation value CORV between the spreading-code sequences SCD1, SCD2 exceeds the threshold value REF, intervals (chip intervals) in which codes coincide are detected chip by chip in a symbol interval Ts within which the threshold value was exceeded, and passage of the transmit data Sdata01, Sdata02 (the hatched portions) is halted over the chip intervals (the two chip intervals in the first halves).

Figure 22:
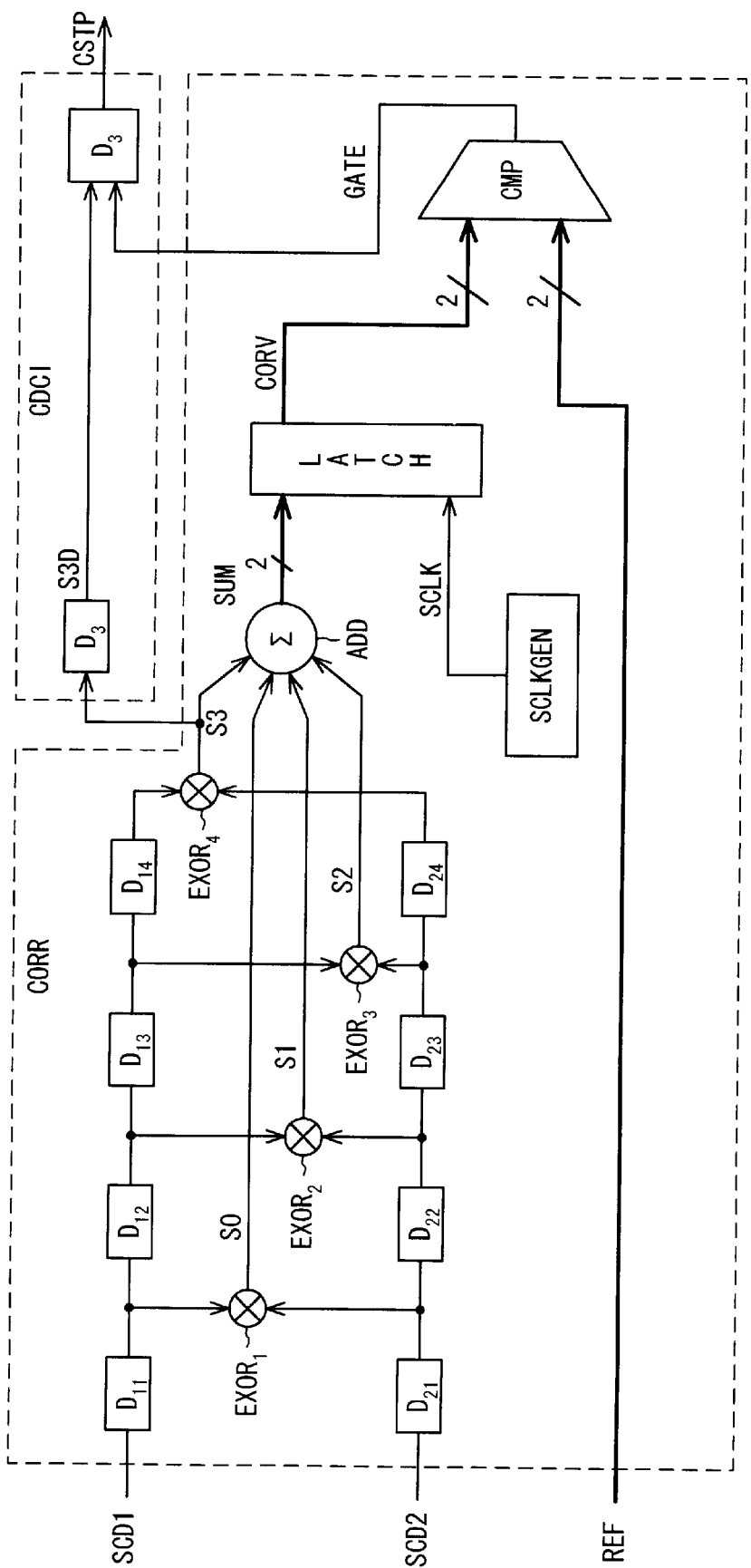
FIG. 22 is a block diagram of a cross-correlation detection controller and code-coincident-chip detector.
Figure 23:
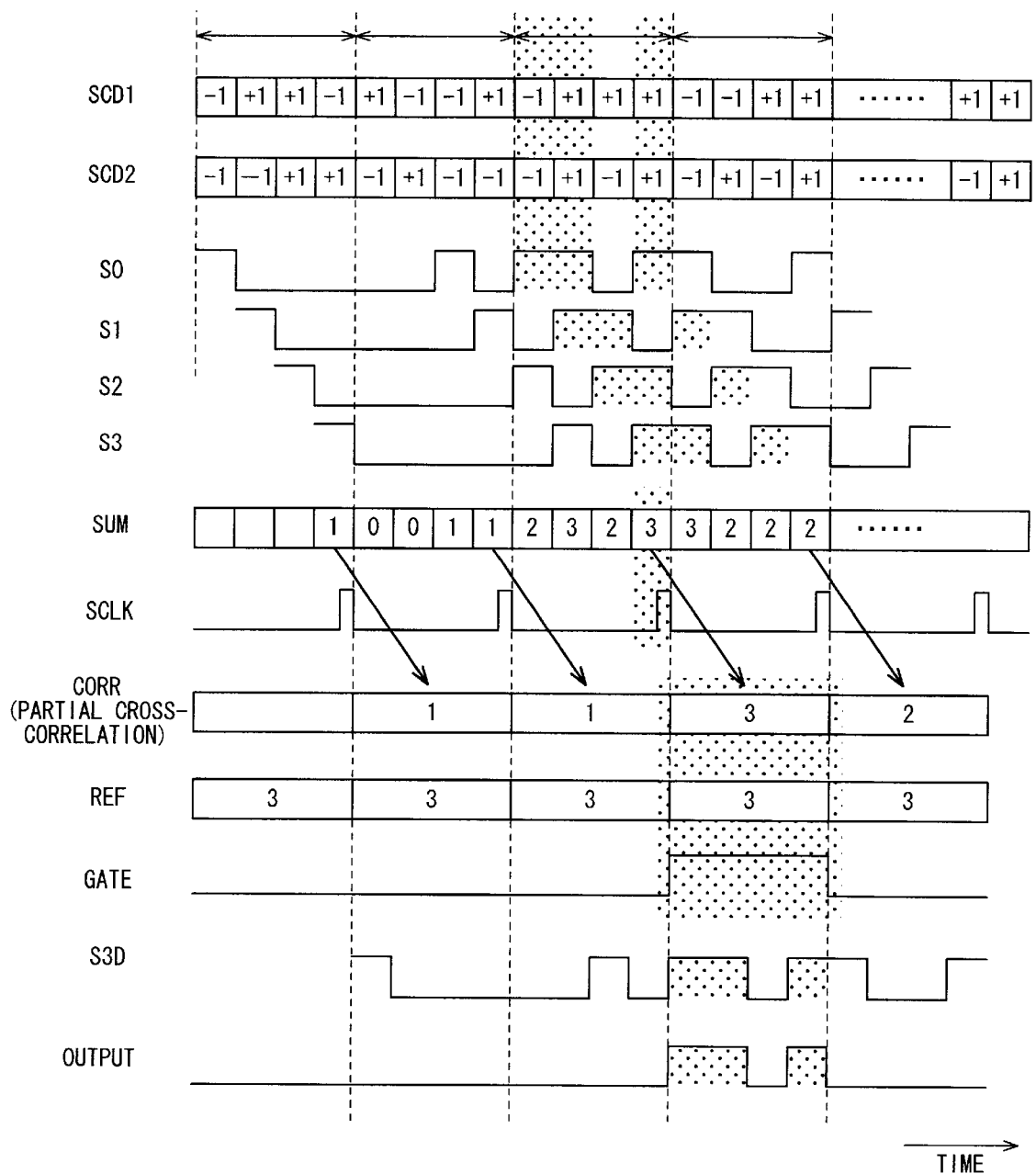
FIG. 23 is a diagram useful in describing operation of the cross-correlation detection controller and code-coincident-chip detector.

Structure of Cross-correlation Detection Controller and Code-coincident-chip Detector FIG. 22 is a block diagram of the cross-correlation detection controller CORR and code-coincident-chip detector CDCI, and FIG. 23 is a diagram useful in describing the operation thereof. The structure of the cross-correlation detection controller CORR of FIG. 22 is identical with that of FIG. 5. In FIG. 22, reference characters SCD1, SCD2 represent spreading-code sequences of two systems between which cross-correlation is found; these are the outputs of the despreading-code sequence generators SCG1, SCG2 of FIG. 20. Further, reference characters CSTP represent a control signal for controlling stoppage/passage of the transmits signal for every chip that enters the switches SW1, SW2 in FIG. 20.

The input spreading-code sequences of the two systems are each delayed a total of four chips by delay units $D_{11}$ to $D_{14}$, $D_{21}$ to $D_{24}$, respectively, which act as one-chip delay elements. The outputs of the delay units $D_{11}$ to $D_{24}$ of one system are input to exclusive-OR circuits $EXOR_1$ to $EXOR_4$ together with the outputs of the delay units $D_{21}$ to $D_{24}$ of the corresponding system. The exclusive-OR circuits $EXOR_1$ to $EXOR_4$ output signals S0 to S3 depending upon whether the values of the two inputs coincide or not. The signal S3 is a signal indicating coincidence/non-coincidence of a first chip in a symbol interval, the signal S2 is a signal indicating coincidence/non-coincidence of a second chip in the symbol interval, the signal S1 is a signal indicating coincidence/non-coincidence of a third chip in the symbol interval, and the signal S0 is a signal indicating coincidence/non-coincidence of a fourth chip in the symbol interval. The adder ADD refers to the four signals S0 to S3 input thereto, counts up the signals that indicate coincidence and outputs a result SUM, which indicates the count, in the form of a 2-bit signal. The counting result SUM is latched in the latching unit LATCH using the symbol clock SCLK output from the clock generator SCLKGEN every symbol (four chips in this case). The comparator CMP compares the latched count (cross-correlation value on a per-symbol basis) CORV with the threshold value REF and outputs the high-level signal GATE if the cross-correlation value CORV is equal to or greater than the threshold value REF. The code-coincident-chip detector CDCI uses an AND gate AND to calculate the AND between a signal S3D, which is obtained by delaying the signal S3 one chip using the delay element $D_3$, and the signal GATE, and outputs the signal S3D as the control signal CSTP in an interval over which the signal GATE is at the high level. When the cross-correlation value CORV on a per-symbol basis is equal to or greater than the predetermined threshold value REF, the control signal CSTP attains the high level only in a chip for which the values of the mutual code sequences coincide within the duration of this symbol. The switches SW1, SW2 in FIG. 20 execute control for allowing/inhibiting passage, on a chip-by-chip basis, of the transmit signals in response to the control signal CSTP.

The foregoing is described in-regard to a case where spreading rate=4 holds. However, if the spreading rate is larger, the arrangement adopted is such that (1) the number of delay-element stages is increased correspondingly, (2) the number of corresponding signals added by the adder ADD is increased, and (3) the number of information bits in the addition result SUM, the value CORV obtained by latching the sum and threshold value REF is increased.

Modification

The foregoing has been described with regard to a case where transmission is halted based upon the cross-correlation value between spreading-code sequences. However, it is also possible to adopt an arrangement in which transmission is halted based upon a cross-correlation value between spread-spectrum modulated signals obtained by performing spread-spectrum modulation using first and second spreading-code sequences. Further, in the foregoing, transmission is halted using a switch. However, it can be so arranged that transmission is halted by other means.

(C) Third Embodiment

Figure 24:
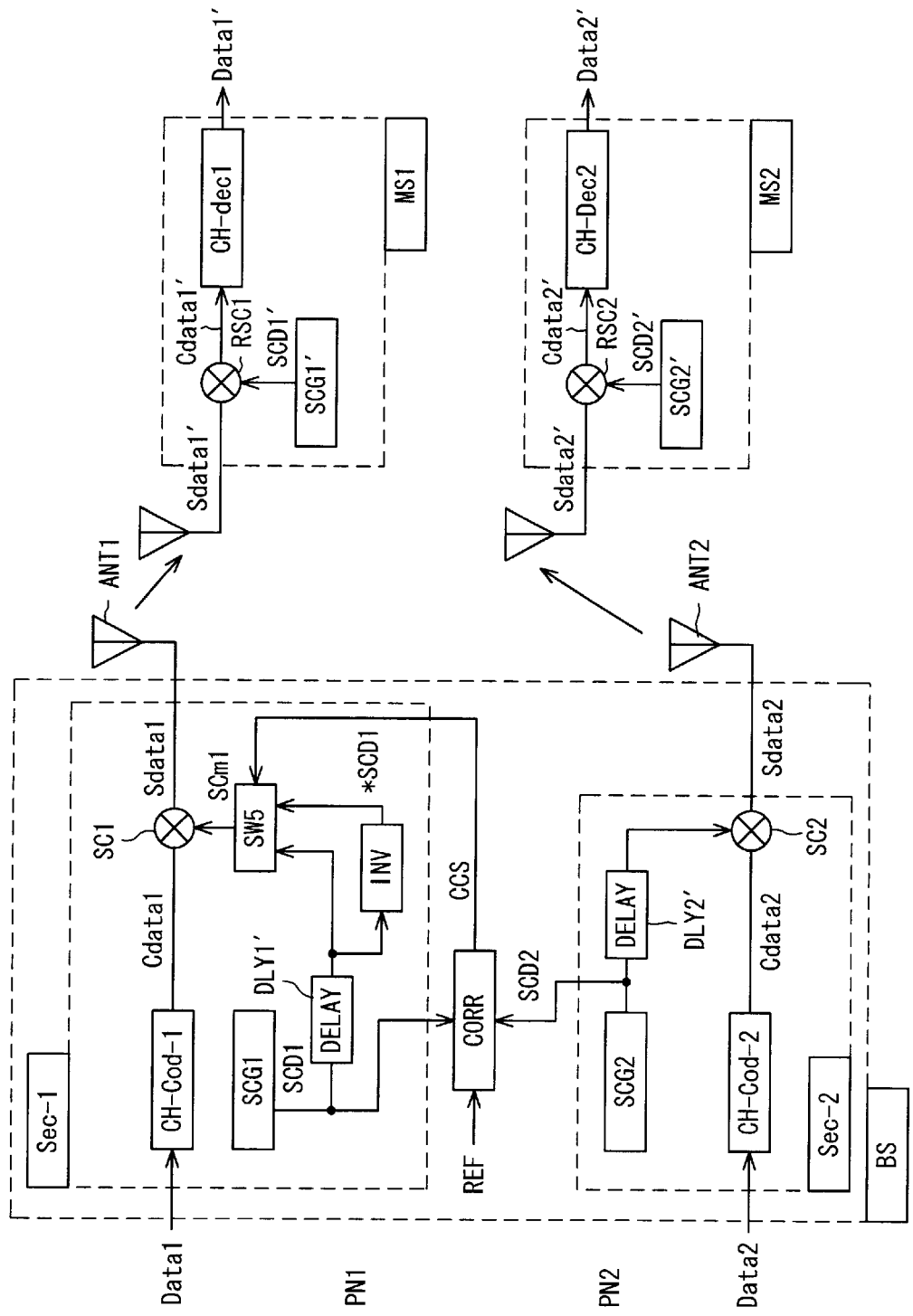
FIG. 24 is a block diagram of a code division multiple access communication system according to a third embodiment.

FIG. 24 is a block diagram of a code division multiple access communication system according to a third embodiment of the present invention. Here components identical with those of the first embodiment of FIG. 4 are designated by like reference characters. This embodiment differs in the following respects:

(1) In the first embodiment, the transmission of one transmit signal is halted by a switch over a symbol interval in which the cross-correlation value is large. In the third embodiment, however, spread-spectrum modulation is performed upon inverting the code of one spreading-code sequence over a symbol interval in which the cross-correlation value is large.

(2) In the first embodiment, the transmit signals output from the spreading circuits SC1, SC2 are delayed. In the third embodiment, however, the spreading-code sequences SCD1, SCD2 are delayed for a length of time necessary to execute processing for calculation of the cross-correlation values between these code sequences.

The channel coders CH-cod1, CH-cod2 in the sectors Sec1, Sec2 of the base station (transmitting apparatus) BS subject the two transmit signals Data1, Data2, respectively, to error-correction encoding and output encoded transmit signals Cdata1, Cdata2. Meanwhile, the spreading-code sequence generators SCG1, SCG2 generate the spreading-code sequences SCD1, SCD2 for performing spread-spectrum modulation, and the delay units DLY1', DLY2' delay the spreading-code sequences SCD1, SCD2, respectively, for the prescribed period of time. The delay unit DLY1' inputs the delayed spreading-code sequence SCD1 to an inverter INV and a switch SW5. The inverter INV inverts the code of the spreading-code sequence SCD1 and applies the inverted code to one other input of the switch SW5.

In parallel with the above, the cross-correlation detection controller CORR continuously calculates the cross-correlation values between the first and second spreading-code sequences SCD1, SCD2 on a per-symbol basis, checks to determine whether the cross-correlation value has exceeded the predetermined threshold value REF, and outputs a code changeover signal CCS, which is at the high level for the duration of one symbol, when the threshold value REF is exceeded and, hence, interference noise is large.

The switch SW5 selects and outputs the spreading-code sequence SCD1, which is output from the delay unit DLY1', in a symbol interval over which the code changeover signal CCS is at the low level, i.e., a symbol interval over which interference noise is small. Further, the switch SW5 outputs an inverted spreading-code sequence *SCD1, which is output from the inverter INV, in a symbol interval over which the code changeover signal CCS is at the high level, i.e., a symbol interval over which interference noise is large.

The spreading circuit SC1 spread-spectrum modulates the encoded transmit data Cdata1 using a spreading-code sequence SCm1 output from the switch SW5, and the spreading circuit SC2 spread-spectrum modulates the encoded transmit data Cdata2 using the spreading-code sequence SCD2 output from the delay unit DLY2'. The spread-spectrum modulated signals are subsequently input to the antennas ANT1, ANT2 via frequency converters and transmission-power amplifiers, not shown, and the signals emanate into space.

On the receiving side, the spreading-code sequence generators SCGL', SCG2' generate the code sequences SCD1', SCD2' identical with and synchronized to the code sequences SCD1, SCD2 used in spread-spectrum modulation on the transmitting side, and the despreading circuits RSC1, RSC2 subject the receive signals Sdata1', Sdata2' to despread processing using the code sequences SCD1', SCD2', thereby outputting despread signals Cdata1', Cdata2'. The channel decoders CH-dec1, CH-dec2 subject the despread signals Cdata1', Cdata2', which are output from the despreading circuits RSC1, RSC2, to error-correction decoding processing, generate final receive data Data1', Data2' and output this data. At this time the signal of the symbol portion that was spread using the spreading-code sequence generated by code inversion on the transmitting side is reproduced as correct data by the channel decoders CD-dec1, CH-dec2 of the receiving apparatus.

Figure 25:
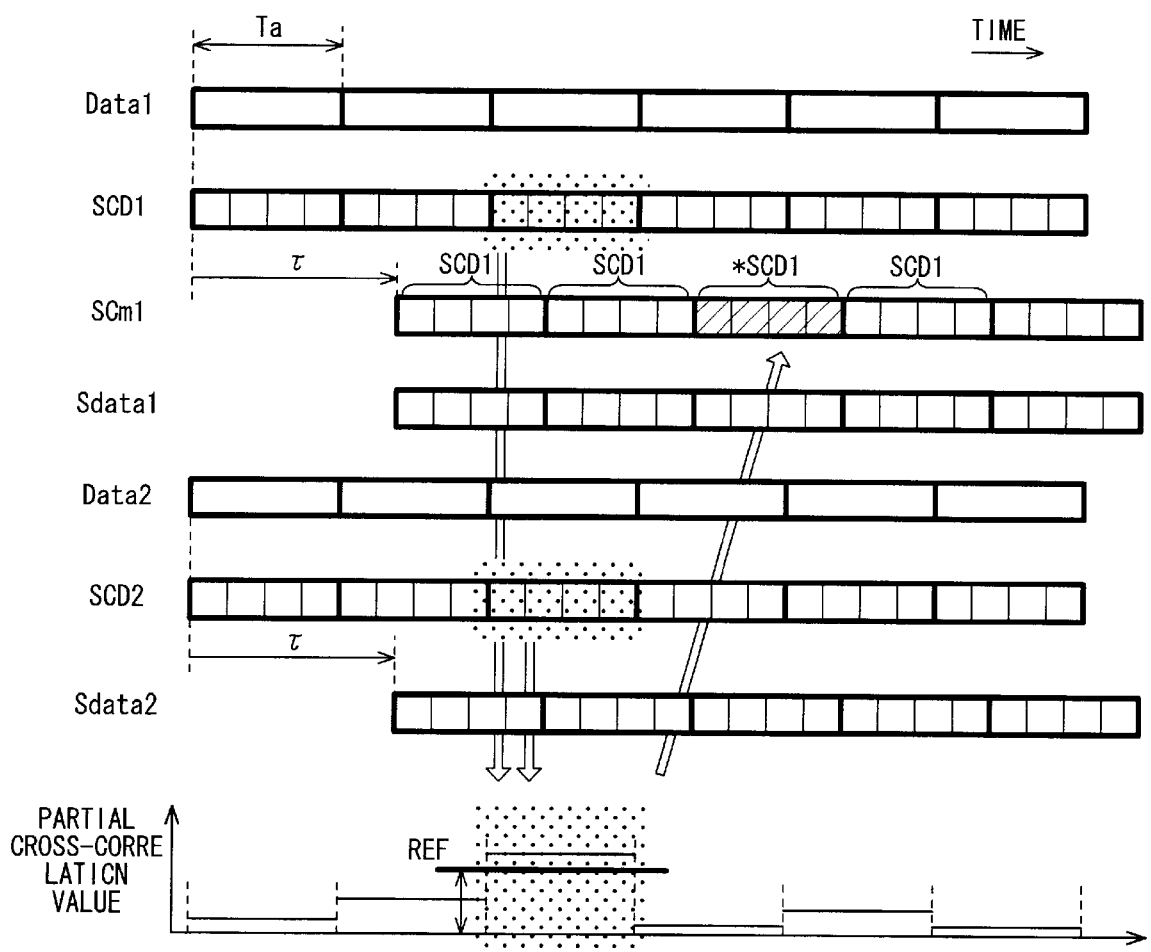
FIG. 25 is a diagram useful in describing operation timing of the third embodiment.

FIG. 25 is a diagram useful in describing operation timing of the third embodiment. The portions of the spreading-code sequences SCD1, SCD2 indicated by the shading are symbol portions where cross-correlation worsens locally. If the symbol-by-symbol cross-correlation value CORV between the spreading-code sequences SCD1, SCD2 exceeds the threshold value REF, the switch SW5 outputs the spreading-code sequence *SCD1, which is the result of inverting the code of the spreading-code sequence SCD1, over the symbol interval in which the threshold value is exceeded, and supplies the spreading circuit SC1 with the uninverted portion of the code sequence as the overall code and with the inverted portion (see the hatched portion) SCm1.

In accordance with the third embodiment, the code of one spreading-code sequence is inverted over a symbol interval in which the interference noise is large. As a result, the cross-correlation value diminishes, the interference noise of each transmission system decreases and communication can be performed in excellent fashion. Further, though despreading cannot be carried out correctly in the transmission system in which the spreading circuit is inverted, the original code can be reconstructed by error-correction decoding processing.

It should be noted that the components (switch SW5 and inverter INV) which change the spreading-code sequence need not be provided in the transmit-signal system that does not require this processing. Further, in order to change spreading-code sequences with regard to a plurality of transmit signals, this can be achieved by combining a change of a spreading-code sequence using the inverter INV, as in the embodiment, and a change based upon substitution of a fixed spreading-code sequence.

Modification

Figure 26:
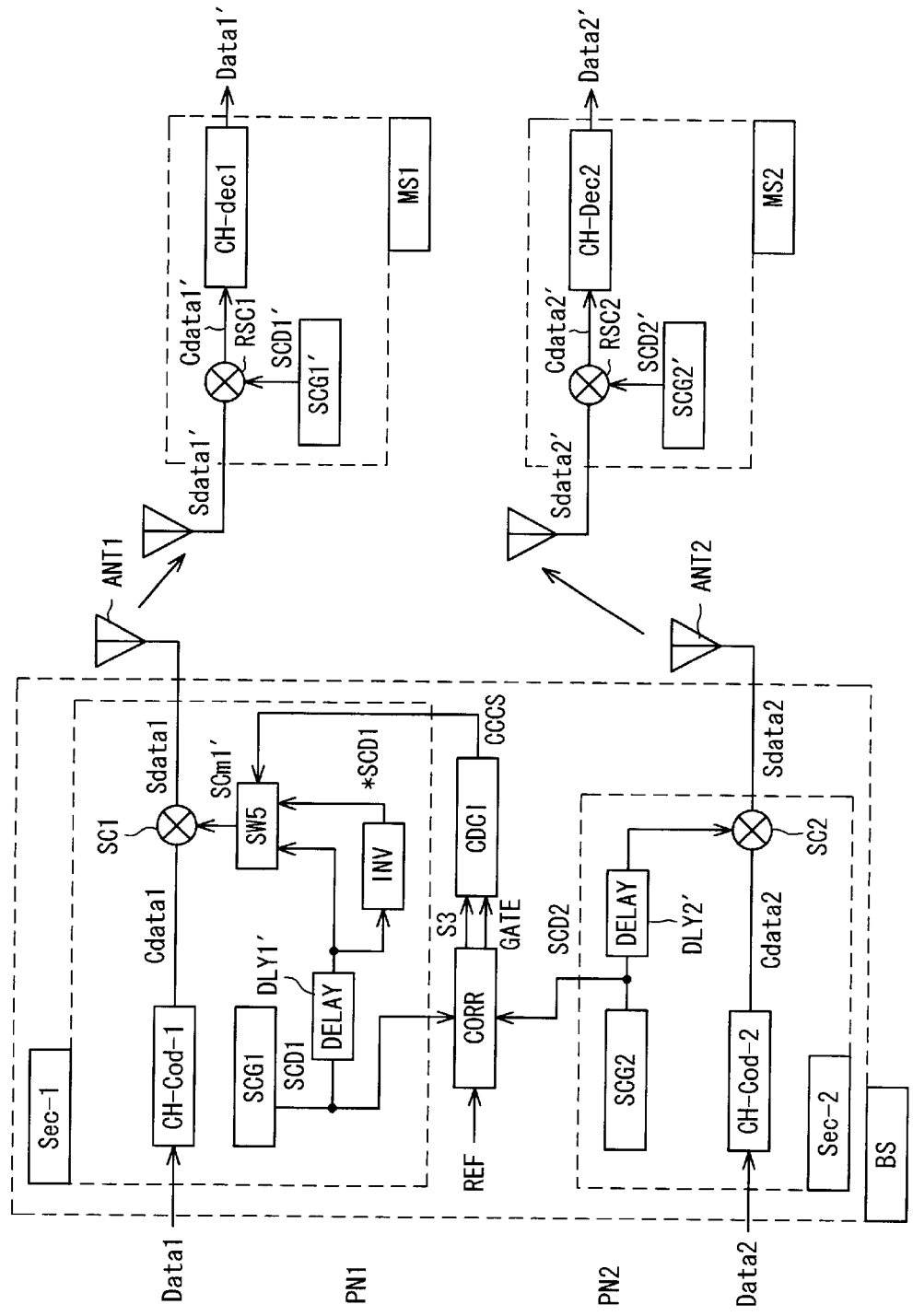
FIG. 26 shows a modification of the third embodiment.

FIG. 26 is a modification of the third embodiment, in which components identical with those of the third embodiment of FIG. 24 are designated by like reference characters. This modification differs in the following respects:

(1) There is provided the code-coincident-chip-detector CDCI which, when the symbol-by-symbol cross-correlation value CORV between the two spreading-code sequences SCD1, SCD2 is equal to or greater than the threshold value REF, detects chips whose codes coincide in a symbol interval and outputs the result.

(2) When the symbol-by-symbol cross-correlation value exceeds the threshold value REF, only the spreading code of the code-coincident chips of the symbol interval is inverted; the spreading-code sequence is not inverted over the entirety of the symbol interval. The structure of the cross-correlation detection controller CORR and code-coincident-chip detector CDCI is exactly the same as that shown in FIG. 22.

The code-coincident-chip detector CDCI outputs the high-level code changeover signal CCCS over the duration of a chip for which the symbol-by-symbol cross-correlation value exceeds the threshold value (signal GATE=high level) and, moreover, the codes within this symbol interval coincide. The switch SW5 selects and outputs the spreading-code sequence SCD1 when the code changeover signal CCCS is at the low level, and selects and outputs the inverted spreading-code sequence *SCD1 when the code changeover signal CCCS is at the high level. That is, the switch SW5 inverts and outputs the code only over the duration of a chip for which the symbol-by-symbol cross-correlation value exceeds the threshold value REF and, moreover, the codes within this symbol interval coincide.

The spreading circuit SC1 spread-spectrum modulates the encoded transmit data Cdata1 using a spreading-code sequence SCm1' output from the switch SW5, and the spreading circuit SC2 spread-spectrum modulates the encoded transmit data Cdata2 using the spreading-code sequence SCD2 output from the delay unit DLY2'. The spread-spectrum modulated signals are subsequently input to the antennas ANT1, ANT2 via frequency converters and transmission-power amplifiers, not shown, and the signals emanate into space. Operation on the receiving side is exactly the same as that of the third embodiment.

In accordance with this modification, the code of one spreading-code sequence is inverted only over for the duration of a chip in which codes coincide in a symbol interval where the interference noise is large. As a result, the cross-correlation value diminishes, the interference noise of the other transmission system decreases and communication can be performed in excellent fashion. Further, though despreading cannot be carried out correctly in the transmission system in which the spreading circuit is inverted, the original code can be reconstructed by error-correction decoding processing.

The foregoing is described for a case where part of a spreading-code sequence is changed based upon a cross-correlation value between spreading-code sequences. However, an arrangement can be adopted in which part of a spreading-code sequence is changed based upon a cross-correlation value between spread-spectrum modulated signals obtained by spread-spectrum modulating each of the transmit signals using first and second spreading-code sequences.

(D) Fourth Embodiment

Figure 27:
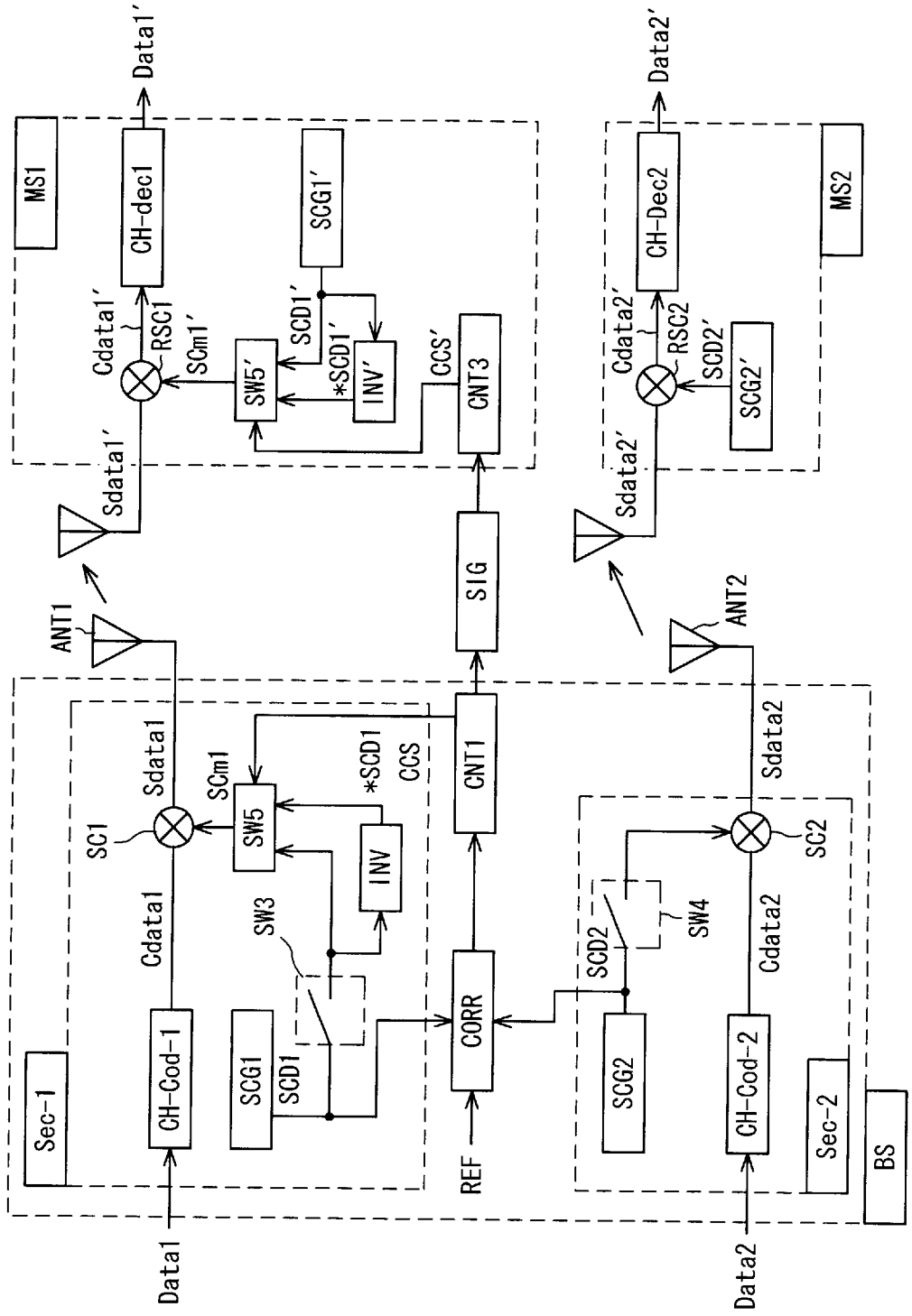
FIG. 27 is a block diagram of a code division multiple access communication system according to a fourth embodiment.

FIG. 27 is a block diagram of a code division multiple access communication system according to a fourth embodiment of the present invention. Here components identical with those of the third embodiment of FIG. 24 are designated by like reference characters. This embodiment differs in the following respects:

(1) The cross-correlation detection controller CORR executes calculation of the cross-correlation between the two spreading-code sequences SCD1, SCD2 and stores the position of the symbol where the cross-correlation value exceeds the threshold value.

(2) This symbol position is reported to the receiving side.

(3) At the time of operation, the transmitting side inverts the code of the spreading-code sequence at the stored symbol position and the receiving side inverts the code of the despreading-code sequence at the symbol position of which it has been notified by the transmitting side. Furthermore, the delay units DLY1', DLY2' are not shown.

Before the start of communication, the switches SW3, SW4 are placed in the states illustrated. The cross-correlation detection controller CORR calculates the cross-correlation value symbol-by-symbol between the spreading-code sequences SCD1, SCD2 output from the spreading-code sequence generators SCG1, SCG2, checks to determine whether the cross-correlation value every symbol exceeds the predetermined threshold value REF and outputs this symbol position to a controller CNT1 if the threshold value is exceeded. The cross-correlation detection controller CORR executes the above-described processing until the initial spreading-code sequences SCD1, SCD2 appear again, and the controller CNT1 saves all symbol positions where the cross-correlation value exceeds the predetermined threshold value REF. The controller CNT1 reports the saved symbol positions to a controller CNT3 of the receiving apparatus MS1 using control-signal sending means SIG, and the controller CNT3 stores the reported symbol positions. The control-signal sending means SIG is a control channel, by way of example.

If the above preprocessing is completed, the switches SW3, SW4 change over the output destinations of the spreading-code sequences SCD1, SD2 to the side of the spreading circuits SC1, SC2. Further, the controller CNT1 outputs the code changeover signal CCS that assumes the high level at the stored symbol positions. In a symbol interval in which the code changeover signal CCS is at the low level, i.e., in a symbol interval where the interference noise is small, the switch SW5 selects and outputs the spreading-code sequence SCD1. In a symbol interval in which the code changeover signal CCS is at the high level, i.e., in a symbol interval where the interference noise is large, the switch SW5 outputs the inverted spreading-code sequence *SCD1, which is output from the inverter INV.

The spreading circuit SC1 spread-spectrum modulates the encoded transmit data Cdata1 by the spreading-code sequence SCm1 output from the switch SW5, and the spreading circuit SC2 spread-spectrum modulates the encoded transmit data Cdata2 by the spreading-code sequence SCD2 output via the switch SW4. Thereafter, the spread-spectrum modulated signals are input to the antennas ANT1, ANT2 via frequency converters and transmission-power amplifiers, not shown, and emanate into space. It should be noted that instead of changing the spreading code by the inverter INV, it is permissible to (1) effect a changeover to a fixed pattern or (2) perform a partial inversion/substitution during the duration of one symbol.

On the receiving side, the spreading-code sequence generators SCG1', SCG2' generate spreading-code sequences SCD1', SCD2' identical with and synchronized to the spreading-code sequences SCD1, SCD2 used in spread-spectrum modulation on the transmitting side. The controller CNT3 outputs a code changeover signal CCS' that assumes the high level at the reported symbol positions. A switch SW5' selects and outputs despreading-code sequence SCD1' in a symbol interval where the code changeover signal CCS' is at the low level, and outputs despreading-code sequence *SCD1', which is output from an inverter INV', in a symbol interval where the code changeover signal CCS' is at the high level. The despreading circuit RSC1 subjects the receive signal Sdata1' to despread processing using despreading-code sequence SCm1' output from the switch SW5', thereby outputting despread signal Cdata1'. The despreading circuit RSC2 subjects the receive signal Sdata2' to despread processing using despreading-code sequence SCD2', thereby outputting despread signal Cdata2'. Channel decoders CH-dec1, CH-dec2 subject the despread signals Cdata1', Cdata2', which are output from the despreading circuits RSC1, RSC2, to error-correction decoding processing, generate final receive data Data1', Data2' and output this data.

In accordance with the fourth embodiment, the code of one spreading-code sequence is inverted over a symbol interval in which the interference noise is large. As a result, the cross-correlation value diminishes, the interference noise of each transmission system decreases and communication can be performed in excellent fashion. Further, in accordance with the fourth embodiment, the receiving side also performs despreading by inverting the code of a despreading-code sequence so as to match the spreading-code sequence on the transmitting side. As a result, transmit data can be decoded even in a symbol interval where interference noise is large, thereby making it possible to reproduce transmit data more correctly.

It should be noted that the components (switch SW5, inverter INV, switch SW5' and inverter INV') which change the spreading-code sequence need not be provided in the transmit-signal system that does not require this processing. Further, in order to change spreading-code sequences with regard to a plurality of transmit signals, this can be achieved by combining a change of a spreading-code sequence using the inverter INV, as in the embodiment, and a change based upon substitution of a fixed spreading-code sequence.

The foregoing is described for a case where part of a spreading-code sequence is changed based upon a cross-correlation value between spreading-code sequences. However, an arrangement can be adopted in which part of a spreading-code sequence is changed based upon a cross-correlation value between spread-spectrum modulated signals obtained by spread-spectrum modulating each of the transmit signals using first and second spreading-code sequences.

(E) Fifth Embodiment

Figure 28:
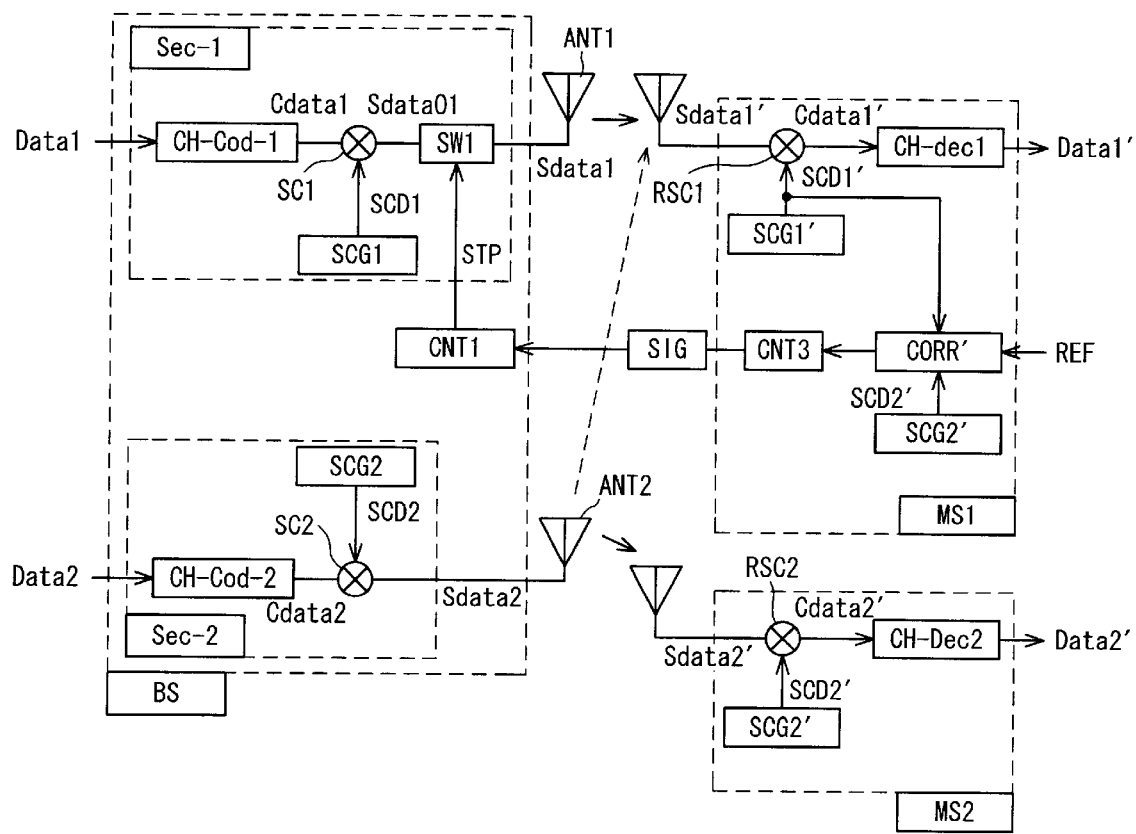
FIG. 28 is a block diagram of a code division multiple access communication system according to a fifth embodiment of the present invention.

FIG. 28 is a block diagram of a code division multiple access communication system according to a fifth embodiment of the present invention. Here components identical with those of the first embodiment of FIG. 4 are designated by like reference characters. The fifth embodiment differs from the first embodiment in the following respects:

(1) The receiving side is provided with a cross-correlation detection controller CORR' for calculating the symbol-by-symbol cross-correlation value between two spreading-code sequences (actually despreading-code sequences SCD1', SCD2') and detecting a symbol position where the cross-correlation value exceeds the threshold value REF.

(2) The symbol position where the cross-correlation value exceeds the threshold value REF is reported to the transmitting apparatus BS.

(3) The transmitting apparatus BS halts the transmission of the transmit data Sdata01 at the symbol position of which it has been notified.

The cross-correlation detection controller CORR' of the receiving apparatus MS1 calculates a cross-correlation value per symbol between the two despreading-code sequences SCD1', SCD2', which are identical with the spreading-code sequences SCD1, SCD2 of the transmitting apparatus, successively in real time, checks to determine whether the cross-correlation value has exceeded the predetermined threshold value REF, and outputs the symbol position to the controller CNT3 if the threshold value is exceeded. The controller CNT3 reports this symbol position to the controller CNT1 of the transmitting apparatus BS using the control-signal sending means SIG, which is for maintaining and setting the communication channel. The controller CNT1 generates the control signal STP, which is for halting transmission of the transmit signal at a timing conforming to the reported symbol position, and inputs this signal to the switch SW1.

In parallel with the above, the channel coders CH-cod1, CH-cod2 in the sectors Sec1, Sec2 of the base station (transmitting apparatus) BS subject the two transmit signals Data1, Data2, respectively, to error-correction encoding and output encoded transmit signals Cdata1, Cdata2. The spreading circuits SC1, SC2 spread-spectrum modulate the transmit signals Cdata1, Cdata2 using the spreading-code sequences SCD1, SCD2 output from the spreading-code sequence generators SCG1, SCG2, and output the transmit signals Sdata01, Sdata02.

If the control signal STP that enters from the controller CNT1 attains the high level, the switch SW1 inhibits passage of the transmit signal Sdata01, which is output from the spreading circuit SC1, over the symbol interval in which the control signal STP is at the high level. As a result, the transmit signal Sdata1 that has been switched on a per-symbol basis emanates into space from the antenna ANT1. Further, the transmit data Sdata2 emanates into space from the antenna ANT2 without undergoing switching control. In the foregoing, control for halting transmission is performed using the switches SW1, SW2. However, it can also be so arranged that control for halting transmission is performed by turning the operation of the spread-spectrum modulator or transmit-signal amplifier (not shown) on and off.

On the receiving side, the despreading-code sequence generators SCG1', SCG2'generate despreading-code sequences SCD1', SCD2' identical with and synchronized to the spreading-code sequences SCD1, SCD2 used in spread-spectrum modulation on the transmitting side, and despreading circuits RSC1, RSC2 subject the receive signals Sdata1', Sdata2' to despread processing using the despreading-code sequences SCD1', SCD2', thereby outputting despread signals Cdata1', Cdata2'. The channel decoders CH-dec1, CH-dec2 subject the despread signals Cdata1', Cdata2', which are output from the despreading circuits, to error-correction decoding processing, generate the final receive data Data1', Data2' and output this data. At this time the symbol not transmitted to the receiving apparatus owing to partial halting of transmission on the transmitting side is reproduced by the channel decoders CD-dec1, CH-dec2.

In accordance with the fifth embodiment, one transmission system halts sending of the transmit signal over a symbol interval in which interference noise becomes large. As a result, interference noise inflicted upon the other transmission system decreases so that communication can be performed in excellent fashion. Further, the transmission system in which sending of the transmit signal has been halted is capable of restoring the original data by error-correction decoding processing.

Further, in a mobile station for high-speed data transfer, the cross-correlation value is calculated. When the correlation value becomes large (when interference noise becomes large), the effect of reducing interference noise inflicted upon the other transmission system can be enlarged if it is so arranged that communication of the high-speed data is halted. This makes it possible to enhance the efficiency of the overall system.

Further, the fifth embodiment is such that when a mobile station enters a boundary area between neighboring base stations, the cross-correlation value between the spreading-code sequences used at each of the base stations is calculated. When the correlation value becomes large (when interference noise becomes large), transmission of one of the transmit signals can be halted. In other words, interference noise can be reduced taking into consideration the correlation between spreading-code sequences of neighboring base stations, thereby making excellent communication possible.

The foregoing is for a case where one transmission system halts transmission of a transmit signal over the duration of a symbol. However, it can also be so arranged that transmission of transmit signals is halted in both transmission systems over the duration of a symbol. Further, a case where switching is performed symbol by symbol is described above. However, an inversion (a change of spreading-code sequence) can be performed symbol by symbol, or switching or an inversion can be performed with regard to some of the chips in one symbol. Further, in a case where the spreading-code sequence is changed, an inverter and switch need not be inserted into the transmission system that does not required them.

First Modification

Figure 29:
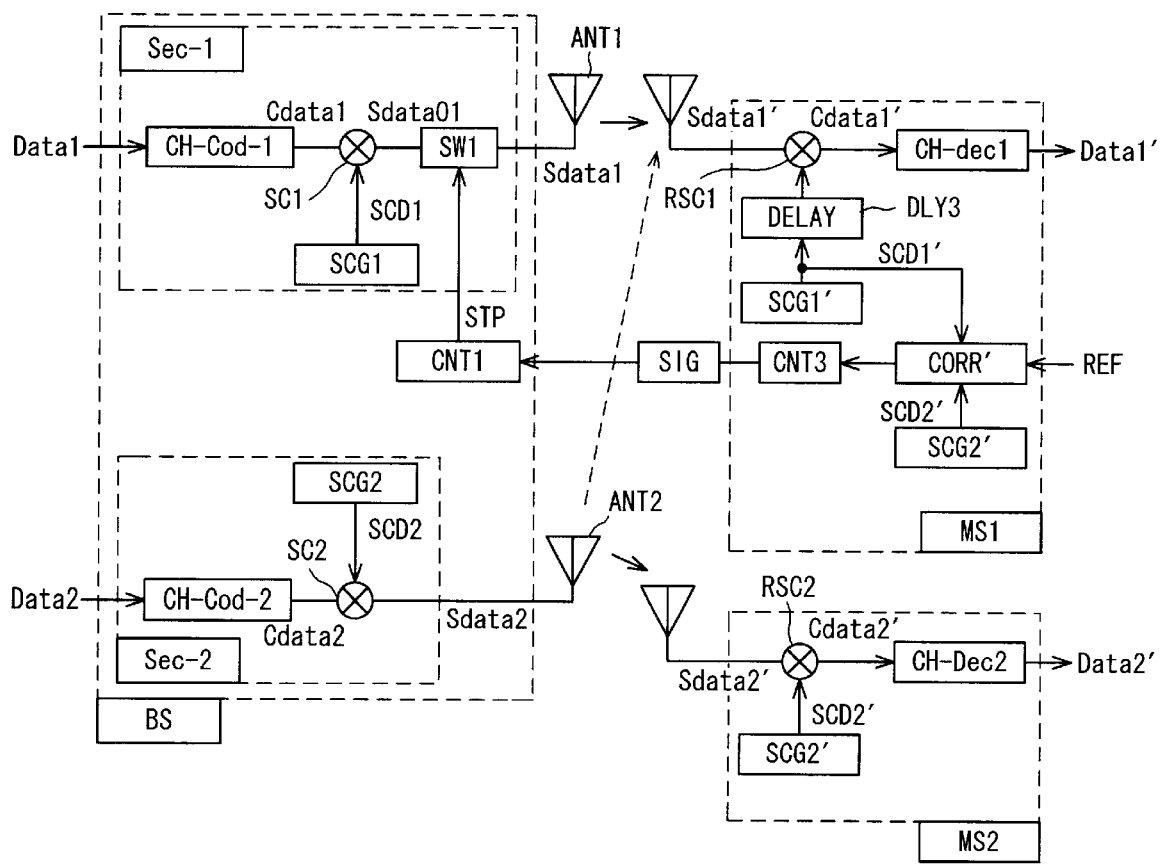
FIG. 29 shows a first modification of the fifth embodiment.

FIG. 29 is a first modification of the fifth embodiment, in which components identical with those of the fifth embodiment of FIG. 28 are designated by like reference characters. This modification differs in that a delay unit DLY3 for delaying the despreading-code sequence SCD1' on the receiving side is provided, and the despreading-code sequence SCD1' delayed by this delay unit is input to the despreading circuit RSC1. If $t_1$ represents the time needed for processing to calculate the cross-correlation between the despreading-code sequences SCD1', SCD2' and $t_2$ the time it takes for a transmit signal, which has undergone transmit-halt control based upon a symbol position reported from the receiving side, to arrive at the receiving side, then the delay unit DLY3 will delay the despreading-code sequence SCD1' for a length of time that corresponds to the total of these times, thereby matching the timings of the receive signal and despreading-code sequence.

Second Modification

Figure 30:
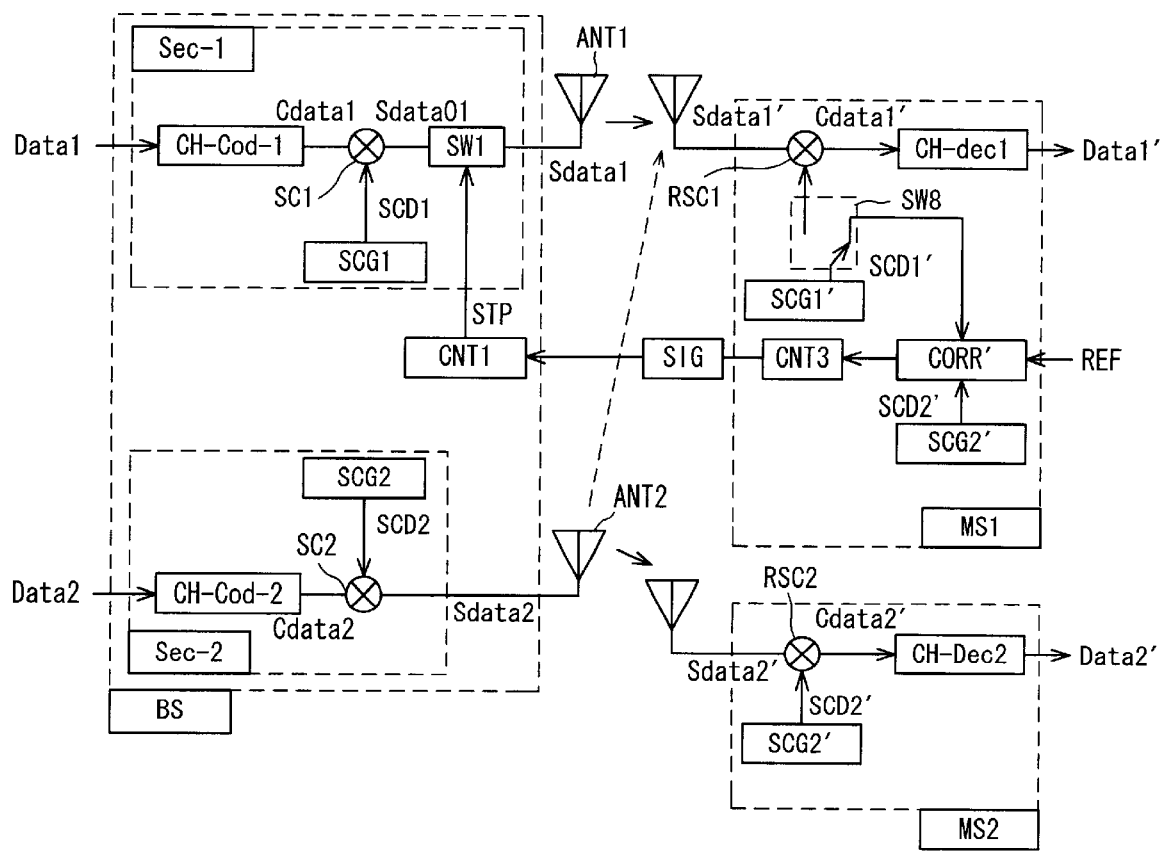
FIG. 30 shows a second modification of the fifth embodiment.

FIG. 30 is a second modification of the fifth embodiment, in which components identical with those of the fifth embodiment of FIG. 28 are designated by like reference characters. This modification differs in that the calculation of the cross-correlation between the two despreading-code sequences SCD1', SDC2' is either performed in real time (the fifth embodiment) or executed in advance (the second modification).

Before the start of communication, a switch SW8 in the receiving apparatus MS1 inputs the despreading-code sequence SCD1', which is output from the despreading-code sequence generator SCG1', to the cross-correlation detection controller CORR'. The latter calculates the cross-correlation value per symbol between the two despreading-code sequences SCD1', SCD2', checks to determine whether the symbol-by-symbol cross-correlation value has exceeded the predetermined threshold value REF, and outputs this symbol position to the controller CNT3 if the threshold value is exceeded. The cross-correlation detection controller CORR' executes the above-described processing until the initial despreading-code sequences SCD1', SCD2' appear again, and the controller CNT3 saves all symbol positions for which the cross-correlation value exceeds the predetermined threshold value REF. If the above preprocessing is completed, the switch SW8 inputs the despreading-code sequence SCD1' to the despreading circuit RSC1, and the controller CNT3 reports the stored symbol position to the controller CNT1 of the transmitting apparatus BS using the control-signal sending means SIG.

The controller CNT1 stores the symbol position of which it has been notified. After communication starts, the controller CNT1 inputs the control signal STP, which is for halting transmission of the transmit signal at a timing corresponding to this symbol position, to the switch SW1. Thereafter, operation similar to that of the fifth embodiment is performed.

Third Modification

Figure 31:
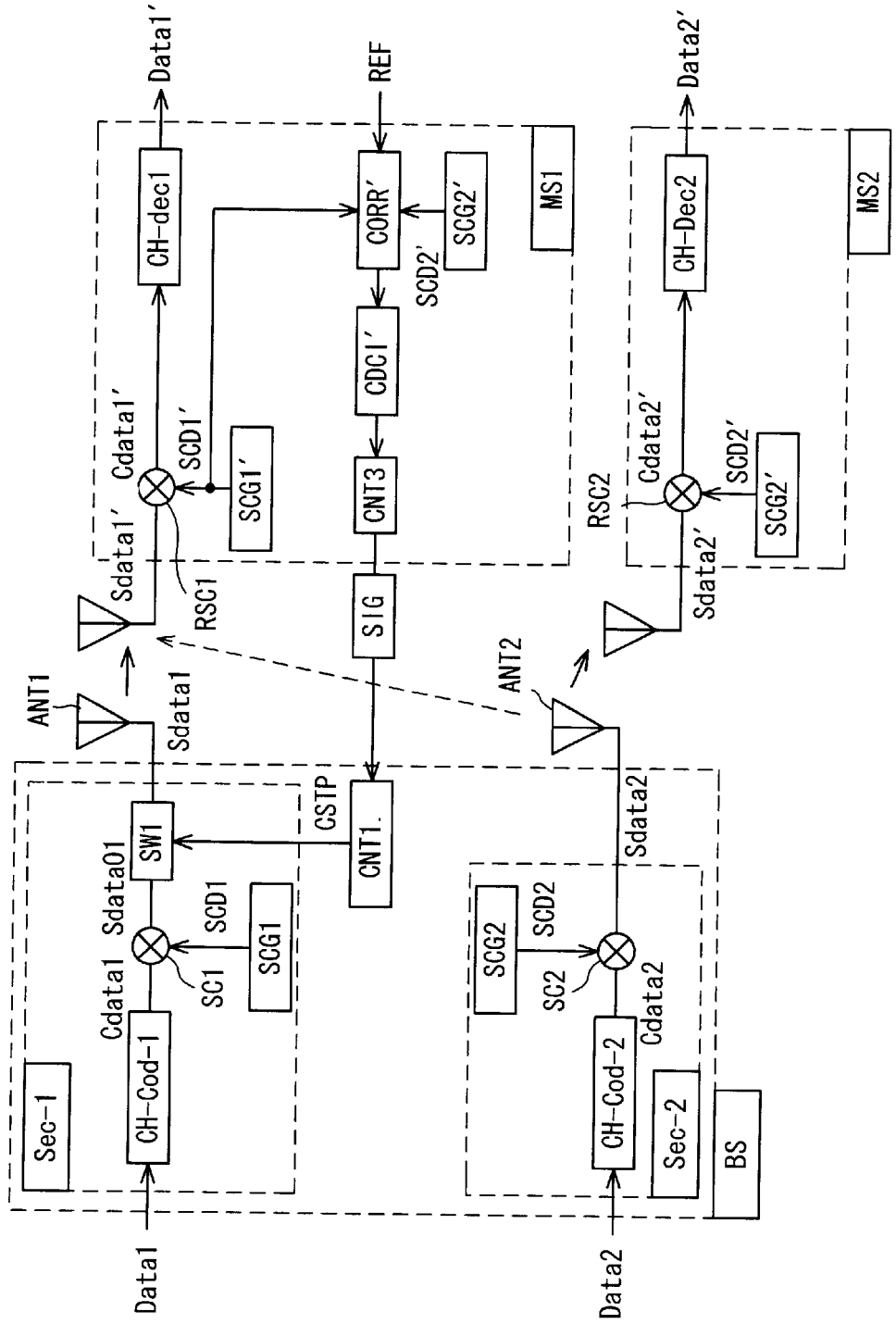
FIG. 31 shows a third modification of the fifth embodiment.

FIG. 31 is a third modification of the fifth embodiment, in which components identical with those of the fifth embodiment of FIG. 28 are designated by like reference characters. This modification differs in the following respects:

(1) There is provided a code-coincident-chip-detector CDCI' which, when the symbol-by-symbol cross-correlation value between the two spreading-code sequences SCD1', SCD2' is equal to or greater than the threshold value REF, detects and outputs chip positions where codes coincide in a symbol interval.

(2) The chip positions are reported to the transmitting apparatus BS.

(3) The transmitting apparatus BS halts transmission of the transmit signal Sdata01 at the chip position of which it has been notified. It should be noted that the cross-correlation detection controller CORR' and code-coincident-chip detector CDCI' have the structures shown in FIG. 22.

The cross-correlation detection controller CORR' of the receiving apparatus MS1 successively calculates the symbol-by-symbol cross-correlation values between the despreading-code sequences SCD1', SCD2' identical with the spreading-code sequences SCD1, SCD2 of the transmitting apparatus, checks to determine whether the cross-correlation value has exceeded the predetermined threshold value REF, and inputs a signal, which is at the high level for the duration of one symbol, to the code-coincident-chip detector CDCI' when the threshold value is exceeded. If the cross-correlation value per symbol is equal to or greater than the threshold value, the code-coincident-chip detector CDCI' detects a chip position where the codes of the despreading-code sequences SCD1', SCD2' coincide in the above-mentioned symbol interval. The controller CNT3 reports the entered chip position to the controller CNT1 of the transmitting apparatus BS via the control-signal sending means SIG. The controller CNT1 inputs the control signal CSTP, which is for halting transmission of the transmit signal, to the switch SW1 at a timing (in a chip interval) that conforms to the chip position of which it has been notified.

In parallel with the above, the channel coders CH-cod1, CH-cod2 in the sectors Sec1, Sec2 of the base station (transmitting apparatus) BS subject the two transmit signals Data1, Data2, respectively, to error-correction encoding and output encoded transmit signals Cdata1, Cdata2. The spreading circuits SC1, SC2 spread-spectrum modulate the transmit signals Cdata1, Cdata2 using the spreading-code sequences SCD1, SCD2 output from the spreading-code sequence generators SCG1, SCG2, and output the transmit signals Sdata01, Sdata02.

If the control signal CSTP that enters from the controller CNT1 attains the high level, the switch SW1 inhibits passage of the transmit signal Sdata01, which is output from the spreading circuit SC1, over the chip interval where the control signal CSTP is at the high level. As a result, the transmit signal Sdata1 that has been switched on a per-chip basis emanates into space from the antenna ANT1. Further, the transmit data Sdata2 emanates into space from the antenna ANT2 without undergoing switching control.

On the receiving side, the despreading-code sequence generators SCG1', SCG2' generate the despreading-code sequences SCD1', SCD2', which are identical with the spreading-code sequences SCD1, SCD2 on the transmitting side, in sync with the spreading-code sequences SCD1, SCD2, and the despreading circuits RSC1, RSC2 subject the receive signals Sdata1', Sdata2' to despread processing using the despreading-code sequences SCD1', SCD2', thereby outputting the despread signals Cdata1', Cdata2'. The channel decoders CH-dec1, CH-dec2 subject the despread signals Cdata1', Cdata2', which are output from the despreading circuits, to error-correction decoding processing, generate final receive data Data1', Data2' and output this data.

In accordance with the third modification, the sending of a transmit signal is halted over the duration of a chip of particularly large interference in a symbol interval in which interference noise is great. As a result, interference noise inflicted in each of the transmission systems decreases so that communication can be performed in excellent fashion. Further, transmit data for which transmission over the chip interval has been halted is capable of being restored by error-correction decoding processing.

The foregoing is described for a case where transmission is halted based upon a cross-correlation value between spreading-code sequences. However, it is also possible to adopt an arrangement in which transmission is halted based upon a cross-correlation value between spread-spectrum modulated signals.

(F) Sixth Embodiment

Figure 32:
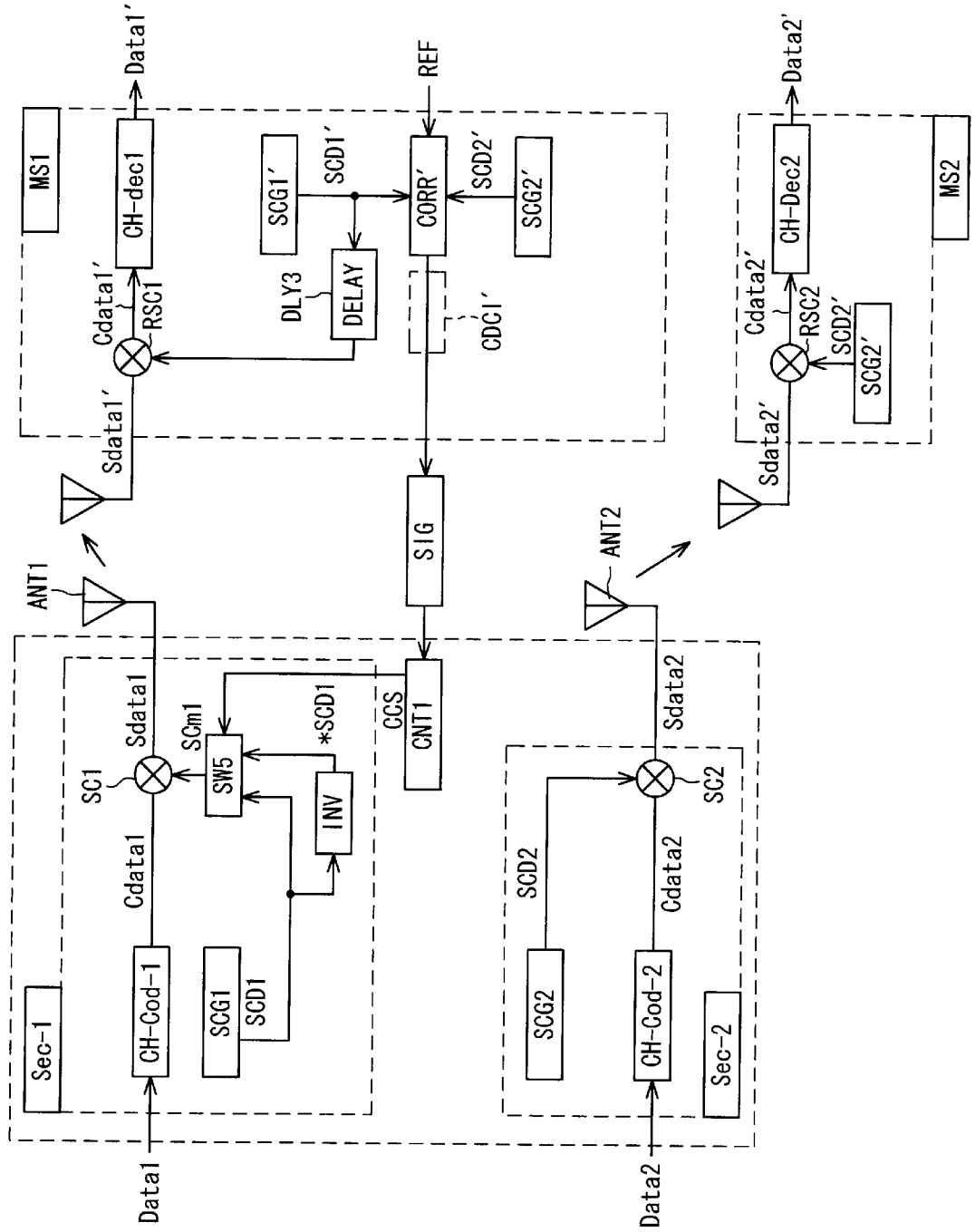
FIG. 32 is a block diagram of a code division multiple access communication system according to a sixth embodiment.

FIG. 32 is a block diagram of a code division multiple access communication system according to a sixth embodiment of the present invention. Here components identical with those of the third embodiment of FIG. 24 are designated by like reference characters. This embodiment differs from the third embodiment in the following respects:

(1) The receiving side is provided with the cross-correlation detection controller CORR' for calculating the symbol-by-symbol cross-correlation value between two spreading-code sequences (actually despreading-code sequences SCD1I, SCD2') and detecting a symbol position where the cross-correlation value exceeds the threshold value REF.

(2) The symbol position where the cross-correlation value exceeds the threshold value REF is reported to the transmitting apparatus BS.

(3) The transmitting apparatus BS inverts the code of the spreading-code sequence at the reported symbol position and performs spread-spectrum modulation using the inverted spreading-code sequence.

The cross-correlation detection controller CORR' of the receiving apparatus MS1 successively calculated symbol-by-symbol cross-correlation values between the despreading-code sequences SCD1', SCD2', which are identical with the spreading-code sequences SCD1, SCD2 of the transmitting apparatus, checks to determine whether the cross-correlation value has exceeded the predetermined threshold value REF, and outputs the symbol position to the controller CNT1 of the transmitting apparatus BS via the control-signal sending means SIG if the threshold value is exceeded. The controller CNT1 inputs the code changeover signal CCS to the switch SW5 at a time conforming to the reported symbol position.

The channel coders CH-cod1, CH-cod2 in the sectors Sec1, Sec2 of the transmitting apparatus BS subject the two transmit signals Data1, Data2, respectively, to error-correction encoding and output encoded transmit signals Cdata1, Cdata2. Meanwhile, the spreading-code sequence generators SCG1, SCG2 generate the spreading-code sequences SCD1, SCD2, the spreading-code sequence SCD1 is input to the inverter INV and switch SW5, and the inverter INV inverts the code of the spreading-code sequence SCD1 and inputs the inverted code to one other input terminal of the switch SW5. The switch SW5 selects and outputs the spreading-code sequence SCD1 in a symbol interval over which the code changeover signal CCS that enters from the controller CNT1 is at the low level, i.e., a symbol interval over which interference noise is small. Further, the switch SW5 outputs the inverted spreading-code sequence *SCD1, which is output from the inverter INV, in a symbol interval over which the code changeover signal CCS is at the high level, i.e., a symbol interval over which interference noise is large.

The spreading circuit SC1 spread-spectrum modulates the encoded transmit data Cdata1 using the spreading-code sequence SCm1 output from the switch SW5, and the spreading circuit SC2 spread-spectrum modulates the encoded transmit data Cdata2 using the spreading-code sequence SCD2. The spread-spectrum modulated signals are subsequently input to the antennas ANT1, ANT2 via frequency converters and transmission-power amplifiers, not shown, and the signals emanate into space.

On the receiving side, the despreading-code sequence generators SCG1', SCG2' generate the despreading-code sequences SCD1', SCD2' identical with the code sequences SCD1, SCD2 on the transmitting side, and the delay unit DLY3 delays the despreading-code sequence SCD1' a prescribed length of time and inputs the delayed signal to the despreading circuit RSC1. The delay time corresponds to the total of (1) time required for processing to calculate the cross-correlation, (2) time for the transmitting apparatus to invert the code of the spreading-code sequence based upon the symbol position reported from the receiving apparatus, and (3) the time it takes for the transmit signal, which has been spread-spectrum modulated by the inverted spreading-code sequence, to arrive on the receiving side. The delay unit DLY3 delays the despreading-code sequence SCD1' for the above-mentioned length of time to match the timings of the receive signal and despreading-code sequence.

The despreading circuits RSC1, RSC2 subject the receive signals Sdata1', Sdata2' to despread processing using the despreading code sequences SCD1', SCD2', thereby outputting despread signals Cdata1', Cdata2'. The channel decoders CH-dec1, CH-dec2 subject the despread signals Cdata1', Cdata2', which are output from the despreading circuits, to error-correction decoding processing, generate final receive data Data1', Data2' and output this data. At this time the symbol for which the code has been inverted is reproduced by the channel decoder CH-dec1.

The foregoing is for a case where one transmission system is provided with the components (switch SW5 and inverter INV) which change the spreading-code sequence. However, each of a plurality of transmission systems can be provided with these components. Further, in order to change spreading-code sequences with regard to a plurality of transmit signals, this can be achieved by combining a change of a spreading-code sequence using the inverter INV, as in the embodiment, and a change based upon substitution of a fixed spreading-code sequence.

In accordance with the sixth embodiment, one transmission system inverts the code of a spreading-code sequence in a symbol interval where interference noise is large. As a result, interference noise inflicted upon the other transmission system decreases so that communication can be performed in excellent fashion.

Further, the sixth embodiment is such that when a mobile station enters a boundary area between neighboring base stations, the cross-correlation value between the spreading-code sequences used at each of the base stations is calculated. When the correlation value becomes large (when interference noise becomes large), the spreading-code sequence of one transmit signal is changed so that the interference noise can be reduced. In other words, interference noise can be reduced taking into consideration the correlation between spreading-code sequences of neighboring base stations, thereby making excellent communication possible.

First Modification

The sixth embodiment is for a case where the code of a spreading-code sequence is inverted symbol by symbol. However, it can also be so arranged that only identical codes are inverted in a symbol where the correlation value exceeds the threshold value. In such case the code-coincident-chip detector CDCI' (see the dashed line in FIG. 32) would be provided on the output side of the cross-correlation detection controller CORR'.

The cross-correlation detection controller CORR' successively calculates the symbol-by-symbol cross-correlation values between the despreading-code sequences SCD1', SCD2' identical with the spreading-code sequences SCD1, SCD2 of the transmitting apparatus, checks to determine whether the cross-correlation value has exceeded the predetermined threshold value REF, and inputs a signal, which is at the high level for the duration of one symbol, to the code-coincident-chip detector CDCI' if the threshold value is exceeded. If the cross-correlation value per symbol is equal to or greater than the threshold value, the code-coincident-chip detector CDCI' detects a chip position where the codes of the despreading-code sequences SCD1', SCD2' coincide in the above-mentioned symbol interval and reports this position to the controller CNT1 of the transmitting apparatus BS via the control-signal sending means SIG. The controller CNT1 inputs the code changeover signal to the switch SWS at the timing (in a chip interval) that conforms to the chip position of which it has been notified. The switch SW5 inverts the code of the spreading-code sequence on a per-chip basis by the code changeover signal.

Second Modification

Figure 33:
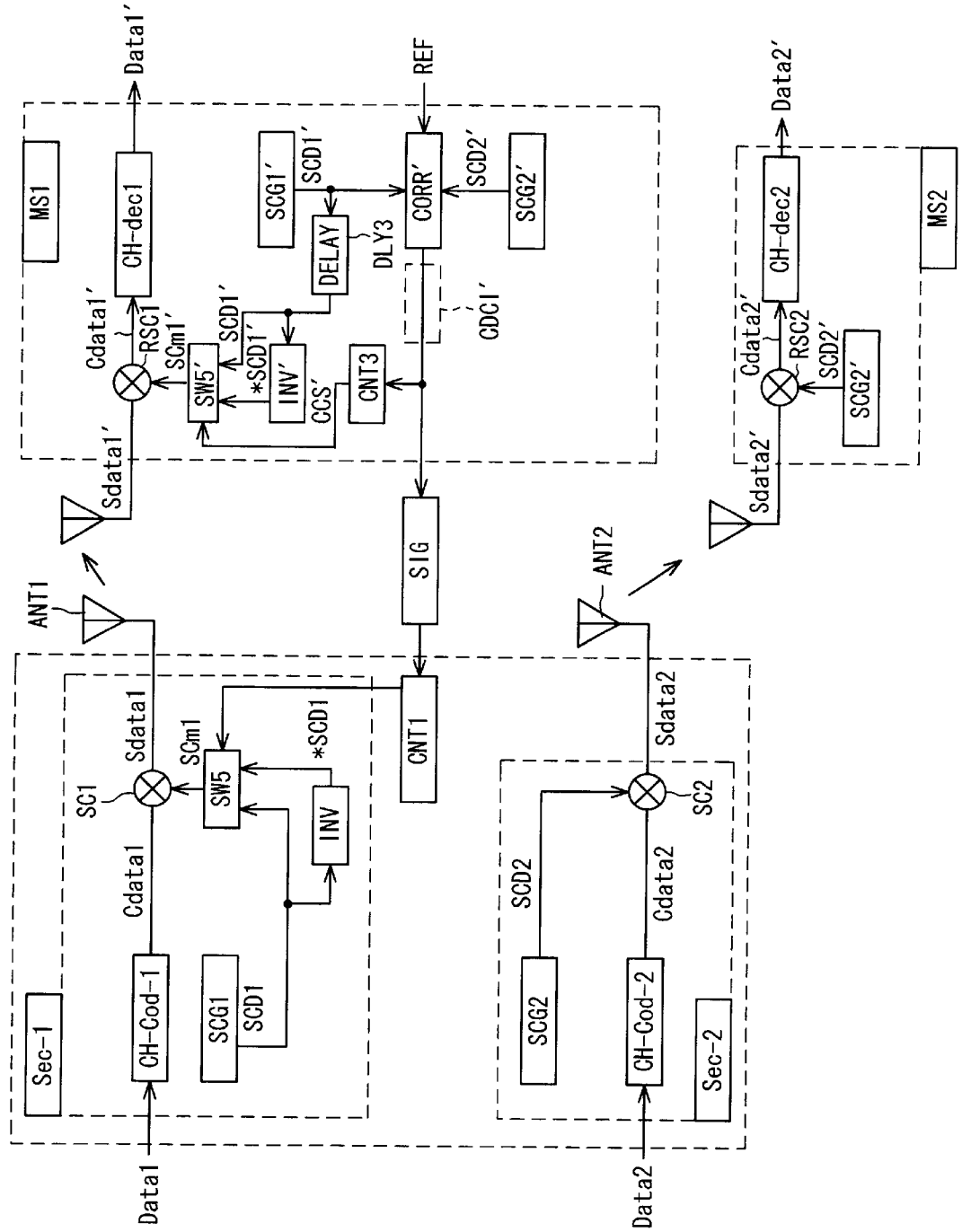
FIG. 33 shows a modification of the sixth embodiment.

FIG. 33 is a block diagram of a code division multiple access communication system according to a second modification of the sixth embodiment of the present invention, in which components identical with those of the sixth embodiment of FIG. 32 are designated by like reference characters. This modification differs in that the code of a despreading-code sequence is inverted at a symbol position that the receiving apparatus MS1 reports to the transmitting apparatus BS.

In the second modification, the cross-correlation detection controller CORR' of the receiving apparatus MS1 calculates the cross-correlation value, inputs a symbol position at which the cross-correlation value exceeds the threshold value REF to the controller CNT3 and reports this symbol position to the transmitting apparatus BS via the control-signal sending means SIG. The transmitting apparatus BS inverts the code of the spreading-code sequence SCD1 at the reported symbol position, spread-spectrum modulates the transmit data using the inverted spreading-code sequence and transmits the modulated data.

On the receiving side, the despreading-code sequence generators SCG1', SCG2' generate the despreading-code sequences SCD1', SCD2' identical with the spreading-code sequences SCD1, SCD2 on the transmitting side, and the delay unit DLY3 delays the despreading-code sequence SCD1' a prescribed length of time and inputs the delayed signal to the switch SW5 and inverter INV'. Further, the controller CNT3 outputs the code changeover signal CCS' that attains the high level at the stored symbol position.

The switch SW5' selects and outputs the despreading-code sequence SCD1' in a symbol interval where the code changeover signal CCS' is at the low level, and outputs the despreading-code sequence *SCD1', which is output from the inverter INV', in a symbol interval where the code changeover signal CCS' is at the high level. As a result, the switch SW5' outputs the despreading-code sequence SCm1' synchronized to the spreading-code sequence SDm1.

The despreading circuit RSC1 subjects the receive signal Sdata1' to despread processing using the despreading-code sequence SCm1' output from the switch SW5', thereby outputting the despread signal Cdata1'. The despreading circuit RSC2 subjects the receive signal Sdata2' to despread processing using the despreading-code sequence SCD2', thereby outputting despread signal Cdata2'. The channel decoders CH-dec1, CH-dec2 subject the despread signals Cdata1', Cdata2', which are output from the despreading circuits RSC1, RSC2, to error-correction decoding processing, generate final receive data Data1', Data2' and output this data.

The second modification is for a case where the code of a spreading-code sequence is inverted symbol by symbol. However, it can also be so arranged that only identical codes are inverted in a symbol where the correlation value exceeds the threshold value. In such case the code-coincident-chip detector CDCI' (see the dashed line in FIG. 33) would be provided on the output side of the cross-correlation detection controller CORR'.

In accordance with the second modification, the receiving side inverts the code of a despreading-code sequence in such a manner that the sequence will coincide with the spreading-code sequence. As a result, interference noise can be reduced in a symbol interval where the interference noise is large. Moreover, data can be reproduced correctly in this symbol interval.

Third Modification

Figure 34:
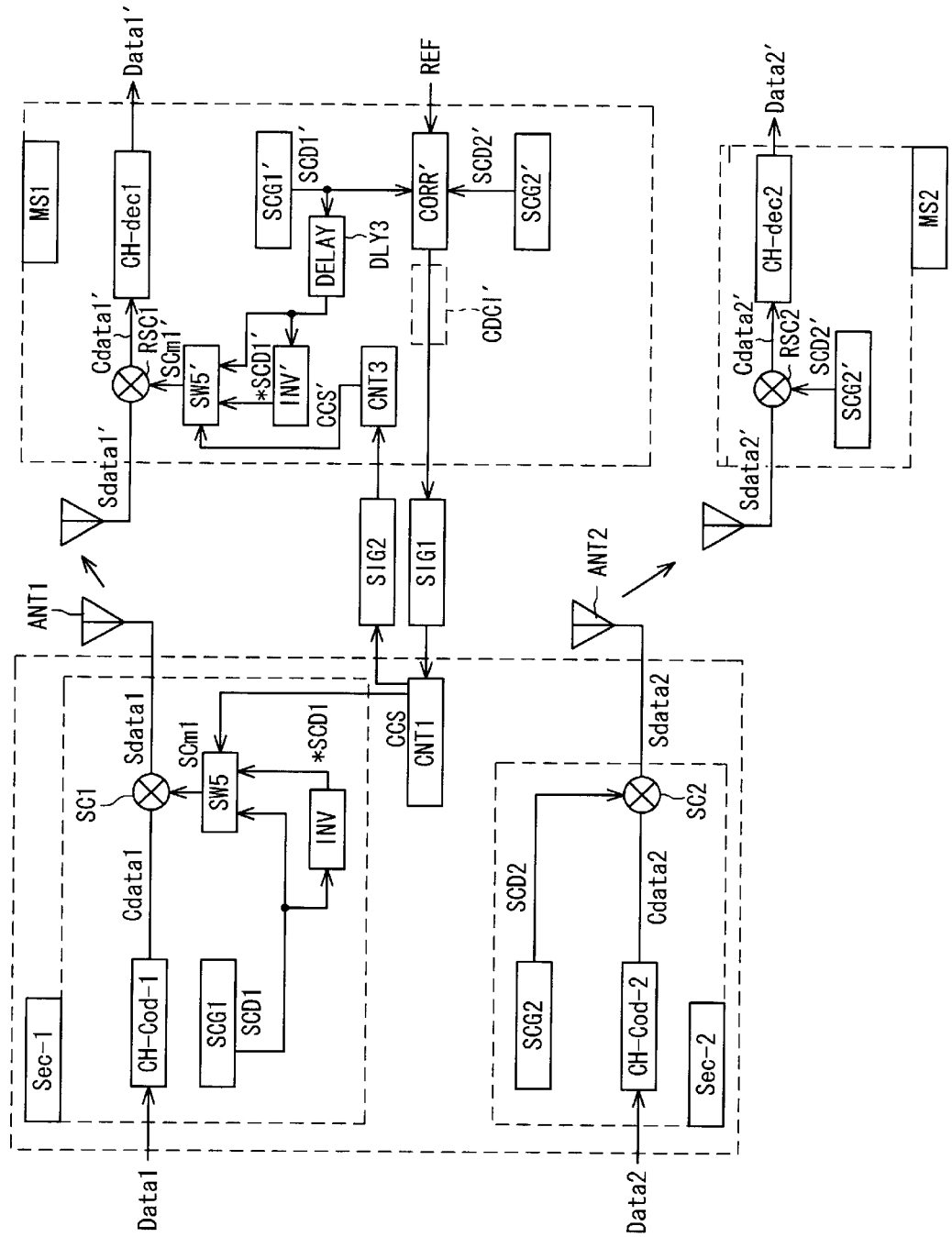
FIG. 34 shows another modification of the sixth embodiment.

FIG. 34 is a block diagram of a code division multiple access communication system according to a third modification of the sixth embodiment of the present invention, in which components identical with those of the second embodiment of FIG. 33 are designated by like reference characters. This modification differs in that the controller CNT1 of the transmitting apparatus BS informs the controller CNT3 of the receiving apparatus MS1, via control-signal sending means SIG2, of symbol position information regarding code inversion.

The foregoing is described with regard to a case where a spreading-code sequence is changed based upon a cross-correlation value between spreading-code sequences. However, it can be so arranged that a spreading-code sequence is changed based upon a cross-correlation value between spread-spectrum modulated signals.

(G) Seventh Embodiment

Figure 35:
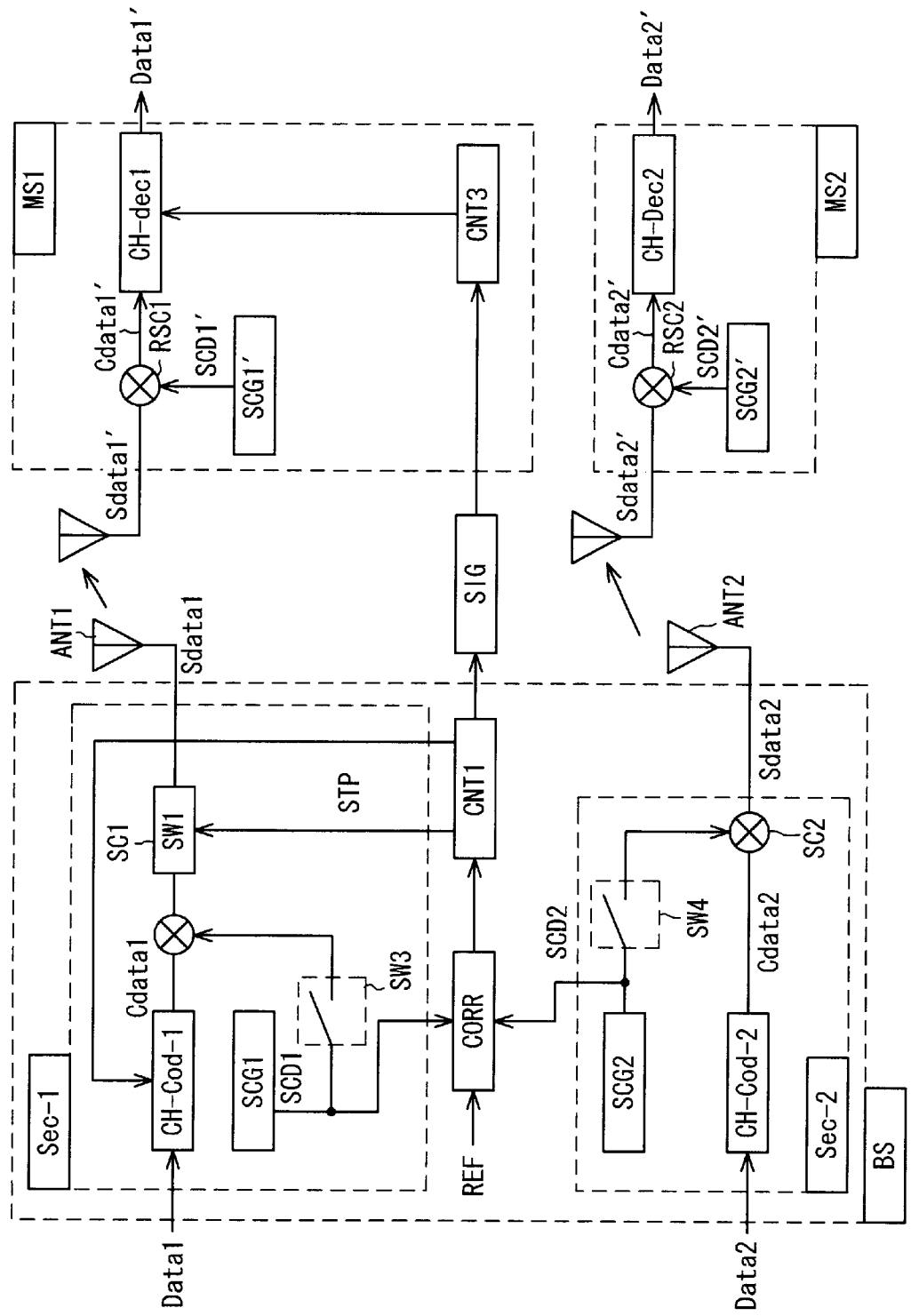
FIG. 35 is a block diagram of a code division multiple access communication system according to a seventh embodiment of the present invention.

FIG. 35 is a block diagram of a code division multiple access communication system according to a seventh embodiment of the present invention. Here components identical with those of the first embodiment of FIG. 4 are designated by like reference characters. This embodiment differs in the following respects:

(1) Prior to the start of communication, the cross-correlation detection controller CORR calculates the symbol-by-symbol cross-correlation value between the spreading-code sequences SCD1, SCD2, checks to determine whether the cross-correlation value every symbol exceeds the predetermined threshold value REF and outputs this symbol position to the controller CNT1 if the threshold value is exceeded.

(2) The controller CNT1 reports the symbol position where the cross-correlation value exceeds the threshold value REF to the controller CNT3 of the receiving apparatus MS1 via the control-signal sending means SIG.

(3) At the time of communication, the controller CNT1 outputs the control signal STP at a timing conforming to the stored symbol position, and the switch SW1 controls transmission/stoppage of the transmit signal based upon this control signal.

(4) The channel coder CH-Cod1 receives a non-transmit symbol position from the controller CNT1 and performs encoding by reducing the number of transmit bits by an amount equivalent to the non-transmit symbol.

(5) The channel decoder CH-dec1 on the receiving side receives a non-transmit symbol position from the controller CNT3 and executes decoding processing that is the reverse of the encoding processing of the transmitting apparatus.

Before the start of communication, the switches SW3, SW4 are placed in the states illustrated. The cross-correlation detection controller CORR calculates the cross-correlation value symbol-by-symbol between the spreading-code sequences SCD1, SCD2 output from the spreading-code sequence generators SCG1, SCG2, checks to determine whether the cross-correlation value every symbol exceeds the predetermined threshold value REF and outputs this symbol position to the controller CNT1 if the threshold value is exceeded. The cross-correlation detection controller CORR executes the above-described processing until the initial spreading-code sequences SCD1, SCD2 appear again, and the controller CNT1 saves all symbol positions where the cross-correlation value exceeds the predetermined threshold value REF.

If the above preprocessing is completed, the switches SW3, SW4 change over the output destinations of the spreading-code sequences SCD1, SD2 to the side of the spreading circuits SC1, SC2. Further, the controller CNT1 reports the saved non-transmit symbol position to the controller CNT3 of the receiving apparatus MS1 via the control-signal sending means SIG and reports this non-transmit symbol position to the channel coder CH-Cod1. Further, the controller CNT3 reports the non-transmit symbol position received to the channel decoder CH-dec1.

At the time of communication, the channel coders CH-cod1, CH-cod2 of the transmitting apparatus BS subject the transmit signals Data1, Data2, respectively, to error-correction encoding and generate the encoded transmit signals Cdata1, Cdata2. In this encoding processing, the channel encoder CH-cod1 performs encoding by reducing the number of transmit bits by an amount equivalent to the non-transmit symbol based upon position information regarding the non-transmit signal.

The spreading circuit SC1 spread-spectrum modulates the transmit data Cdata1 by the spreading-code sequence SCD1 and inputs the modulated data to the switch SW1. The controller CNT1 outputs the control signal STP that attains the high level at the symbol position where cross-correlation value exceeds the predetermined threshold value REF. When the control signal STP attains the high level, the switch SW1 inhibits passage of the transmit signal, which enters from the spreading circuit SC1, for the duration of the corresponding symbol. On the other hand, the spreading circuit SC2 spread-spectrum modulates the transmit data Cdata2 using the spreading-code sequence SCD2 and outputs the result.

Thereafter, the transmit signal Sdata1 that has undergone switching control and the transmit signal Sdata2 that has not undergone switching control emanate into space from the antennas ANT1, ANT2.

On the receiving side, the despreading-code sequence generators SCG1', SCG2' generate the despreading-code sequences SCD1', SCD2', which are identical with the spreading-code sequences SCD1, SCD2 on the transmitting side, in sync with the abovementioned spreading-code sequences, and the despreading circuits RSC1, RSC2 subject the receive signals Sdata1', Sdata2' to despread processing using the despreading-code sequences SCD1', SCD2', thereby outputting the despread signals Cdata1', Cdata2'. The channel decoders CH-dec1, CH-dec2 subject the despread signals Cdata1', Cdata2', which are output from the despreading circuits, to error-correction decoding processing, generate final receive data Data1', Data2' and output this data. In this decoding processing, the channel decoder CH-dec1 executes decoding processing upon excluding, as a non-transmit symbol, a receive signal at a symbol position identical with that where bits where reduced.

For example, the channel coder CH-Cod1 usually encodes the data Data1 every n bits and generates N-bit (N>n) code data Cdata1. However, if the cross-correlation value exceeds the threshold value at an $m^{th}$ bit among the N bits, the channel coder CH-Cod1 executes encoding processing different from the usual processing, encodes n-bit data Data1 to (N−1)-bit data and transmits this (N−1)-bit data upon mapping it to $1^{st}$ to $(m-1)^{th}$ bits, $(m+1)^{th}$ to $N^{th}$ bits (data is not mapped to the $m^{th}$ bit). On the other hand, the channel decoder CH-Cdec1 executes decoding processing using the $1^{st}$ to $(m-1)^{th}$ bits, $(m+1)^{th}$ to $N^{th}$ bits (the $m^{th}$ bit is not used) output from the despreading circuit RSC1 and outputs the decoded data.

In accordance with the seventh embodiment, encoded data is not transmitted at a symbol position where there is the possibility that a transmission error will occur. Moreover, decoding is performed without using data at a symbol position where there is the possibility that transmission error will be produced by decoding processing. This makes it possible to decode transmit data correctly.

Modification

Figure 36:
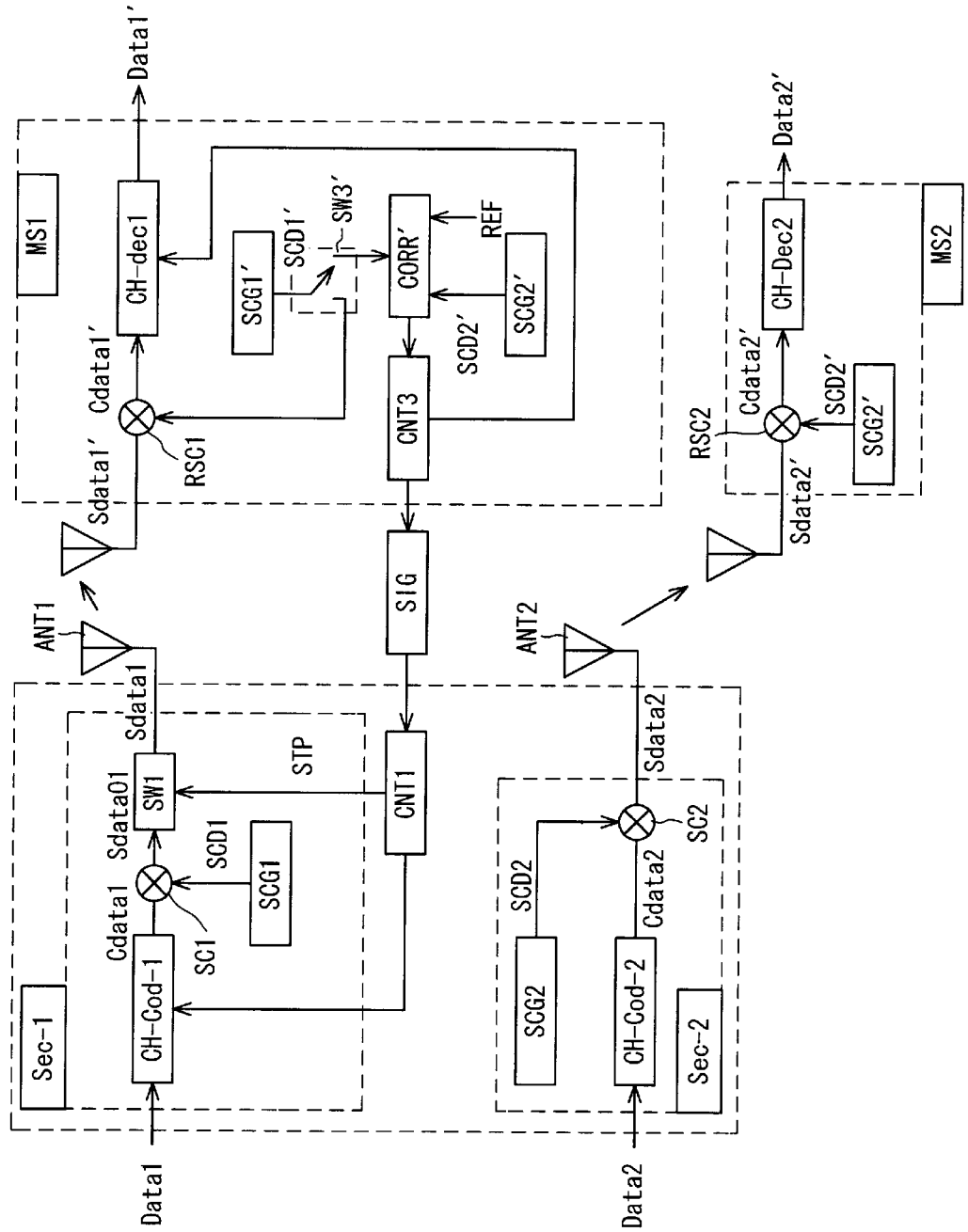
FIG. 36 shows a modification of the seventh embodiment.

FIG. 36 shows a modification of the seventh embodiment. Here components identical with those of the seventh embodiment of FIG. 35 are designated by like reference characters. This modification differs in the following respects:

(1) The receiving side is provided with the cross-correlation detection controller CORR' which, prior to the start of communication, calculates the symbol-by-symbol cross-correlation value between the two spreading-code sequences (actually despreading-code sequences SCD1', SCD2') and detects a symbol position where the cross-correlation value exceeds the threshold value REF.

(2) The symbol position where the cross-correlation value exceeds the threshold value REF is reported to the transmitting apparatus BS.

(3) The transmitting apparatus BS halts the transmission of the transmit data Sdata01 at the symbol position of which it has been notified.

(4) The controller CNT1 inputs non-transmit symbol position information, which has been reported from the receiving side, to the channel coder CH-Cod1, and the controller CNT3 inputs non-transmit symbol position information, which has been detected on the receiving side, to the channel decoder CH-dec1.

Before the start of communication, a switch SW3' of the receiving apparatus MS1 inputs the despreading-code sequence SCD1', which is output from the despreading-code sequence generator SCG1', to the cross-correlation detection controller CORR'. The latter calculates the cross-correlation value symbol-by-symbol between the despreading-code sequences SCD1', SCD2', checks to determine whether the cross-correlation value every symbol exceeds the threshold value REF and inputs this symbol position to the controller CNT3 if the threshold value is exceeded. The cross-correlation detection controller CORR' executes the above-described processing until the initial despreading-code sequences SCD1', SCD2' appear again, and the controller CNT3 saves all symbol positions where the cross-correlation value exceeds the threshold value REF. If the above pre-processing is completed, the switch SW3' inputs the despreading-code sequence SCD1' to the despreading circuit RSC1, and the controller CNT3 reports the symbol positions to the controller CNT1 of the transmitting apparatus BS using the control-signal sending means SIG.

The controller CNT1 stores the symbol positions of which it has been notified and reports the non-transmit symbol position to the channel coder CH-Cod1. Further, the controller CNT3 on the receiving side notifies the channel decoder CH-dec1 of the non-transmit symbol position detected on the receiving side.

At the time of communication, the channel coders CH-cod1, CH-cod2 of the transmitting apparatus BS subject the transmit signals Data1, Data2, respectively, to error-correction encoding and generate the encoded transmit signals Cdata1, Cdata2. In this encoding processing, the channel encoder CH-cod1 performs encoding by reducing the number of transmit bits by an amount equivalent to the non-transmit symbol based upon the information regarding the non-transmit symbol position. The spreading circuits SC1, SC2 spread-spectrum modulate the transmit data Cdata1, Cdata2 by the spreading-code sequences SCD1, SCD2, and an input is made to the switch SW1. The controller CNT1 outputs the control signal STP that attains the high level at the position of the symbol where the cross-correlation value exceeds the threshold value REF. If the control signal STP attains the high level, the switch SW1 inhibits passage of the transmit signal, which is output from the spreading circuit SC1, for the duration of the corresponding one symbol. As a result, the transmit signal Sdata1 that has undergone switching control and the transmit signal Sdata2 that has not undergone switching control emanate into space from the antennas ANT1, ANT2.

On the receiving side, the despreading-code sequence generators SCG1', SCG2' generate the despreading-code sequences SCD1', SCD2', which are identical with the spreading-code sequences SCD1, SCD2 on the transmitting side, in sync with the above-mentioned spreading-code sequences, and the despreading circuits RSC1, RSC2 subject the receive signals Sdata1', Sdata2' to despread processing using the despreading-code sequences SCD1', SCD2', thereby outputting the despread signals Cdata1', Cdata2'. The channel decoders CH-dec1, CH-dec2 subject the despread signals Cdata1', Cdata2', which are output from the despreading circuits, to error-correction decoding processing, generate final receive data Data1', Data2' and output this data. In decoding, the channel decoder CH-dec1 executes decoding processing upon excluding, as a non-transmit symbol, a receive signal at a symbol position identical with that where bits where reduced.

In the above embodiments, the spreading-code sequences are assumed to be code sequences that repeat cyclically at a predetermined period. The spreading-code sequence can be created as follows: By way of example, a spreading-code sequence having a code length of $2^n-1$ is generated using an n-bit shift register, a code-sequence segment having a length corresponding to 10 ms is cut from this spreading-code sequence, and the partial code sequence thus cut is generated repeatedly every 10 ms, thereby creating a spreading-code sequence. Despreading-code sequences can also be generated in similar fashion.

In accordance with the present invention, there is provided efficient, high-quality communication means in which interference between signals due to momentary deterioration of a cross-correlation characteristic between spreading codes is eliminated.

What is claimed is:

1. A spread signal transmitting apparatus in a code division multiple access communication system for spread-spectrum modulating a plurality of transmit signals using different spreading-code sequences, and simultaneously communicating a plurality of spread-spectrum modulated signals, comprising:

a cross-correlation detector for calculating a cross-correlation value of spreading-code sequences each of which is assigned to each transmit signal;

a discriminator for discriminating an interference interval of the spreading-code sequences from the cross-correlation value calculated; and a switch for halting transmission of at least one of said plurality of transmit signals with regard to all or part of a spreading-code sequence discriminated to be an interference interval.

2. A spread signal transmitting apparatus according to claim 1, wherein said cross-correlation detector calculates a cross-correlation between spreading-code sequences in advance and saves the position of a spreading-code sequence for which the cross-correlation value exceeds a predetermined fixed value; and said switch halts transmission of a transmit signal with regard to all or part of a spreading-code sequence that corresponds to the position saved.

3. A spread signal transmitting apparatus according to claim 1, wherein halting of transmission is applied to a transmit signal that exhibits a smaller spreading rate.

4. A spread signal transmitting apparatus according to claim 1, wherein halting of transmission is applied to transmit signals selected from among said plurality of transmit signals in order, randomly or in accordance with pre-determined order-selection logic.

5. A spread signal transmitting apparatus in a code division multiple access communication system for spread-spectrum modulating a plurality of transmit signals using different spreading-code sequences, and simultaneously communicating a plurality of spread-spectrum modulated signals, comprising:

a cross-correlation detector for calculating, symbol by symbol, a cross-correlation value of spreading-code sequences each of which is assigned to each transmit signal;

a discriminator for discriminating an interference interval of the spreading-code sequence from the cross-correlation value calculated; and a spreading-code altering unit for altering a code segment, which has been discriminated to be an interference interval, to another code with regard to at least one spreading-code sequence among said spreading-code sequences.

6. A spread signal transmitting apparatus according to claim 5, wherein said cross-correlation detector calculates a cross-correlation between spreading-code sequences in advance and saves the position of a spreading-code sequence for which the cross-correlation value exceeds a predetermined fixed value; and said spreading-code altering unit alters a code segment of a spreading-code sequence, which corresponds to the position saved, to another code.

7. A spread signal transmitting apparatus according to claim 5, wherein altering of a spread code is applied to a transmit signal that exhibits a smaller spreading rate.

8. A spread signal transmitting apparatus according to claim 5, wherein altering of a spread code is applied to transmit signals selected from among said plurality of transmit signals in order, randomly or in accordance with predetermined order-selection logic.

9. A code division multiple access communication system having a spread signal transmitting apparatus for subjecting a plurality of items of transmit data to spread-spectrum modulation processing using mutually different spreading-code sequences and simultaneously transmitting a plurality of spread-spectrum signals obtained, and a spread signal receiving apparatus for despreading a receive signal by a despreading-code sequence identical with a spreading-code sequence and decoding transmit data from the despread signal, wherein said spread signal transmitting apparatus has:
 an encoder for encoding each item of transmit data;
 a spread-spectrum modulator for modulating encoded data by different spreading-code sequences;
 a transmitter for transmitting each spread-spectrum modulated signal;
 a cross-correlation detector for calculating a cross-correlation value between said different spreading-code sequences;
 a discriminator for discriminating an interference interval of the spreading-code sequences from the cross-correlation value calculated; and
 a switch for halting transmission of at least one of said plurality of items of transmit data with regard to all or part of a spreading-code sequence discriminated to be an interference interval; and
 said spread signal receiving apparatus has:
  a despreading modulator for despreading receive data by a plurality of despreading-code sequences identical with spreading-code sequences; and
  a decoder for decoding transmit data from each despread signal.

10. A code division multiple access communication system according to claim 9, wherein the spread signal transmitting apparatus has an encoder for performing encoding processing by adopting a bit, which corresponds to a segment of a spreading-code sequence not transmitted by the switch, as a non-transmit bit, thereby reducing the number of transmit bits, and means for reporting the position of the non-transmit bit to the spread signal receiving apparatus; and
 the spread signal receiving apparatus has a decoder for performing decoding processing upon excluding the non-transmit bit based upon non-transmit-bit information reported from the transmitter via transmitting means.

11. A code division multiple access communication system having a spread signal transmitting apparatus for subjecting a plurality of items of transmit data to spread-spectrum modulation processing using mutually different spreading-code sequences and simultaneously transmitting a plurality of spread-spectrum signals obtained, and a spread signal receiving apparatus for despreading a receive signal by a despreading-code sequence identical with a spreading-code sequence and decoding transmit data from the despread signal, wherein said spread signal transmitting apparatus has:
 an encoder for encoding each item of transmit data;
 a spread-spectrum modulator for modulating encoded data by different spreading-code sequences;
 a transmitter for transmitting each spread-spectrum modulated signal;
 a cross-correlation detector for calculating, symbol by symbol, a cross-correlation value between said different spreading-code sequences;
 a discriminator for discriminating an interference interval of the spreading-code sequences from the cross-correlation value calculated; and
 a spreading-code altering unit for altering a code segment, which has been discriminated to be an interference interval, to another code with regard to at least one spreading-code sequence among said spreading-code sequences; and
 said spread signal receiving apparatus has:
  a despreading modulator for despreading receive data by a plurality of despreading-code sequences identical with spreading-code sequences; and
  a decoder for decoding transmit data from each despread signal.

12. A code division multiple access communication system having a spread signal transmitting apparatus for subjecting a plurality of items of transmit data to spread-spectrum modulation processing using mutually different spreading-code sequences and simultaneously transmitting a plurality of spread-spectrum signals obtained, and a spread signal receiving apparatus for despreading a receive signal by a despreading-code sequence identical with a spreading-code sequence and decoding transmit data from the despread signal, wherein said spread signal transmitting apparatus has:
 a cross-correlation detector for calculating a cross-correlation value of the spreading-code sequences each of which is assigned to each transmit signal;
 a discriminator for discriminating an interference interval of the spreading-code sequences from the cross-correlation value calculated;
 a spreading-code altering unit for altering a code segment, which corresponds to a spreading-code sequence that has been discriminated to be an interference interval, to another code with regard to at least one spreading-code sequence; and
 means for reporting altered condition of a spreading-code sequence to the spread signal receiving apparatus; and
 said spread signal receiving apparatus has a despreading-code altering unit which, based upon the altered condition of the spreading-code sequence reported, is for altering a despreading-code sequence in such a manner that it will become identical with said spreading-code sequence after the alteration.

13. A code division multiple access communication system having a spread signal transmitting apparatus for subjecting a plurality of items of transmit data to spread-spectrum modulation processing using mutually different spreading-code sequences and simultaneously transmitting a plurality of spread-spectrum signals obtained, and a spread signal receiving apparatus for despreading a receive signal by a despreading-code sequence identical with a spreading-code sequence and decoding transmit data from the despread signal, wherein said spread signal receiving apparatus has:
 a cross-correlation detector for calculating a cross-correlation value of code sequences that a transmitter uses for spread-spectrum modulation;

a discriminator for discriminating an interference interval of the spreading-code sequences from the cross-correlation value calculated; and means for detecting position of a spreading-code sequence discriminated to be an interference interval, or position of code coincidence chip by chip within a spreading-code sequence discriminated to be an interference interval, and reporting this position to the transmitter; and said spread signal transmitting apparatus has:

means for receiving position information sent from a receiver; and a switch for halting transmission of at least one transmit signal with regard to all or part of a prescribed spreading-code sequence based upon the position information reported.

14. A code division multiple access communication system according to claim 13, wherein said spread signal transmitting apparatus has an encoder for performing encoding processing by adopting a bit, which corresponds to a spreading-code sequence for which the cross-correlation value reported from the receiver is large, as a non-transmit bit, thereby reducing the number of transmit bits; and the spread signal receiving apparatus has a decoder for decoding transmit data by performing decoding processing upon excluding a bit curtailed based upon information reported to the transmitter.

15. A code division multiple access communication system having a spread signal transmitting apparatus for subjecting a plurality of items of transmit data to spread-spectrum modulation processing using mutually different spreading-code sequences and simultaneously transmitting a plurality of spread-spectrum signals obtained, and a spread signal receiving apparatus for despreading a receive signal by a despreading-code sequence identical with a spreading-code sequence and decoding transmit data from the despread signal, wherein said spread signal receiving apparatus has:

a cross-correlation detector for calculating a cross-correlation value of code sequences that a transmitter uses for spread-spectrum modulation;

a discriminator for discriminating an interference interval of a spreading-code sequence from the cross-correlation value calculated; and means for detecting position of a spreading-code sequence discriminated to be an interference interval, or position of code coincidence chip by chip within a spreading-code sequence discriminated to be an interference interval, and reporting this position to the transmitter; and said spread signal transmitting apparatus has:

means for receiving position information sent from a receiver; and a spreading-code altering unit for altering a code segment of a spreading-code sequence, which corresponds to said reported position information, to another code with regard to at least one spreading-code sequence.

16. A code division multiple access communication system according to claim 15, comprising:

a despreading-code sequence altering unit which, based upon the position information, is for altering a despreading-code sequence in such a manner that it will become identical with the spreading-code sequence after the alteration.

17. A code division multiple access communication system according to claim 15, wherein said spread signal transmitting apparatus has means for reporting altered condition of a spreading-code sequence to the receiver;

said spread signal receiving apparatus has a despreading-code altering unit which, based upon the altered condition of the spreading-code sequence reported from the transmitter, is for altering a despreading-code sequence in such a manner that it will become identical with said spreading-code sequence after the alteration.

18. A spread signal transmitting apparatus in a code division multiple access communication system for spread-spectrum modulating a plurality of transmit signals using different spreading-code sequences, and simultaneously communicating a plurality of spread-spectrum modulated signals, comprising:

a cross-correlation detector for calculating a cross-correlation value between spread-spectrum modulated transmit signals;

a discriminator for discriminating an interference interval of a spreading-code sequence from the cross-correlation value calculated; and a switch for halting transmission of at least one of said plurality of transmit signals with regard to all or part of a spreading-code sequence discriminated to be an interference interval.

19. A spread signal transmitting apparatus in a code division multiple access communication system for spread-spectrum modulating a plurality of transmit signals using different spreading-code sequences, and simultaneously communicating a plurality of spread-spectrum modulated signals, comprising:

a cross-correlation detector for calculating a cross-correlation value between spread-spectrum modulated transmit signals;

a discriminator for discriminating an interference interval of a spreading-code sequence from the cross-correlation value calculated; and a spreading-code altering unit for altering a code segment, which has been discriminated to be an interference interval, to another code with regard to at least one spreading-code sequence among said spreading-code sequences.

20. A code division multiple access communication system having a spread signal transmitting apparatus for subjecting a plurality of transmit signals to spread-spectrum modulation processing using mutually different spreading-code sequences and simultaneously transmitting a plurality of spread-spectrum signals obtained, and a spread signal receiving apparatus for despreading a receive signal by a despreading-code sequence identical with a spreading-code sequence and decoding a transmit signal from the despread signal, wherein said spread signal transmitting apparatus has:

an encoder for encoding each item of transmit data;

a spread-spectrum modulator for modulating encoded data by different spreading-code sequences;

a transmitter for transmitting each spread-spectrum modulated signal;

a cross-correlation detector for calculating a cross-correlation value between spread-spectrum modulated signals;

a discriminator for discriminating an interference interval of a spreading-code sequence from the cross-correlation value calculated; and a switch for halting transmission of at least one of said plurality of items of transmit data with regard to all or part of a spreading-code sequence discriminated to be an interference interval; and said spread signal receiving apparatus has:
- a despreading modulator for despreading receive data by a plurality of despreading-code sequences identical with spreading-code sequences; and
- a decoder for decoding transmit data from each despread signal.

21. A code division multiple access communication system having a spread signal transmitting apparatus for subjecting a plurality of items of transmit data to spread-spectrum modulation processing using mutually different spreading-code sequences and simultaneously transmitting a plurality of spread-spectrum signals obtained, and a spread signal receiving apparatus for despreading a receive signal by a despreading-code sequence identical with a spreading-code sequence and decoding transmit data from the despread signal, wherein said spread signal transmitting apparatus has:
- an encoder for encoding each item of transmit data;
- a spread-spectrum modulator for modulating encoded data by different spreading-code sequences;
- a transmitter for transmitting each spread-spectrum modulated signal;
- a cross-correlation detector for calculating a cross-correlation value between spread-spectrum modulated signals;
- a discriminator for discriminating an interference interval of a spreading-code sequence from the cross-correlation value calculated; and
- a spreading-code altering unit for altering a code segment, which has been discriminated to be an interference interval, to another code with regard to at least one spreading-code sequence among said spreading-code sequences; and said spread signal receiving apparatus has:
- a despreading modulator for despreading receive data by a plurality of despreading-code sequences identical with spreading-code sequences; and
- a decoder for decoding transmit data from each despread signal.

22. A code division multiple access communication system having a spread signal transmitting apparatus for subjecting a plurality of items of transmit data to spread-spectrum modulation processing using mutually different spreading-code sequences and simultaneously transmitting a plurality of spread-spectrum signals obtained, and a spread signal receiving apparatus for despreading a receive signal by a despreading-code sequence identical with a spreading-code sequence and decoding transmit data from the despread signal, wherein said spread signal transmitting apparatus has:
- a cross-correlation detector for calculating a cross-correlation value between spread-spectrum modulated signals;
- a discriminator for discriminating an interference interval of a spreading-code sequence from the cross-correlation value calculated; and
- a spreading-code altering unit for altering a code segment, which corresponds to a spreading-code sequence that has been discriminated to be an interference interval, to another code with regard to at least one spreading-code sequence; and
- means for reporting altered condition of a spreading-code sequence to the spread signal receiving apparatus; and said spread signal receiving apparatus has a despreading-code altering unit which, based upon the altered condition of the spreading-code sequence reported, is for altering a despreading-code sequence in such a manner that it will become identical with said spreading-code sequence after the alteration.

23. A code division multiple access communication system having a spread signal transmitting apparatus for subjecting a plurality of items of transmit data to spread-spectrum modulation processing using mutually different spreading-code sequences and simultaneously transmitting a plurality of spread-spectrum signals obtained, and a spread signal receiving apparatus for despreading a receive signal by a despreading-code sequence identical with a spreading-code sequence and decoding transmit data from the despread signal, wherein said spread signal receiving apparatus has:
- a cross-correlation detector for calculating a cross-correlation value between spread-spectrum modulated signals;
- a discriminator for discriminating an interference interval of a spreading-code sequence from the cross-correlation value calculated; and
- means for detecting position of a spreading-code sequence discriminated to be an interference interval, or code coincidence position chip by chip within a spreading-code sequence discriminated to be an interference interval, and reporting this position to a transmitter; and said spread signal transmitting apparatus has:
- means for receiving position information sent from a receiver; and
- a switch for halting transmission of at least one transmit signal with regard to all or part of a prescribed spreading-code sequence based upon the position information reported.

24. A code division multiple access communication system having a spread signal transmitting apparatus for subjecting a plurality of items of transmit data to spread-spectrum modulation processing using mutually different spreading-code sequences and simultaneously transmitting a plurality of spread-spectrum signals obtained, and a spread signal receiving apparatus for despreading a receive signal by a despreading-code sequence identical with a spreading-code sequence and decoding transmit data from the despread signal, wherein said spread signal receiving apparatus has:
- a cross-correlation detector for calculating a cross-correlation value between spread-spectrum modulated signals;
- a discriminator for discriminating an interference interval of a spreading-code sequence from the cross-correlation value calculated; and
- means for detecting position of a spreading-code sequence discriminated to be an interference interval, or code coincidence position chip by chip within a spreading-code sequence discriminated to be an interference interval, and reporting this position to a transmitter; and said spread signal transmitting apparatus has:
- means for receiving position information sent from a receiver; and
- a spreading-code altering unit for altering a code segment of a spreading-code sequence, which corresponds to said reported position information, to another code with regard to at least one spreading-code sequence.

25. A spread signal transmitting apparatus in a code division multiple access communication system for spread-spectrum modulating a plurality of transmit signals using different spreading-code sequences, and simultaneously communicating a plurality of spread-spectrum modulated signals, comprising:

a cross-correlation detector for calculating a cross-correlation value of spreading-code sequences each of which is assigned to each transmit signal;

a discriminator for discriminating an interference interval of a spreading-code sequence from the cross-correlation value calculated; and a halting unit for halting transmission of at least one of said plurality of transmit signals with regard to all or part of a spreading-code sequence discriminated to be an interference interval.

26. A spread signal transmitting apparatus in a code division multiple access communication system for spread-spectrum modulating a plurality of transmit signals using different spreading-code sequences, and simultaneously communicating a plurality of spread-spectrum modulated signals, comprising:

a cross-correlation detector for calculating a cross-correlation value between spread-spectrum modulated transmit signals;

a discriminator for discriminating an interference interval of a spreading-code sequence from the cross-correlation value calculated; and a halting unit for halting transmission of at least one of said plurality of transmit signals with regard to all or part of a spreading-code sequence discriminated to be an interference interval.

* * * * *